(12) United States Patent
Sakhnini et al.

(10) Patent No.: US 11,617,210 B2
(45) Date of Patent: Mar. 28, 2023

(54) PHYSICAL RANDOM ACCESS CHANNEL PREAMBLE TRANSMISSION AND DETECTION FOR LARGE SUBCARRIER SPACING

(71) Applicant: QUALCOMM Incorporated, San Diego, CA (US)

(72) Inventors: Iyab Issam Sakhnini, San Diego, CA (US); Xiaoxia Zhang, San Diego, CA (US); Jing Sun, San Diego, CA (US); Tao Luo, San Diego, CA (US); Zhifei Fan, San Diego, CA (US); Arumugam Chendamarai Kannan, San Diego, CA (US); Juan Montojo, San Diego, CA (US); Ahmed Abdelaziz Ibrahim Abdelaziz Zewail, San Diego, CA (US); Qiang Wu, San Diego, CA (US); Jun Ma, San Diego, CA (US); Mehmet Izzet Gurelli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 52 days.

(21) Appl. No.: 17/195,191

(22) Filed: Mar. 8, 2021

(65) Prior Publication Data
US 2021/0289559 A1    Sep. 16, 2021

Related U.S. Application Data

(60) Provisional application No. 62/988,160, filed on Mar. 11, 2020, provisional application No. 63/020,829, filed on May 6, 2020.

(51) Int. Cl.
*H04L 27/26* (2006.01)
*H04W 74/00* (2009.01)
*H04W 74/08* (2009.01)

(52) U.S. Cl.
CPC ..... *H04W 74/0833* (2013.01); *H04L 27/2607* (2013.01); *H04L 27/26025* (2021.01); *H04W 74/008* (2013.01)

(58) Field of Classification Search
CPC .......... H04L 27/26025; H04L 27/2607; H04L 27/2662; H04W 74/006; H04W 74/008; H04W 74/083
See application file for complete search history.

(56) References Cited

U.S. PATENT DOCUMENTS

2017/0367120 A1   12/2017   Murray et al.
2019/0327766 A1*  10/2019   Zhang ................... H04L 27/261

FOREIGN PATENT DOCUMENTS

CN          107872856 A  *  4/2018  ............ H04W 36/08

OTHER PUBLICATIONS

International Search Report and Written Opinion—PCT/US2021/021520—ISA/EPO—dated May 21, 2021.

(Continued)

*Primary Examiner* — Melvin C Marcelo
*Assistant Examiner* — Natali Pascual Peguero
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive a physical random access channel (PRACH) preamble configuration that indicates a first preamble format for a first PRACH preamble and a second preamble format for a second PRACH preamble, wherein the first preamble format is different from the second preamble format. The UE may transmit the first PRACH preamble as part of a random access procedure based at least in part on the PRACH preamble configuration, wherein transmitting the first PRACH preamble enables a determi- (Continued)

nation of a symbol boundary offset. The UE may transmit the second PRACH preamble as part of the random access procedure based at least in part on the PRACH preamble configuration, wherein transmitting the second PRACH preamble enables a determination of a symbol timing offset. Numerous other aspects are described.

30 Claims, 21 Drawing Sheets

(56) References Cited

OTHER PUBLICATIONS

LG Electronics: "RACH Procedure", 3GPP Draft, 3GPP TSG RAN WG1 Meeting NR#2, R1-1710271, RACH Procedure, 3rd Generation Partnership Project (3GPP), Mobile Competence Centre, 650, Route Des Lucioles, F-06921 Sophia-Antipolis Cedex, France, vol. Ran WG1. No. Qingdao, P.R. China, Jun. 27, 2017-Jun. 30, 2017, Jun. 17, 2017, (Jun. 17, 2017), XP051304902, 4 Pages, Retrieved from the Internet: URL: http://www.3gpp.org/ftp/tsg_ran/WG1_RL1/TSGR1_AH/NR_AH_1706/Docs/. [retrieved on-Jun. 17, 2017] paragraph [02.1].

* cited by examiner

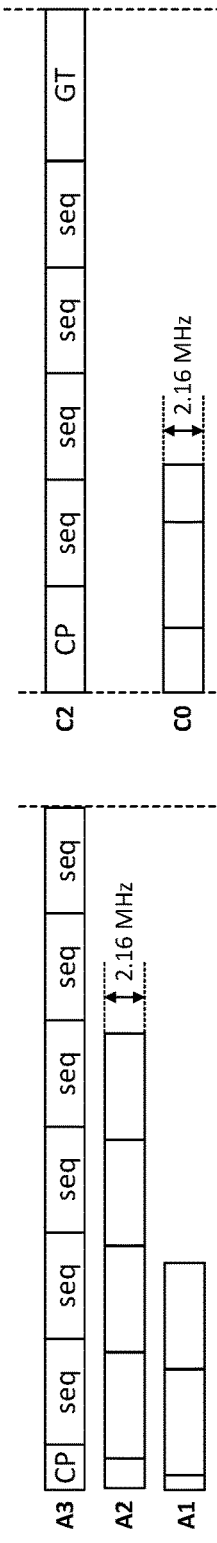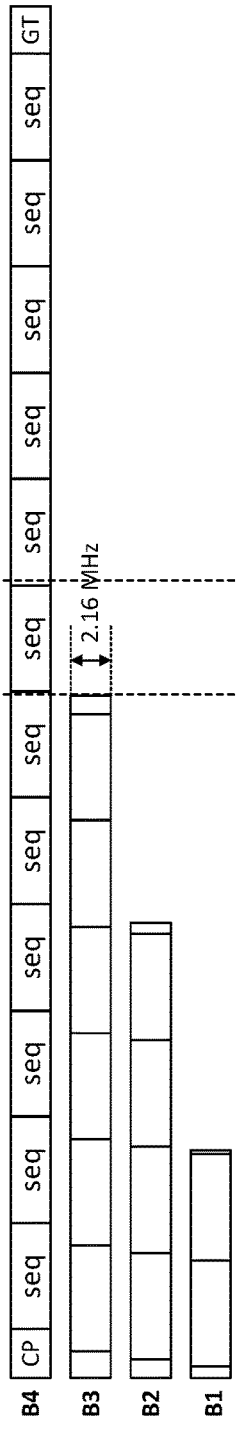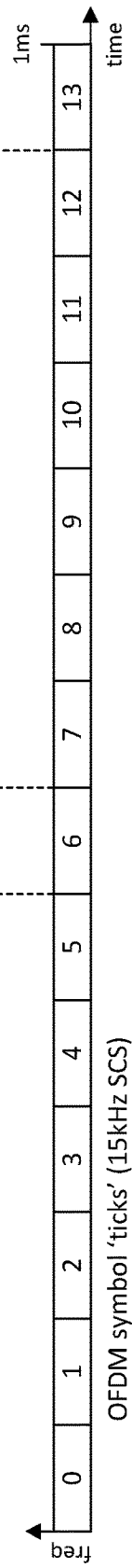
FIG. 5

PHYSICAL RANDOM ACCESS CHANNEL PREAMBLE TRANSMISSION AND DETECTION FOR LARGE SUBCARRIER SPACING

CROSS-REFERENCE TO RELATED APPLICATION

This patent application claims priority to U.S. Provisional Patent Application No. 62/988,160, filed on Mar. 11, 2020, entitled "PHYSICAL RANDOM ACCESS CHANNEL PREAMBLE TRANSMISSION AND DETECTION FOR LARGE SUB-CARRIER SPACING," and assigned to the assignee hereof, and to U.S. Provisional Patent Application No. 63/020,829, filed on May 6, 2020, entitled "PHYSICAL RANDOM ACCESS CHANNEL PREAMBLE FORMAT MODIFICATIONS FOR LARGE SUBCARRIER SPACING," and assigned to the assignee hereof. The disclosure of the prior applications are considered part of and are incorporated by reference into this patent application.

FIELD OF THE DISCLOSURE

Aspects of the present disclosure generally relate to wireless communication and to techniques and apparatuses for physical random access channel preamble transmission and detection for large subcarrier spacing.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a base station, may include receiving a physical random access channel (PRACH) preamble having a preamble format that defines a cyclic prefix duration for a cyclic prefix of the PRACH preamble, a guard time duration for the PRACH preamble, and a number of repetitions of a sequence for the PRACH preamble; and adjusting a timing of a PRACH detection window used to detect the PRACH preamble by at least one of: extending a duration of the cyclic prefix to be longer than the cyclic prefix duration defined by the preamble format, allocating one or more guard symbols to create a guard time with a duration that is longer than the guard time duration defined by the preamble format, or a combination thereof; and using the adjusted timing of the PRACH detection window to detect the PRACH preamble.

In some aspects, a method of wireless communication, performed by a user equipment (UE), may include receiving a PRACH preamble configuration that indicates a preamble format that defines a smaller number of repetitions of a sequence for a PRACH preamble and for a subcarrier spacing that satisfies a threshold, wherein the smaller number of repetitions of the sequence is less than a number of repetitions of a corresponding preamble format for a subcarrier spacing that does not satisfy the threshold; and transmitting the PRACH preamble, having the preamble format that defines the smaller number of repetitions of the sequence, based at least in part on the PRACH preamble configuration.

In some aspects, a method of wireless communication, performed by a base station, may include transmitting a PRACH preamble configuration that indicates a preamble format that defines a smaller number of repetitions of a sequence, for a PRACH preamble and for a subcarrier spacing that satisfies a threshold, wherein the smaller number of repetitions of the sequence is less than a number of repetitions of a corresponding preamble format for a subcarrier spacing that does not satisfy the threshold; and detecting the PRACH preamble, having the preamble format that defines the smaller number of repetitions of the sequence, based at least in part on the PRACH preamble configuration.

In some aspects, a method of wireless communication, performed by a UE, may include receiving a PRACH preamble configuration that indicates a first preamble format for a first PRACH preamble and a second preamble format for a second PRACH preamble, wherein the first preamble format is different from the second preamble format; transmitting the first PRACH preamble as part of a random access procedure based at least in part on the PRACH preamble configuration, wherein transmitting the first PRACH preamble enables a determination of a symbol boundary offset; and transmitting the second PRACH preamble as part of the random access procedure based at least in part on the PRACH preamble configuration, wherein transmitting the second PRACH preamble enables a determination of a symbol timing offset.

In some aspects, a method of wireless communication, performed by a base station, may include transmitting a PRACH preamble configuration that indicates a first preamble format for a first PRACH preamble and a second preamble format for a second PRACH preamble, wherein the first preamble format is different from the second preamble format; receiving the first PRACH preamble as part of a random access procedure based at least in part on the PRACH preamble configuration, wherein receiving the first PRACH preamble enables a determination of a symbol boundary offset; and receiving the second PRACH preamble as part of the random access procedure based at least in part on the PRACH preamble configuration, wherein receiving the second PRACH preamble enables a determination of a symbol timing offset.

In some aspects, a base station for wireless communication may include a memory and one or more processors operatively coupled to the memory. The memory and the one or more processors may be configured to receive a PRACH preamble having a preamble format that defines a cyclic prefix duration for a cyclic prefix of the PRACH preamble, a guard time duration for the PRACH preamble, and a number of repetitions of a sequence for the PRACH preamble; and adjust a timing of a PRACH detection window used to detect the PRACH preamble by at least one of: extend a duration of the cyclic prefix to be longer than the cyclic prefix duration defined by the preamble format, allocate one or more guard symbols to create a guard time with a duration that is longer than the guard time duration defined by the preamble format, or a combination thereof; and use the adjusted timing of the PRACH detection window to detect the PRACH preamble.

In some aspects, a UE for wireless communication may include a memory and one or more processors operatively coupled to the memory. The memory and the one or more processors may be configured to receive a PRACH preamble configuration that indicates a preamble format that defines a smaller number of repetitions of a sequence for a PRACH preamble and for a subcarrier spacing that satisfies a threshold, wherein the smaller number of repetitions of the sequence is less than a number of repetitions of a corresponding preamble format for a subcarrier spacing that does not satisfy the threshold; and transmit the PRACH preamble, having the preamble format that defines the smaller number of repetitions of the sequence, based at least in part on the PRACH preamble configuration.

In some aspects, a base station for wireless communication may include a memory and one or more processors operatively coupled to the memory. The memory and the one or more processors may be configured to transmit a PRACH preamble configuration that indicates a preamble format that defines a smaller number of repetitions of a sequence for a PRACH preamble and for a subcarrier spacing that satisfies a threshold, wherein the smaller number of repetitions of the sequence is less than a number of repetitions of a corresponding preamble format for a subcarrier spacing that does not satisfy the threshold; and detect the PRACH preamble, having the preamble format that defines the smaller number of repetitions of the sequence, based at least in part on the PRACH preamble configuration.

In some aspects, a UE for wireless communication may include a memory and one or more processors operatively coupled to the memory. The memory and the one or more processors may be configured to receive a PRACH preamble configuration that indicates a first preamble format for a first PRACH preamble and a second preamble format for a second PRACH preamble, wherein the first preamble format is different from the second preamble format; transmit the first PRACH preamble as part of a random access procedure based at least in part on the PRACH preamble configuration, wherein transmitting the first PRACH preamble enables a determination of a symbol boundary offset; and transmit the second PRACH preamble as part of the random access procedure based at least in part on the PRACH preamble configuration, wherein transmitting the second PRACH preamble enables a determination of a symbol timing offset.

In some aspects, a base station for wireless communication may include a memory and one or more processors operatively coupled to the memory. The memory and the one or more processors may be configured to transmit a PRACH preamble configuration that indicates a first preamble format for a first PRACH preamble and a second preamble format for a second PRACH preamble, wherein the first preamble format is different from the second preamble format; receive the first PRACH preamble as part of a random access procedure based at least in part on the PRACH preamble configuration, wherein receiving the first PRACH preamble enables a determination of a symbol boundary offset; and receive the second PRACH preamble as part of the random access procedure based at least in part on the PRACH preamble configuration, wherein receiving the second PRACH preamble enables a determination of a symbol timing offset.

In some aspects, a non-transitory computer-readable medium may store one or more instructions for wireless communication. The one or more instructions, when executed by one or more processors of a base station, may cause the one or more processors to receive a PRACH preamble having a preamble format that defines a cyclic prefix duration for a cyclic prefix of the PRACH preamble, a guard time duration for the PRACH preamble, and a number of repetitions of a sequence for the PRACH preamble; and adjust a timing of a PRACH detection window used to detect the PRACH preamble by at least one of: extend a duration of the cyclic prefix to be longer than the cyclic prefix duration defined by the preamble format, allocate one or more guard symbols to create a guard time with a duration that is longer than the guard time duration defined by the preamble format, or a combination thereof; and use the adjusted timing of the PRACH detection window to detect the PRACH preamble.

In some aspects, a non-transitory computer-readable medium may store one or more instructions for wireless communication. The one or more instructions, when executed by one or more processors of a UE, may cause the one or more processors to receive a PRACH preamble configuration that indicates a preamble format that defines a smaller number of repetitions of a sequence for a PRACH preamble and for a subcarrier spacing that satisfies a threshold, wherein the smaller number of repetitions of the sequence is less than a number of repetitions of a corresponding preamble format for a subcarrier spacing that does not satisfy the threshold; and transmit the PRACH preamble, having the preamble format that defines the smaller number of repetitions of the sequence, based at least in part on the PRACH preamble configuration.

In some aspects, a non-transitory computer-readable medium may store one or more instructions for wireless communication. The one or more instructions, when executed by one or more processors of a base station, may cause the one or more processors to transmit a PRACH preamble configuration that indicates a preamble format that defines a smaller number of repetitions of a sequence for a PRACH preamble and for a subcarrier spacing that satisfies a threshold, wherein the smaller number of repetitions of the sequence is less than a number of repetitions of a corresponding preamble format for a subcarrier spacing that does not satisfy the threshold; and detect the PRACH preamble, having the preamble format that defines the smaller number of repetitions of the sequence, based at least in part on the PRACH preamble configuration.

In some aspects, a non-transitory computer-readable medium may store one or more instructions for wireless communication. The one or more instructions, when executed by one or more processors of a UE, may cause the one or more processors to receive a PRACH preamble configuration that indicates a first preamble format for a first PRACH preamble and a second preamble format for a second PRACH preamble, wherein the first preamble format is different from the second preamble format; transmit the first PRACH preamble as part of a random access procedure based at least in part on the PRACH preamble configuration, wherein transmitting the first PRACH preamble enables a determination of a symbol boundary offset; and transmit the second PRACH preamble as part of the random access procedure based at least in part on the PRACH preamble configuration, wherein transmitting the second PRACH preamble enables a determination of a symbol timing offset.

In some aspects, a non-transitory computer-readable medium may store one or more instructions for wireless communication. The one or more instructions, when executed by one or more processors of a base station, may cause the one or more processors to transmit a PRACH preamble configuration that indicates a first preamble format for a first PRACH preamble and a second preamble format for a second PRACH preamble, wherein the first preamble format is different from the second preamble format; receive the first PRACH preamble as part of a random access procedure based at least in part on the PRACH preamble configuration, wherein receiving the first PRACH preamble enables a determination of a symbol boundary offset; and receive the second PRACH preamble as part of the random access procedure based at least in part on the PRACH preamble configuration, wherein receiving the second PRACH preamble enables a determination of a symbol timing offset.

In some aspects, an apparatus for wireless communication may include means for receiving a PRACH preamble having a preamble format that defines a cyclic prefix duration for a cyclic prefix of the PRACH preamble, a guard time duration for the PRACH preamble, and a number of repetitions of a sequence for the PRACH preamble; and means for adjusting a timing of a PRACH detection window used to detect the PRACH preamble by at least one of: extending a duration of the cyclic prefix to be longer than the cyclic prefix duration defined by the preamble format, allocating one or more guard symbols to create a guard time with a duration that is longer than the guard time duration defined by the preamble format, or a combination thereof; and means for using the adjusted timing of the PRACH detection window to detect the PRACH preamble.

In some aspects, an apparatus for wireless communication may include means for receiving a PRACH preamble configuration that indicates a preamble format that defines a smaller number of repetitions of a sequence for a PRACH preamble and for a subcarrier spacing that satisfies a threshold, wherein the smaller number of repetitions of the sequence is less than a number of repetitions of a corresponding preamble format for a subcarrier spacing that does not satisfy the threshold; and means for transmitting the PRACH preamble, having the preamble format that defines the smaller number of repetitions of the sequence, based at least in part on the PRACH preamble configuration.

In some aspects, an apparatus for wireless communication may include means for transmitting a PRACH preamble configuration that indicates a preamble format that defines a smaller number of repetitions of a sequence for a PRACH preamble and for a subcarrier spacing that satisfies a threshold, wherein the smaller number of repetitions of the sequence is less than a number of repetitions of a corresponding preamble format for a subcarrier spacing that does not satisfy the threshold; and means for detecting the PRACH preamble, having the preamble format that defines the smaller number of repetitions of the sequence, based at least in part on the PRACH preamble configuration.

In some aspects, an apparatus for wireless communication may include means for receiving a PRACH preamble configuration that indicates a first preamble format for a first PRACH preamble and a second preamble format for a second PRACH preamble, wherein the first preamble format is different from the second preamble format; means for transmitting the first PRACH preamble as part of a random access procedure based at least in part on the PRACH preamble configuration, wherein transmitting the first PRACH preamble enables a determination of a symbol boundary offset; and means for transmitting the second PRACH preamble as part of the random access procedure based at least in part on the PRACH preamble configuration, wherein transmitting the second PRACH preamble enables a determination of a symbol timing offset.

In some aspects, an apparatus for wireless communication may include means for transmitting a PRACH preamble configuration that indicates a first preamble format for a first PRACH preamble and a second preamble format for a second PRACH preamble, wherein the first preamble format is different from the second preamble format; means for receiving the first PRACH preamble as part of a random access procedure based at least in part on the PRACH preamble configuration, wherein receiving the first PRACH preamble enables a determination of a symbol boundary offset; and means for receiving the second PRACH preamble as part of the random access procedure based at least in part on the PRACH preamble configuration, wherein receiving the second PRACH preamble enables a determination of a symbol timing offset.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating examples of physical RACH (PRACH) preamble formats that may be used in a two-step or four-step RACH procedure, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
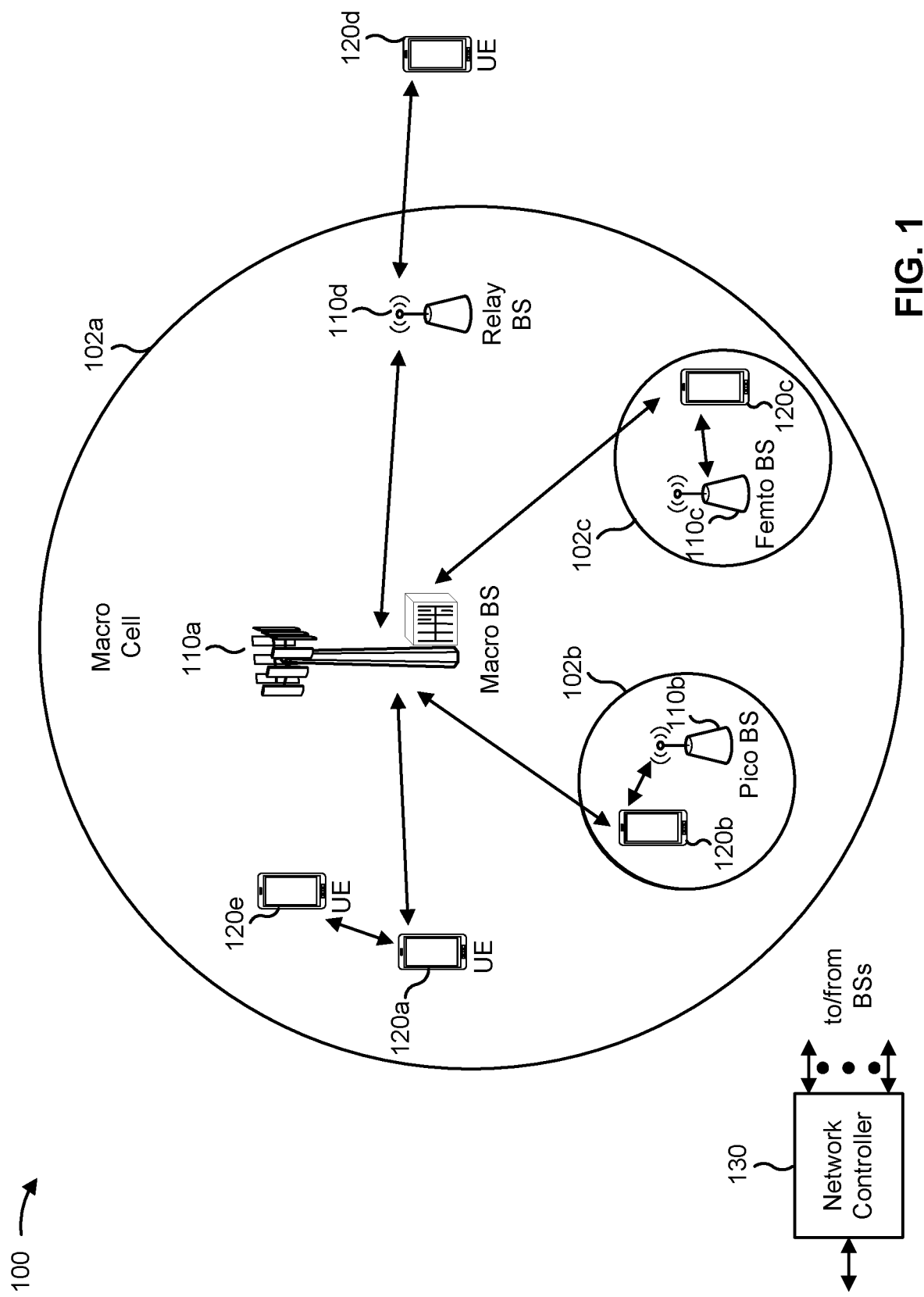
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
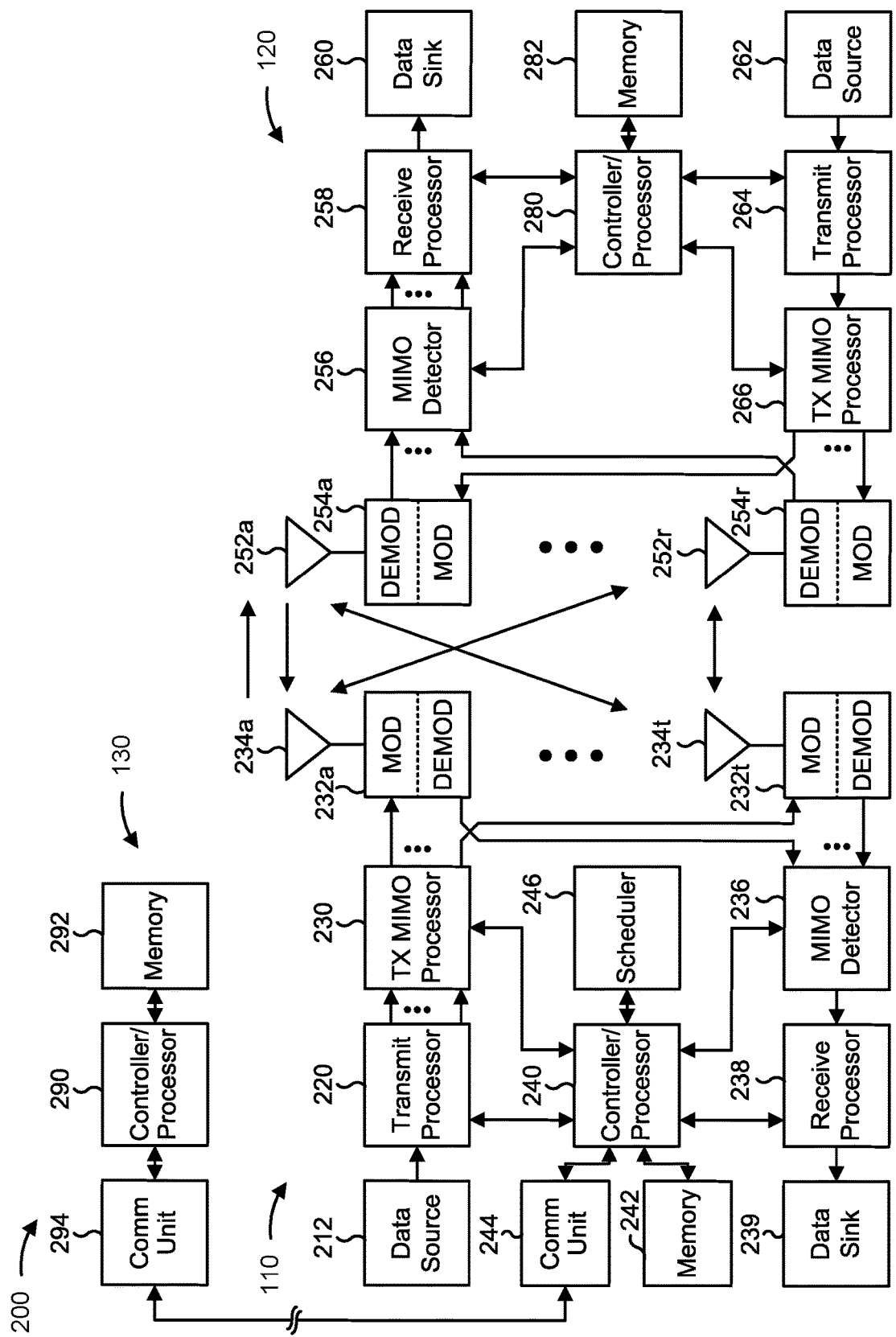
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 6-16.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 6-16.

Controller/processor 240 of base station 110, controller/processor 280 of UE 120, and/or any other component(s) of FIG. 2 may perform one or more techniques associated with physical random access channel (PRACH) preamble transmission and detection for large subcarrier spacing, as described in more detail elsewhere herein. For example, controller/processor 240 of base station 110, controller/processor 280 of UE 120, and/or any other component(s) of FIG. 2 may perform or direct operations of, for example, process 1200 of FIG. 12, process 1300 of FIG. 13, process 1400 of FIG. 14, process 1500 of FIG. 15, process 1600 of FIG. 16, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1200 of FIG. 12, process 1300 of FIG. 13, process 1400 of FIG. 14, process 1500 of FIG. 15, process 1600 of FIG. 16, and/or other processes as described herein. In some aspects, executing instructions may include running the instructions, converting the instructions, compiling the instructions, and/or interpreting the instructions, among other examples.

In some aspects, the UE 120 may include means for receiving a PRACH preamble configuration that indicates a preamble format that defines a smaller number of repetitions of a sequence for a PRACH preamble and for a subcarrier spacing that satisfies a threshold, wherein the smaller number of repetitions of the sequence is less than a number of repetitions of a corresponding preamble format for a subcarrier spacing that does not satisfy the threshold (e.g., using antenna 252, DEMOD 254, MIMO detector 256, receive processor 258, controller/processor 280, memory 282, and/or the like); means for transmitting the PRACH preamble, having the preamble format that defines the smaller number of repetitions of the sequence, based at least in part on the PRACH preamble configuration (e.g., using controller/processor 280, transmit processor 264, TX MIMO processor 266, MOD 254, antenna 252, memory 282, and/or the like); and/or the like.

Additionally, or alternatively, the UE 120 may include means for receiving a PRACH preamble configuration that indicates a first preamble format for a first PRACH preamble and a second preamble format for a second PRACH preamble, wherein the first preamble format is different from the second preamble format (e.g., using antenna 252, DEMOD 254, MIMO detector 256, receive processor 258, controller/processor 280, memory 282, and/or the like); means for transmitting the first PRACH preamble as part of a random access procedure based at least in part on the PRACH preamble configuration, wherein transmitting the first PRACH preamble enables a determination of a symbol boundary offset (e.g., using controller/processor 280, transmit processor 264, TX MIMO processor 266, MOD 254, antenna 252, memory 282, and/or the like); means for transmitting the second PRACH preamble as part of the random access procedure based at least in part on the PRACH preamble configuration, wherein transmitting the second PRACH preamble enables a determination of a symbol timing offset (e.g., using controller/processor 280, transmit processor 264, TX MIMO processor 266, MOD 254, antenna 252, memory 282, and/or the like); and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, the base station 110 may include means for receiving a PRACH preamble having a preamble format that defines a cyclic prefix duration for a cyclic prefix of the PRACH preamble, a guard time duration for the PRACH preamble, and a number of repetitions of a sequence for the PRACH preamble (e.g., using antenna 234, DEMOD 232, MIMO detector 236, receive processor 238, controller/processor 240, memory 242, and/or the like); and means for adjusting a timing of a PRACH detection window used to detect the PRACH preamble by at least one of: extending a duration of the cyclic prefix to be longer than the cyclic prefix duration defined by the preamble format, allocating one or more guard symbols to create a guard time with a duration that is longer than the guard time duration defined by the preamble format, or a combination thereof (e.g., using antenna 234, DEMOD 232, MIMO detector 236, receive processor 238, controller/processor 240, memory 242, and/or the like); means for using the adjusted timing of the PRACH detection window to detect the PRACH preamble (e.g., using antenna 234, DEMOD 232, MIMO detector 236, receive processor 238, controller/processor 240, memory 242, and/or the like); and/or the like.

Additionally, or alternatively, the base station 110 may include means for transmitting a PRACH preamble configuration that indicates a preamble format that defines a smaller number of repetitions of a sequence for a PRACH preamble and for a subcarrier spacing that satisfies a threshold, wherein the smaller number of repetitions of the sequence is less than a number of repetitions of a corresponding preamble format for a subcarrier spacing that does not satisfy the threshold (e.g., using controller/processor 240, transmit processor 220, TX MIMO processor 230, MOD 232, antenna 234, memory 242, and/or the like); means for detecting the PRACH preamble, having the preamble format that defines the smaller number of repetitions of the sequence, based at least in part on the PRACH preamble configuration (e.g., using antenna 234, DEMOD 232, MIMO detector 236, receive processor 238, controller/processor 240, memory 242, and/or the like); and/or the like.

Additionally, or alternatively, the base station 110 may include means for transmitting a PRACH preamble configuration that indicates a first preamble format for a first PRACH preamble and a second preamble format for a second PRACH preamble, wherein the first preamble format is different from the second preamble format (e.g., using controller/processor 240, transmit processor 220, TX MIMO processor 230, MOD 232, antenna 234, memory 242, and/or the like); means for receiving the first PRACH preamble as part of a random access procedure based at least in part on the PRACH preamble configuration, wherein receiving the first PRACH preamble enables a determination of a symbol boundary offset (e.g., using antenna 234, DEMOD 232, MIMO detector 236, receive processor 238, controller/processor 240, memory 242, and/or the like); means for receiving the second PRACH preamble as part of the random access procedure based at least in part on the PRACH preamble configuration, wherein receiving the second PRACH preamble enables a determination of a symbol timing offset (e.g., using antenna 234, DEMOD 232, MIMO detector 236, receive processor 238, controller/processor 240, memory 242, and/or the like); and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
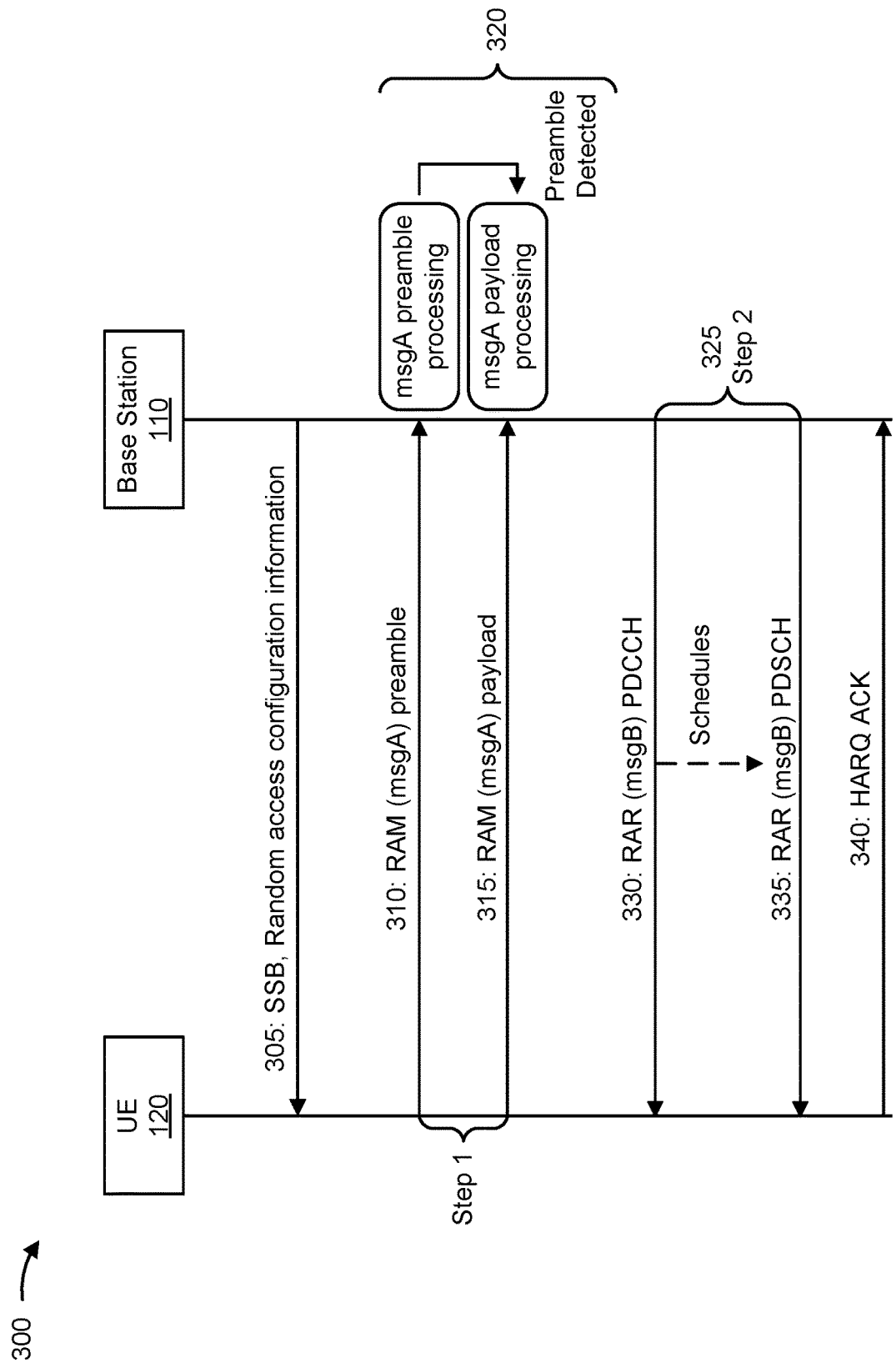
FIG. 3 is a diagram illustrating an example of a two-step random access channel (RACH) procedure, in accordance with the present disclosure.

FIG. 3 is a diagram illustrating an example 300 of a two-step RACH procedure, in accordance with the present disclosure. As shown in FIG. 3, a base station 110 and a UE 120 may communicate with one another in a wireless network (e.g., wireless network 100) to perform the two-step RACH procedure.

As shown by reference number 305, the base station 110 may transmit, and the UE 120 may receive, one or more synchronization signal blocks (SSBs) and random access configuration information. In some aspects, the random access configuration information may be transmitted in and/or indicated by system information (e.g., in one or more system information blocks (SIBs) and/or the like) and/or an SSB. Additionally, or alternatively, the random access configuration information may be transmitted in a radio resource control (RRC) message. The random access configuration information may include one or more parameters to be used in the two-step RACH procedure, such as one or more parameters for transmitting a random access message (RAM), receiving a random access response (RAR) to the RAM, and/or the like.

As shown by reference number 310, the UE 120 may transmit, and the base station 110 may receive, a RAM preamble. As shown by reference number 315, the UE 120 may transmit, and the base station 110 may receive, a RAM payload. As shown, the UE 120 may transmit the RAM preamble and the RAM payload to the base station 110 as part of an initial (or first) step of the two-step RACH procedure. In some aspects, the RAM may be referred to as message A, msgA, a first message, an initial message, and/or the like in a two-step RACH procedure. Furthermore, in some aspects, the RAM preamble may be referred to as a message A preamble, a msgA preamble, a preamble, a PRACH preamble, and/or the like, and the RAM payload may be referred to as a message A payload, a msgA payload, a msgA physical uplink shared channel (PUSCH), a payload, and/or the like. In some aspects, the RAM may include some or all of the contents of message 1 (msg1) and message 3 (msg3) of a four-step RACH procedure, which is described in more detail below. For example, the RAM preamble may include some or all contents of message 1 (e.g., a PRACH preamble), and the RAM payload may include some or all contents of message 3 (e.g., a UE identifier, uplink control information (UCI), a PUSCH transmission, and/or the like).

As shown by reference number 320, the base station 110 may receive the RAM preamble transmitted by the UE 120. If the base station 110 successfully receives and decodes the RAM preamble, the base station 110 may then receive and decode the RAM payload.

As shown by reference number 325, the base station 110 may transmit an RAR (sometimes referred to as an RAR message). As shown, the base station 110 may transmit the RAR message as part of a second step of the two-step RACH procedure. In some aspects, the RAR message may be referred to as message B, msgB, or a second message in a two-step RACH procedure. The RAR message may include some or all of the contents of message 2 (msg2) and message 4 (msg4) of a four-step RACH procedure. For example, the RAR message may include the detected PRACH preamble identifier, the detected UE identifier, timing advance information (e.g., a timing advance value, a timing advance command, and/or the like), contention resolution information, and/or the like.

As shown by reference number 330, as part of the second step of the two-step RACH procedure, the base station 110 may transmit a physical downlink control channel (PDCCH) communication for the RAR. The PDCCH communication may schedule a physical downlink shared channel (PDSCH) communication that includes the RAR. For example, the PDCCH communication may indicate a resource allocation (e.g., in downlink control information (DCI)) for the PDSCH communication.

As shown by reference number 335, as part of the second step of the two-step RACH procedure, the base station 110 may transmit the PDSCH communication for the RAR, as scheduled by the PDCCH communication. The RAR may be included in a medium access control (MAC) protocol data unit (PDU) of the PDSCH communication. As shown by reference number 340, if the UE 120 successfully receives the RAR, the UE 120 may transmit a hybrid automatic repeat request (HARQ) acknowledgement (ACK).

As indicated above, FIG. 3 is provided as an example. Other examples may differ from what is described with regard to FIG. 3.

Figure 4:
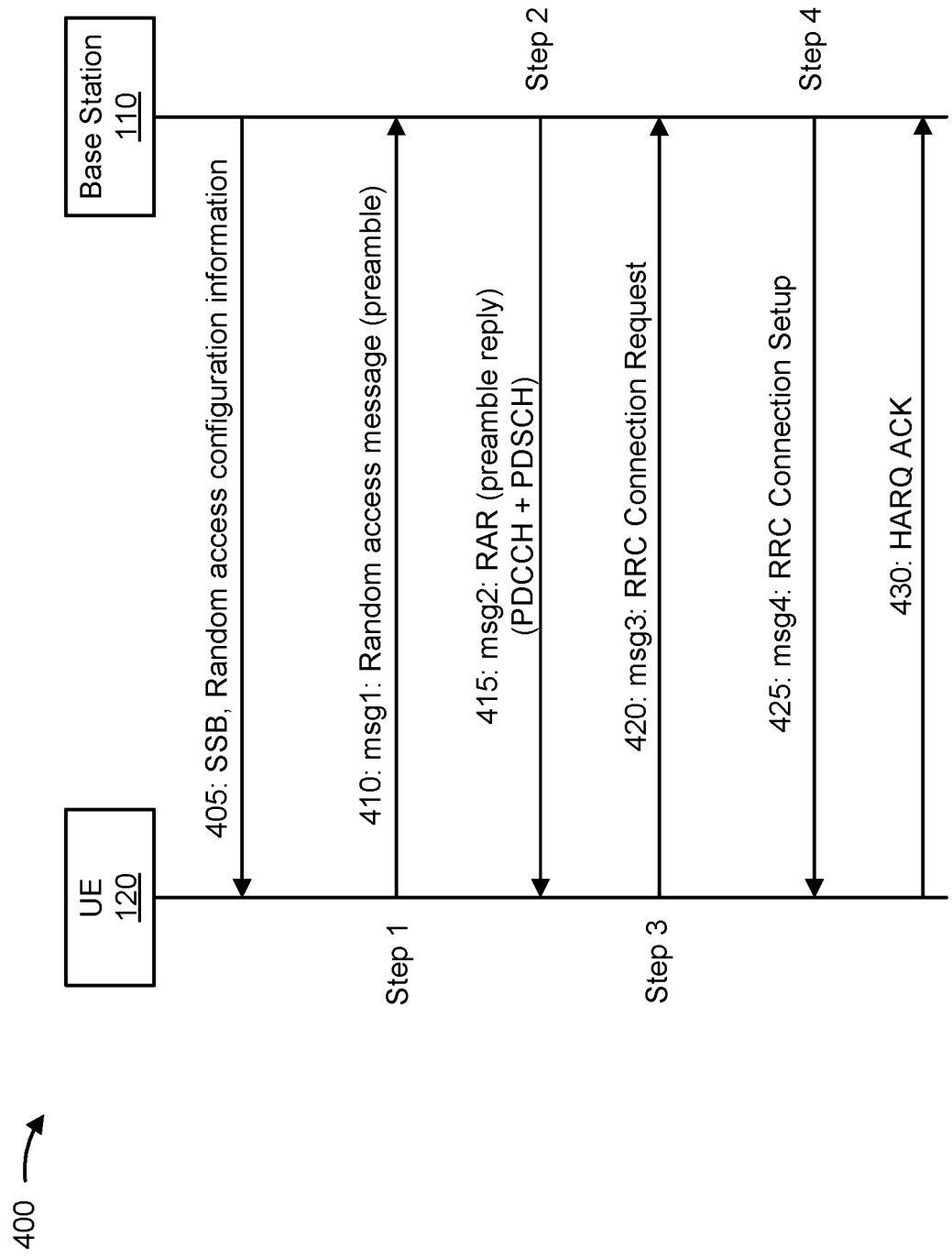
FIG. 4 is a diagram illustrating an example of a four-step RACH procedure, in accordance with the present disclosure.

FIG. 4 is a diagram illustrating an example 400 of a four-step RACH procedure, in accordance with the present disclosure. As shown in FIG. 4, a base station 110 and a UE 120 may communicate with one another in a wireless network (e.g., wireless network 100) to perform the four-step RACH procedure.

As shown by reference number 405, the base station 110 may transmit, and the UE 120 may receive, one or more SSBs and random access configuration information. In some aspects, the random access configuration information may be transmitted in and/or indicated by system information (e.g., in one or more SIBs and/or the like) and/or an SSB. Additionally, or alternatively, the random access configuration information may be transmitted in an RRC message. The random access configuration information may include one or more parameters to be used in the RACH procedure, such as one or more parameters for transmitting a RAM, one or more parameters for receiving an RAR, and/or the like.

As shown by reference number 410, the UE 120 may transmit a RAM, which may include a preamble (sometimes referred to as a random access preamble, a PRACH preamble, a RAM preamble, and/or the like). The message that includes the preamble may be referred to as a message 1, msg1, MSG1, a first message, an initial message, and/or the like in a four-step RACH procedure. The random access message may include a random access preamble identifier.

As shown by reference number 415, the base station 110 may transmit an RAR as a reply to the preamble. The message that includes the RAR may be referred to as message 2, msg2, MSG2, or a second message in a four-step RACH procedure. In some aspects, the RAR may indicate the detected random access preamble identifier (e.g., received from the UE 120 in msg1). Additionally, or alternatively, the RAR may indicate a resource allocation to be used by the UE 120 to transmit message 3 (msg3).

In some aspects, as part of the second step of the four-step RACH procedure, the base station 110 may transmit a PDCCH communication for the RAR. The PDCCH communication may schedule a PDSCH communication that includes the RAR. For example, the PDCCH communication may indicate a resource allocation for the PDSCH communication. Also, as part of the second step of the four-step RACH procedure, the base station 110 may transmit the PDSCH communication for the RAR, as scheduled by the PDCCH communication. The RAR may be included in a MAC PDU of the PDSCH communication.

As shown by reference number 420, the UE 120 may transmit an RRC connection request message. The RRC connection request message may be referred to as message 3, msg3, MSG3, or a third message of a four-step RACH procedure. In some aspects, the RRC connection request may include a UE identifier, UCI, a PUSCH communication (e.g., an RRC connection request), and/or the like.

As shown by reference number 425, the base station 110 may transmit an RRC connection setup message. The RRC connection setup message may be referred to as message 4, msg4, MSG4, or a fourth message of a four-step RACH procedure. In some aspects, the RRC connection setup message may include the detected UE identifier, timing advance information (e.g., a timing advance value, a timing advance command, and/or the like), contention resolution information, and/or the like. As shown by reference number 430, if the UE 120 successfully receives the RRC connection setup message, the UE 120 may transmit a HARQ ACK.

As indicated above, FIG. 4 is provided as an example. Other examples may differ from what is described with regard to FIG. 4.

FIG. 5 is a diagram illustrating examples 500 of PRACH preamble formats that may be used in a two-step RACH procedure or a four-step RACH procedure, in accordance with the present disclosure. For example, as described above, an initial uplink RACH communication transmitted from a UE to a base station (e.g., a msg1 communication in a four-step RACH procedure, a preamble portion of a msgA communication in a two-step RACH procedure, and/or the like) may include a preamble sequence that is generated or selected by the UE. The UE and the base station may use the preamble sequence to uniquely identify the UE during the RACH procedure. For example, the base station may use the preamble sequence and a random access radio network temporary identifier (RA-RNTI) to address a downlink RACH communication to the UE (e.g., a msg2 communication in a four-step RACH procedure, a msgB communication in a two-step RACH procedure, and/or the like).

In general, the preamble sequence transmitted in the initial uplink RACH communication may have a long sequence format or a short sequence format. Permitted formats for the preamble sequence may depend on one or more factors, such as a frequency band, a bandwidth, a subcarrier spacing, and/or the like used for communication between the UE and the base station. For example, as shown in FIG. 5, the illustrated PRACH preamble formats each have a short sequence format (e.g., an NR short sequence format) in which a cyclic prefix precedes a preamble sequence transmitted in one or more repetitions, and further in which an optional guard time may follow the one or more repetitions of the preamble sequence. In general, a duration of the cyclic prefix, a quantity of the repetitions of the preamble sequence, and a duration of the guard time (if present) may vary among the different PRACH preamble formats, which are configured to be time-aligned with an OFDM symbol boundary used for data transmissions with the same numerology as the PRACH preamble. For example, the following table provides configuration details for the various short PRACH preamble formats illustrated in FIG. 5 in cases where the short PRACH preambles all have a length of 139 bits, a subcarrier spacing is 15 kHz, and a communication bandwidth is 2.16 MHz.

or 12 OFDM symbols with a cyclic prefix (CP) aggregated at the beginning of a burst, and with or without a guard time (GT) at the end of the burst. The cyclic prefix and the guard time may typically be constrained to not be longer than the sequence, for example, to avoid a timing advance wrap-around that may create ambiguity relating to an OFDM symbol boundary expected to be time-aligned with the PRACH preamble. However, the cyclic prefix and guard time are included in the PRACH preamble to account for a round-trip delay in a cell and a delay spread due to multi-path propagation, whereby the cyclic prefix and the guard time need to be long enough to absorb the round-trip delay, the delay spread, and/or the like. In this regard, the supported cell size may generally depend on the cyclic prefix duration (e.g., a longer cyclic prefix duration may absorb a larger round-trip delay and delay spread, and thus support a larger cell size). In a similar respect, to support a target cell size, supported PRACH preamble formats may be limited to PRACH preamble formats with a cyclic prefix duration that is sufficiently long to absorb the expected round-trip delay, delay spread, and/or the like in a cell having the target cell size.

This may create challenges, however, in higher frequency bands (e.g., greater than 52.6 GHz, up to 71 GHz, and/or the like) where a large subcarrier spacing (e.g., 960 kHz, 1.92 MHz, 3.84 MHz, and/or the like) may be needed to support a larger bandwidth with the same Fast Fourier transform (FFT) size as lower frequency bands. Accordingly, although the short PRACH preamble formats can generally be proportionately scaled according to the subcarrier spacing (e.g., where a larger subcarrier spacing generally leads to a shorter symbol duration), scaling at the larger subcarrier spacing(s) expected to be used in higher frequency bands may significantly reduce the cyclic prefix duration and therefore the supportable cell size. For example, at a subcarrier spacing of 960 kHz, the cyclic prefix in a PRACH preamble having format A1 would have a duration of 0.146 μs, the cyclic prefix and guard time in a PRACH preamble having format B1 would have respective durations of 0.11 μs and 0.037 μs, and/or the like. As a result, the shorter cyclic prefix and the shorter guard time in a proportionately scaled short PRACH preamble would substantially limit the supportable round-trip time and/or delay spread, and therefore the supportable cell size.

Some techniques and apparatuses described herein enable support for a larger cell size in higher bands or using a larger subcarrier spacing. In some aspects, a legacy PRACH pre-

TABLE 1

Short PRACH preamble formats

| Preamble format | 1 sequence duration (μs) | Sequence repetitions | Total sequence duration (μs) | CP duration (μs) | GT duration (μs) | Total duration (μs) | OFDM symbols |
|---|---|---|---|---|---|---|---|
| A1 | 66.67 | 2 | 133.33 | 9.375 | 0 | 142.71 | 2 |
| A2 | 66.67 | 4 | 266.67 | 18.75 | 0 | 285.42 | 4 |
| A3 | 66.67 | 6 | 400 | 28.125 | 0 | 428.13 | 6 |
| B1 | 66.67 | 2 | 133.33 | 7.031 | 2.344 | 142.71 | 2 |
| B2 | 66.67 | 4 | 266.67 | 11.719 | 7.031 | 285.42 | 4 |
| B3 | 66.67 | 6 | 40 | 16.406 | 11.719 | 428.125 | 6 |
| B4 | 66.67 | 12 | 800 | 30.469 | 25.781 | 856.25 | 12 |
| C0 | 66.67 | 1 | 66.67 | 40.36 | 35.677 | 142.71 | 2 |
| C2 | 66.67 | 4 | 266.67 | 66.67 | 94.922 | 428.26 | 6 |

Accordingly, as shown in FIG. 5 and in Table 1, a PRACH preamble having a short format may generally cover 2, 4, 6, amble format may be used by a UE to maintain backward compatibility, and a base station may adjust or modify a PRACH detection window, used to detect a PRACH preamble, to enable support for a larger cell size. In some aspects, one or more new PRACH preamble formats may be used to enable support for a larger cell size. In some aspects, multiple PRACH preambles may be used in connection with one another to enable support for a larger cell size. In this way, the base station may support a cell that can operate at a high frequency, a large subcarrier spacing, a large bandwidth, and/or the like without having to proportionately scale the PRACH preamble in a manner that may otherwise limit the supportable cell size due to the shorter symbol duration.

As indicated above, FIG. 5 is provided as an example. Other examples may differ from what is described with respect to FIG. 5.

Figure 6:
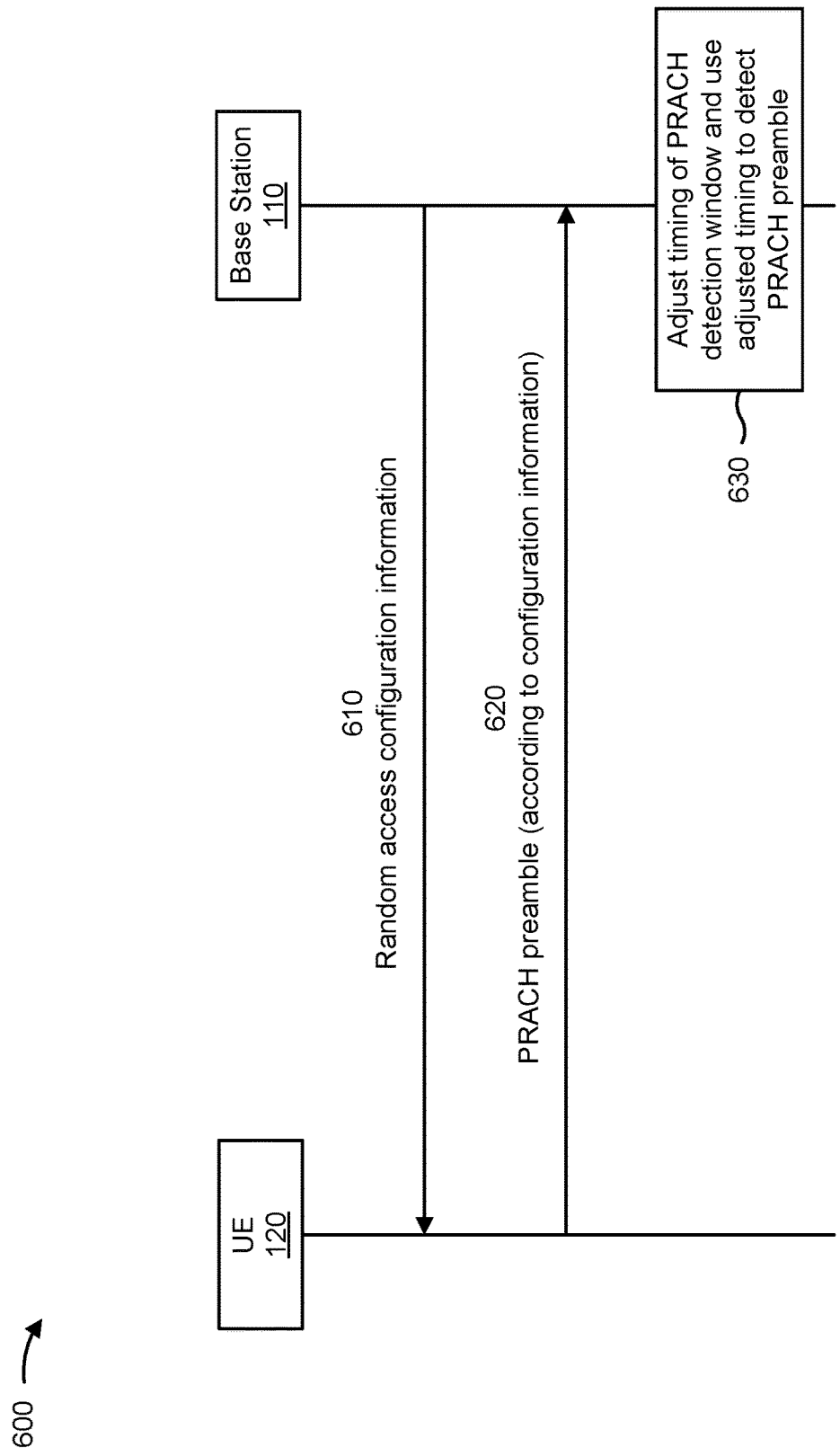
FIGS. 6-11 are diagrams illustrating examples of physical random access channel preamble transmission and detection for large subcarrier spacing, in accordance with the present disclosure.

FIG. 6 is a diagram illustrating an example 600 of physical random access channel preamble transmission and detection for large subcarrier spacing, in accordance with the present disclosure. As shown in FIG. 6, a UE 120 and a base station 110 may communicate with one another.

As shown by reference number 610, the base station 110 may transmit, and the UE 120 may receive, random access configuration information. The random access configuration information may include a PRACH preamble configuration. The PRACH preamble configuration may indicate one or more PRACH preamble formats (sometimes referred to herein as preamble formats) for a cell used for communications between the UE 120 and the base station 110. For example, the PRACH preamble configuration may indicate one or more preamble formats that are permitted or allowed in the cell. In some aspects, the random access configuration information may be transmitted in and/or indicated by system information (e.g., in one or more SIBs and/or the like) and/or an SSB (e.g., for initial network access). Additionally, or alternatively, the random access configuration information may be transmitted in an RRC message (e.g., for a handover). In general, as described above, the random access configuration information may include parameters to be used in the RACH procedure, such as parameters for transmitting a random access message, receiving a random access response (RAR) to the random access message, and/or the like.

The PRACH preamble configuration may indicate a set of (e.g., one or more) PRACH preamble formats for the cell. A PRACH preamble format may define a cyclic prefix duration for a cyclic prefix of a PRACH preamble that uses the PRACH preamble format, a guard time duration for a PRACH preamble that uses the PRACH preamble format, a number of repetitions of a sequence for a PRACH preamble that uses the PRACH preamble format, and/or the like, as described above in connection with FIG. 5. In some aspects, the set of PRACH preamble formats may include a set of NR short PRACH formats, which may have a numerology that is scaled in proportion with a numerology used for the cell (e.g., a numerology used for data on the cell, a numerology used for SSBs on the cell, and/or the like).

As shown by reference number 620, the UE 120 may transmit, and the base station 110 may receive, a PRACH preamble according to the configuration. For example, the PRACH preamble may have and/or be transmitted in accordance with a preamble format that defines a cyclic prefix duration for a cyclic prefix of the PRACH preamble, a guard time duration for the PRACH preamble, a number of repetitions of a sequence for the PRACH preamble, and/or the like. The UE 120 may transmit the PRACH preamble in a PRACH occasion (sometimes referred to as a RACH occasion). In some aspects, the preamble format is an NR short PRACH format, which may have a numerology that is scaled in proportion with a numerology used for the cell.

As shown by reference number 630, the base station 110 may adjust a timing of a PRACH detection window used to detect the PRACH preamble. The PRACH detection window may be used to account for timing misalignments between the UE 120 and the base station 110. For example, the PRACH detection window may be used to account for timing misalignments between transmission of the PRACH preamble by the UE 120 and reception of the PRACH preamble by the base station 110 (e.g., due to varying distances of different UEs 120 to the base station 110, varying locations of UEs 120 within a cell of the base station 110, and/or the like).

The base station 110 may use the adjusted timing of the PRACH detection window to detect the PRACH preamble transmitted by the UE 120 (e.g., to determine a timing associated with PRACH preamble transmission, to determine a timing advance value to be indicated to the UE 120, and/or the like). For example, the base station 110 may use the adjusted timing of the PRACH detection window to detect symbol boundaries of the PRACH preamble and/or boundaries between sequence repetitions of the PRACH preamble. In some aspects, the base station 110 may adjust the timing of the PRACH detection window based at least in part on the PRACH preamble being received in a cell with a subcarrier spacing that is greater than or equal to (i.e., satisfies) a threshold (e.g., 960 kHz).

In some aspects, the base station 110 may adjust a timing of the PRACH detection window by extending a duration of the cyclic prefix to be longer than the cyclic prefix duration defined by the preamble format. Additionally, or alternatively, the base station 110 may adjust a timing of the PRACH detection window by allocating one or more guard symbols to create a guard time with a duration that is longer than the guard time duration defined by the preamble format. Additional details are described below in connection with FIGS. 7 and 8. Additionally, or alternatively, the base station 110 may adjust the timing of the PRACH detection window based at least in part on a preamble format used for the PRACH preamble. For example, the base station 110 may extend one or more guard symbols into a last repetition of the sequence within the PRACH preamble for a first set of preamble formats (as described below in connection with FIG. 8), and may allocate one or more guard symbols to an adjacent slot that follows a slot that includes the PRACH preamble for a second set of preamble formats (as described below in connection with FIG. 7).

As indicated above, FIG. 6 is provided as an example. Other examples may differ from what is described with respect to FIG. 6.

Figure 7:
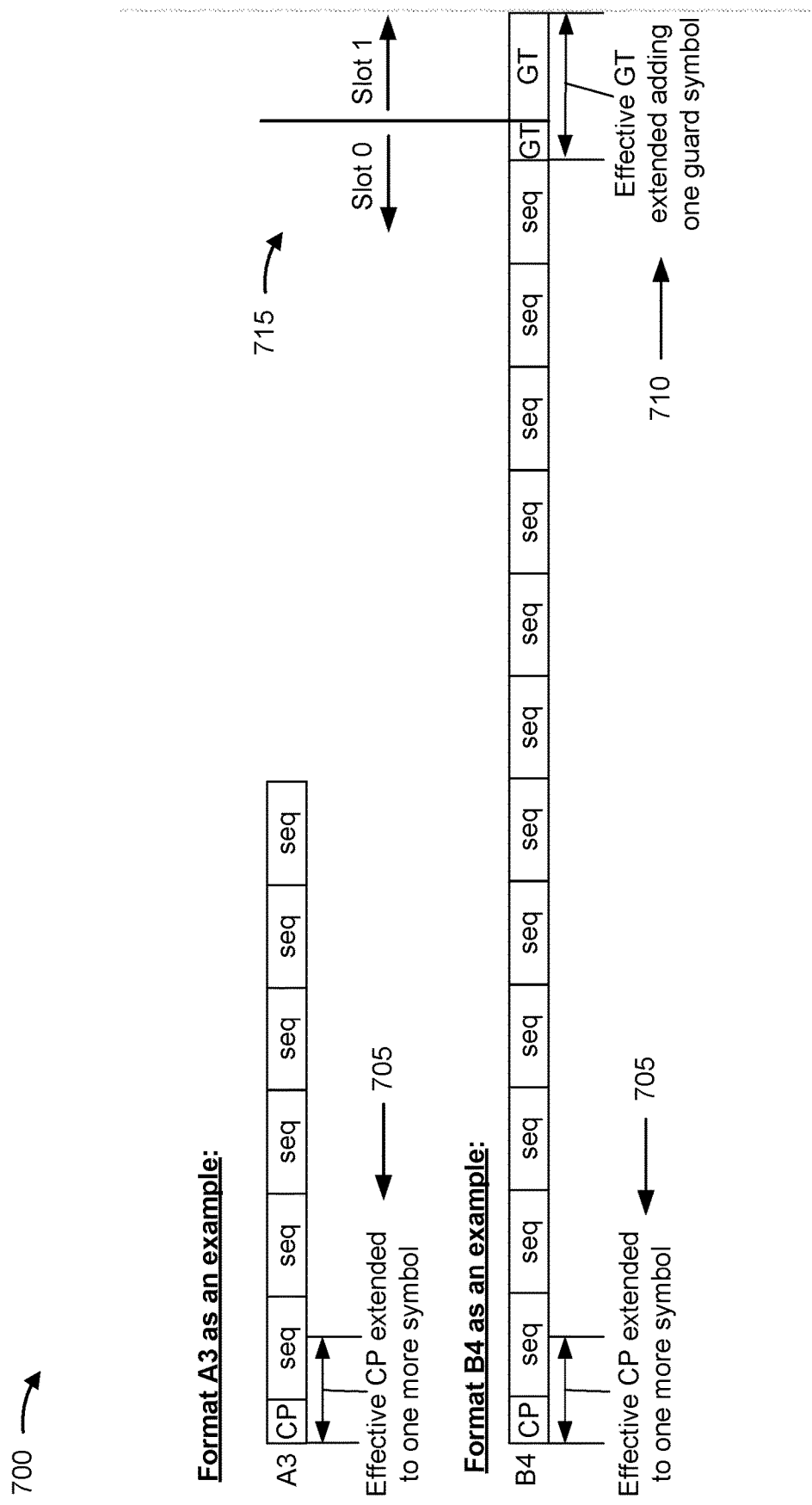

FIG. 7 is a diagram illustrating an example 700 of physical random access channel preamble transmission and detection for large subcarrier spacing, in accordance with the present disclosure.

As shown by reference number 705, in some aspects, the base station 110 may adjust a timing of the PRACH detection window by extending a duration of the cyclic prefix to be longer than the cyclic prefix duration defined by the preamble format. The duration of the cyclic prefix used by the base station 110 for detection of a PRACH preamble may be referred to as an effective cyclic prefix, which may have a different duration than a cyclic prefix duration defined for the PRACH preamble by a preamble format of the PRACH preamble. The base station 110 may extend the cyclic prefix duration up to a length of a sequence (e.g., by adding one or more symbols to the effective cyclic prefix).

As shown, in some aspects, the duration of the effective cyclic prefix extends into a first repetition of the sequence within the PRACH preamble (e.g., an initial occurrence of repetition of the sequence within the PRACH preamble). Thus, one or more symbols used by the UE 120 to transmit a sequence may be used or interpreted by the base station 110 as a cyclic prefix.

As shown by reference number 710, the base station 110 may adjust a timing of the PRACH detection window by allocating one or more guard symbols to create a guard time with a duration that is longer than the guard time duration defined by the preamble format. The duration of the guard time used by the base station 110 for detection of a PRACH preamble (e.g., to protect other communications from interference) may be referred to as an effective guard time, which may have a different duration than a guard time duration defined for the PRACH preamble by a preamble format of the PRACH preamble. In some aspects, the base station 110 may allocate a single guard symbol to create the guard time.

As shown by reference number 715, in some aspects, the base station 110 allocates the one or more guard symbols to an adjacent slot (shown as Slot 1 in FIG. 7) that follows a slot (shown as Slot 0 in FIG. 7) that includes the PRACH preamble. This may maintain a final repetition of a sequence within the PRACH preamble, which may allow for greater cell coverage than truncating the final repetition with the one or more guard symbols. However, this may impose a constraint on the adjacent slot (Slot 1), such as by causing interference in the adjacent slot or reducing scheduling opportunities in the adjacent slot. To prevent this, in some aspects, the base station 110 configures only PRACH preamble formats that do not require extension of a guard time into the adjacent slot (e.g., PRACH preamble formats that do not include a guard time).

Additionally, or alternatively, the allocation of the one or more guard symbols may be cell-specific. For example, the base station 110 may not allocate the one or more guard symbols in a first cell, may allocate the one or more guard symbols to the adjacent slot (Slot 1) in a second cell, may allocate the one or more guard symbols to a slot that includes the PRACH preamble (such as by truncating a final repetition of the sequence) in a third cell, and/or the like. In some aspects, if the base station 110 allocates the one or more guard symbols to the adjacent slot, then the base station 110 may truncate or shift (e.g., by a number of symbols equal to the number of allocated guard symbols, such as one symbol for a single guard symbol) a communication that is scheduled or configured to occur in the allocated one or more guard symbols. For example, the base station 110 may truncate or shift a communication that occurs at the beginning of (e.g., in an initial symbol of) the adjacent slot. The communication may be a communication on a control resource set (CORESET), a PDCCH communication, a PDSCH communication, and/or the like. In this way, the base station 110 may mitigate interference.

As indicated above, FIG. 7 is provided as an example. Other examples may differ from what is described with respect to FIG. 7.

Figure 8:
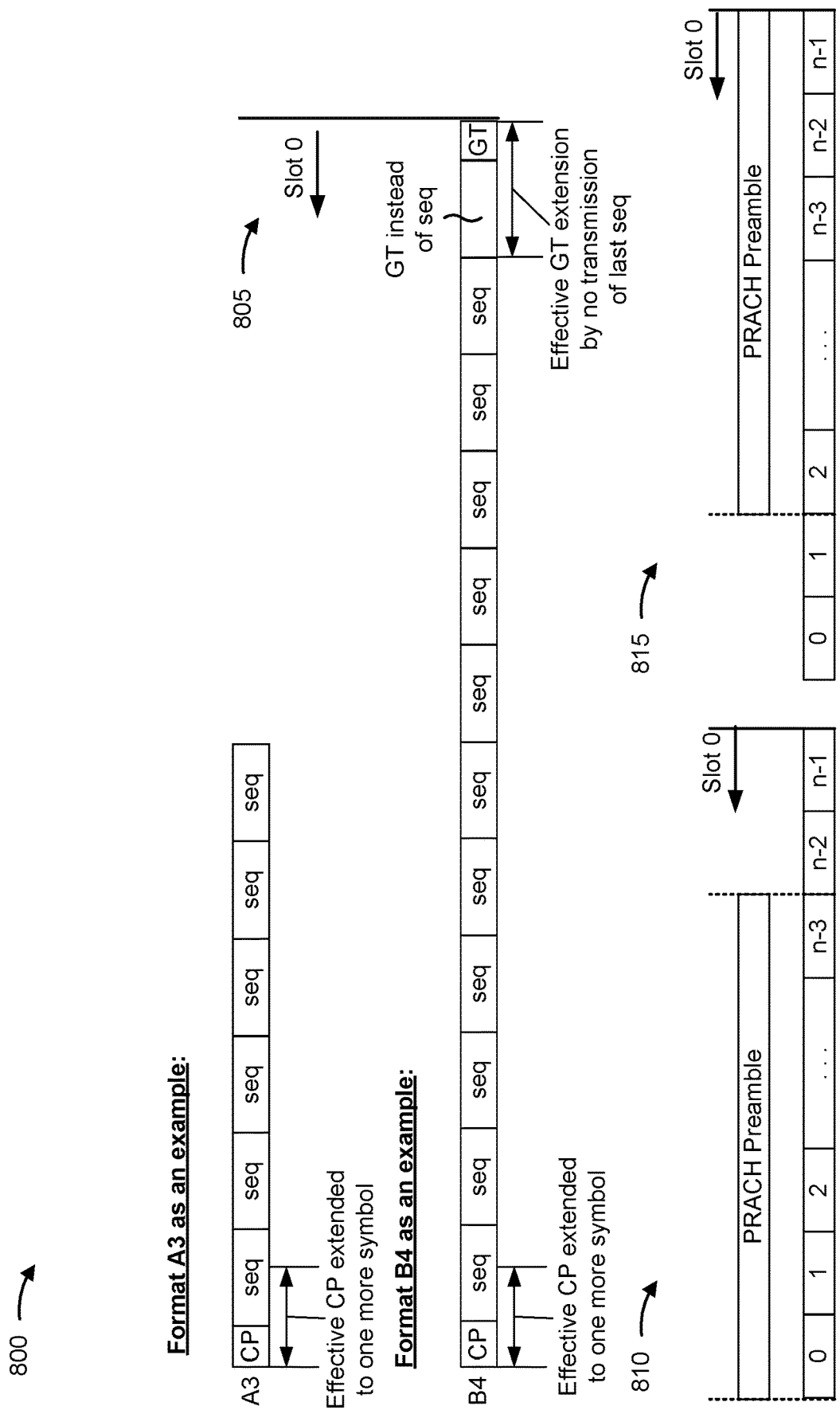

FIG. 8 is a diagram illustrating an example 800 of physical random access channel preamble transmission and detection for large subcarrier spacing, in accordance with the present disclosure.

As shown by reference number 805, in some aspects, the base station 110 allocates the one or more guard symbols to the slot (shown as Slot 0 in FIG. 8) that includes the PRACH preamble. For example, the base station 110 may extend the guard time into a last repetition of a sequence within the PRACH preamble. In this case, the base station 110 may truncate one or more symbols allocated to the last repetition according to the preamble format, and may use those one or more symbols as the one or more guard symbols. This may prevent interference in an adjacent slot that follows the slot that includes the PRACH preamble, or may increase scheduling flexibility in the adjacent slot.

In some aspects, the base station 110 adjusts the timing of the PRACH detection window based at least in part on a preamble format used for the PRACH preamble. For example, the base station 110 may extend one or more guard symbols into a last repetition of the sequence within the PRACH preamble for a first set of preamble formats (as described in connection with FIG. 8), and may allocate one or more guard symbols to an adjacent slot that follows a slot that includes the PRACH preamble for a second set of preamble formats (as described in connection with FIG. 7).

In some aspects, the base station 110 may adjust the timing of the PRACH detection window by extending one or more guard symbols into a last repetition of the sequence within the PRACH preamble for a first set of preamble formats based at least in part on an alignment of a PRACH preamble to a slot boundary. For example, a slot boundary may separate a slot during which a PRACH preamble is received (e.g., "slot 0"), and a next adjacent slot. The PRACH preamble may either be aligned with the slot boundary or not be aligned with the slot boundary. As shown by reference number 810, a first alignment corresponds to a PRACH preamble not being aligned with a slot boundary. For example, with reference to first alignment 810, one or more symbols may be between the end of the PRACH preamble and the slot boundary. As shown by reference number 815, a second alignment corresponds to a PRACH preamble being aligned with a slot boundary. For example, with reference to second alignment 815, there are no symbols between the end of the PRACH preamble and the slot boundary (e.g., the end of the PRACH preamble is aligned with the slot boundary).

In some aspects, the base station 110 may determine the alignment of PRACH preamble to the slot boundary based on a starting symbol of PRACH preamble. For example, PRACH preamble format B4 may only be configured to begin at symbol 0 or symbol 2 of a corresponding slot, and may have a length that spans all but two symbols of the slot. Thus, with respect to first alignment 810, the PRACH preamble may start at symbol 0 and end before symbol n−2, such that PRACH preamble is not detected during symbol n−2 and symbol n−1 (e.g., and is not aligned with the slot boundary), where n is the number of symbols in the slot. For example, for a slot that includes 14 symbols (e.g., where n is 14), the PRACH preamble may span from symbol 0 to symbol 11 in the first alignment 810. Alternatively, with respect to second alignment 815, the PRACH preamble may start at symbol 2 and may span symbol 2 through symbol n−1 (e.g., and is therefore aligned with the slot boundary). For example, for a slot that includes 14 symbols (e.g., where n is 14), the PRACH preamble may span from symbol 2 to symbol 13 in the second alignment 815.

If the base station 110 determines that PRACH preamble is aligned with the slot boundary (e.g., if the second alignment 815 is detected), then the base station 110 may truncate the last repetition of the sequence and extend the guard time by using the time period associated with the last repetition of the sequence, as described above. However, if the base station 110 determines that PRACH preamble is not aligned with the slot boundary (e.g., if the first alignment 810 is detected), then the base station 110 may not truncate the last repetition of the sequence and extend the guard time to enhance a detection process. In some aspects, if no alignment is detected (e.g., if the first alignment 810 is detected), then the base station 110 may allocate one or more guard symbols to one or more symbols that follow the PRACH preamble in the slot (e.g., slot 0), in a similar manner as described above in connection with FIG. 7. This may maintain a final repetition of the sequence within PRACH preamble (e.g., the $12^{th}$ repetition for format B4), which may allow for greater cell coverage than truncating the final repetition with the one or more guard symbols. However, if PRACH preamble were aligned with a slot boundary, this may impose a constraint on the adjacent slot (e.g., slot 1), such as by causing interference in the adjacent slot or reducing scheduling opportunities in the adjacent slot. To prevent this constraint on the adjacent slot, the base station 110 may only allocate the one or more guard symbols if the PRACH preamble is not aligned with a slot boundary, such that the one or more guard symbols are allocated from remaining symbols of the slot that includes the PRACH preamble (e.g., slot 0).

As a result, the base station 110 may be enabled to selectively adjusting a PRACH detection window based at least in part on an alignment of a PRACH preamble to a slot boundary. For example, if extending the guard time duration by allocating one or more guard symbols to one or more symbols following PRACH preamble will not negatively impact the adjacent slot (e.g., if PRACH preamble is not aligned with a slot boundary), then the base station 110 may allocate the one or more guard symbols to the one or more following symbols. This form of guard time extension (e.g., PRACH detection window adjustment) maintains all of the repetitions of the sequence, which may allow for greater cell coverage than truncating the final sequence. Alternatively, if this form of guard time extension will negatively impact the adjacent slot (e.g., if the PRACH preamble is aligned with a slot boundary), then the base station 110 may instead truncate the final repetition of the sequence and use one or more symbols allocated to the last repetition as the one or more guard symbols.

As indicated above, FIG. 8 is provided as an example. Other examples may differ from what is described with respect to FIG. 8.

Figure 9:
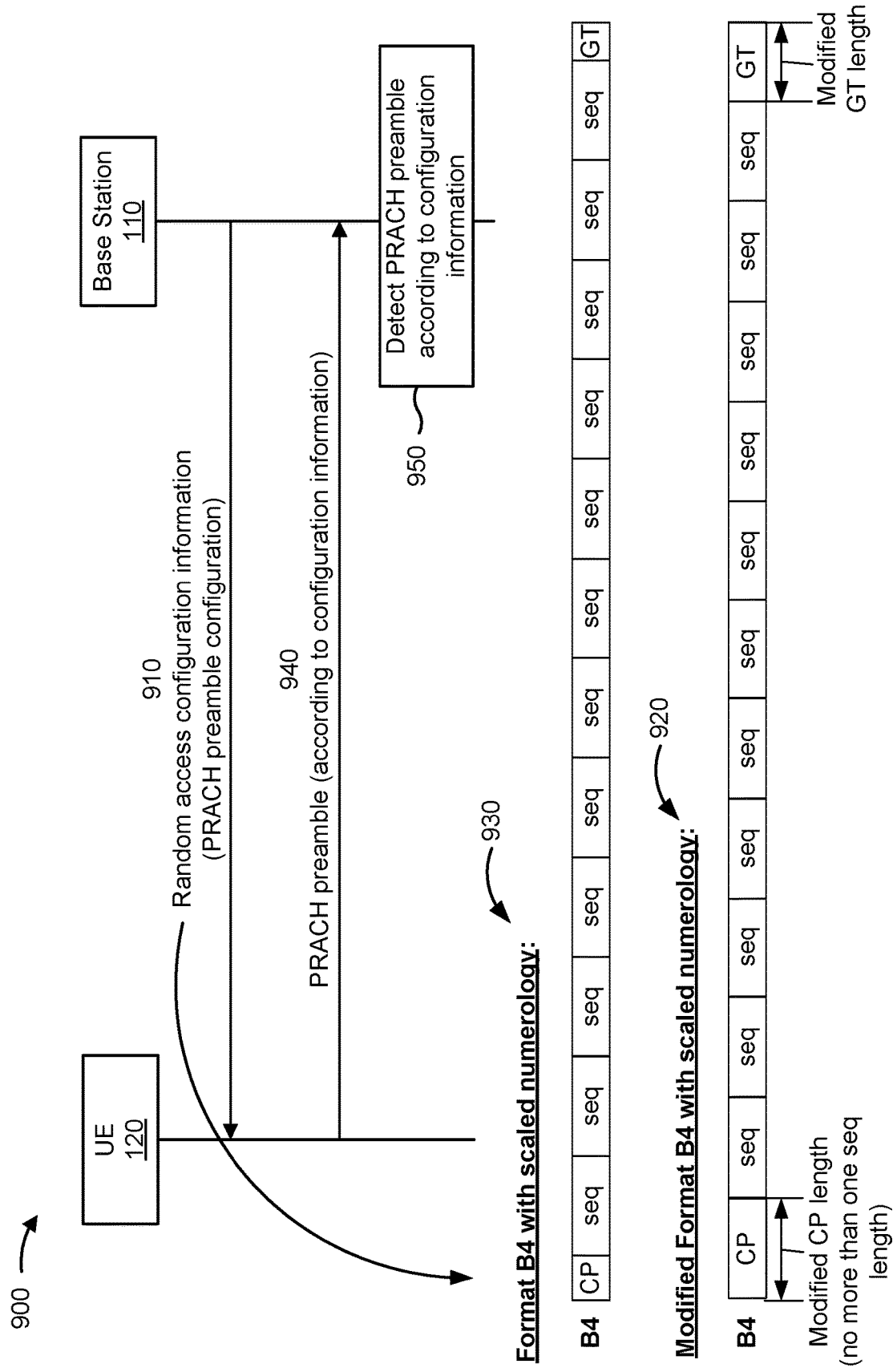

FIG. 9 is a diagram illustrating an example 900 of physical random access channel preamble transmission and detection for large subcarrier spacing, in accordance with the present disclosure. As shown in FIG. 9, a UE 120 and a base station 110 may communicate with one another.

As shown by reference number 910, the base station 110 may transmit, and the UE 120 may receive, random access configuration information. The random access configuration information may include a PRACH preamble configuration, as described above in connection with FIG. 6. In some aspects, the PRACH preamble configuration indicates at least one preamble format 920 that defines a smaller number of repetitions of a sequence, for a PRACH preamble and for a subcarrier spacing that satisfies a threshold, as compared to a corresponding legacy preamble format 930 for a subcarrier spacing that does not satisfy the threshold. In some aspects, the preamble format 920 and the corresponding preamble format 930 may be NR short PRACH formats, and may have numerologies that are scaled in proportion with a numerology used for the cell (e.g., a numerology used for data on the cell, a numerology used for SSBs on the cell, and/or the like). As used herein, the preamble format 920 may be referred to as a new preamble format, and the corresponding preamble format 930 may be referred to as a legacy preamble format or a corresponding legacy preamble format. The new preamble format and the corresponding legacy preamble format may have the same preamble format identifier (shown as B4 in FIG. 9).

In some aspects, the new preamble format 920 may be an extension of format B4 (e.g., for subcarrier spacings that do not satisfy the threshold) or a new PRACH preamble format B5 that is defined at least for subcarrier spacings that satisfy the threshold. Information for extended format B4/format B5 is provided in Table 2 below.

TABLE 2

Short PRACH preamble format

| Format | SCS 960 KHz GT (µs) | Number of sequences |
|---|---|---|
| B4 (for SCS ≥ 960 KHz)/B5 | 1.4445 | 11 |

In example 900, the new preamble format 920 includes eleven repetitions of a sequence (e.g., as shown in Table 2), and the legacy preamble format 930 includes twelve repetitions of the sequence. In some implementations, the new preamble format 920 may define different numbers of repetitions of the sequence, such that new preamble format 920 defines a smaller number of repetitions of the sequence as compared to legacy preamble format 930. The new preamble format 920 may be used for subcarrier spacings (SCSs) that satisfy a threshold (e.g., that are greater than or equal to a threshold), such as 960 kHz, and the legacy preamble format 930 may be used for SCSs that do not satisfy the threshold (e.g., are less than the threshold). The smaller number of repetitions in the new preamble format 920 may be due to a cyclic prefix extension and/or a guard time extension, as described above in connection with FIGS. 6-8.

For example, the new preamble format 920 for the subcarrier spacing that satisfies the threshold may define a cyclic prefix duration, for a cyclic prefix of the PRACH preamble, that is longer than a cyclic prefix duration defined by the corresponding legacy preamble format 930 for the subcarrier spacing that does not satisfy the threshold. Additional details regarding this cyclic prefix extension are described above in connection with FIGS. 6-8. For example, the cyclic prefix duration, for the cyclic prefix of the PRACH preamble, may be extended up to a length of the sequence.

Additionally, or alternatively, the new preamble format 920 for the subcarrier spacing that satisfies the threshold may define a guard time duration, for a guard time of the PRACH preamble, that is longer than a guard time duration defined by the corresponding legacy preamble format 930 for the subcarrier spacing that does not satisfy the threshold. Additional details regarding this cyclic prefix extension are described above in connection with FIGS. 6-8. For example, the guard time may be extended by allocating one or more guard symbols into a last repetition of the corresponding legacy preamble format 930 and truncating the last repetition. In some aspects, the new preamble format 920 may define a longer guard time duration and a same cyclic prefix duration as compared to the corresponding legacy preamble format 930 (e.g., the new preamble format 920 may occupy twelve symbols with a same CP as the legacy preamble format 930, but may have eleven repetitions of a sequence rather than twelve).

As shown by reference number 940, the UE 120 may transmit, and the base station 110 may receive, a PRACH preamble according to the configuration. For example, the PRACH preamble may have and/or may be transmitted in accordance with a preamble format that includes the smaller number of repetitions of the sequence (e.g., for a subcarrier spacing that satisfies a threshold). The UE 120 may transmit the PRACH preamble in a PRACH occasion. In some aspects, the preamble format is an NR short PRACH format, which may have a numerology that is scaled in proportion with a numerology used for the cell.

As shown by reference number 950, the base station 110 may receive and/or detect the PRACH preamble based at least in part on the PRACH preamble configuration. For example, the PRACH preamble may have and/or may be received in accordance with a preamble format that includes the smaller number of repetitions of the sequence (e.g., for a subcarrier spacing that satisfies a threshold). The base station 110 may use the detected PRACH preamble transmitted by the UE 120 to determine a timing associated with PRACH preamble transmission, to determine a timing advance value to be indicated to the UE 120, and/or the like. For example, the base station 110 may use the detected PRACH preamble to determine symbol boundaries of the PRACH preamble and/or boundaries between sequence repetitions of the PRACH preamble. In this way, timing misalignments may be resolved.

As indicated above, FIG. 9 is provided as an example. Other examples may differ from what is described with respect to FIG. 9.

Figure 10:
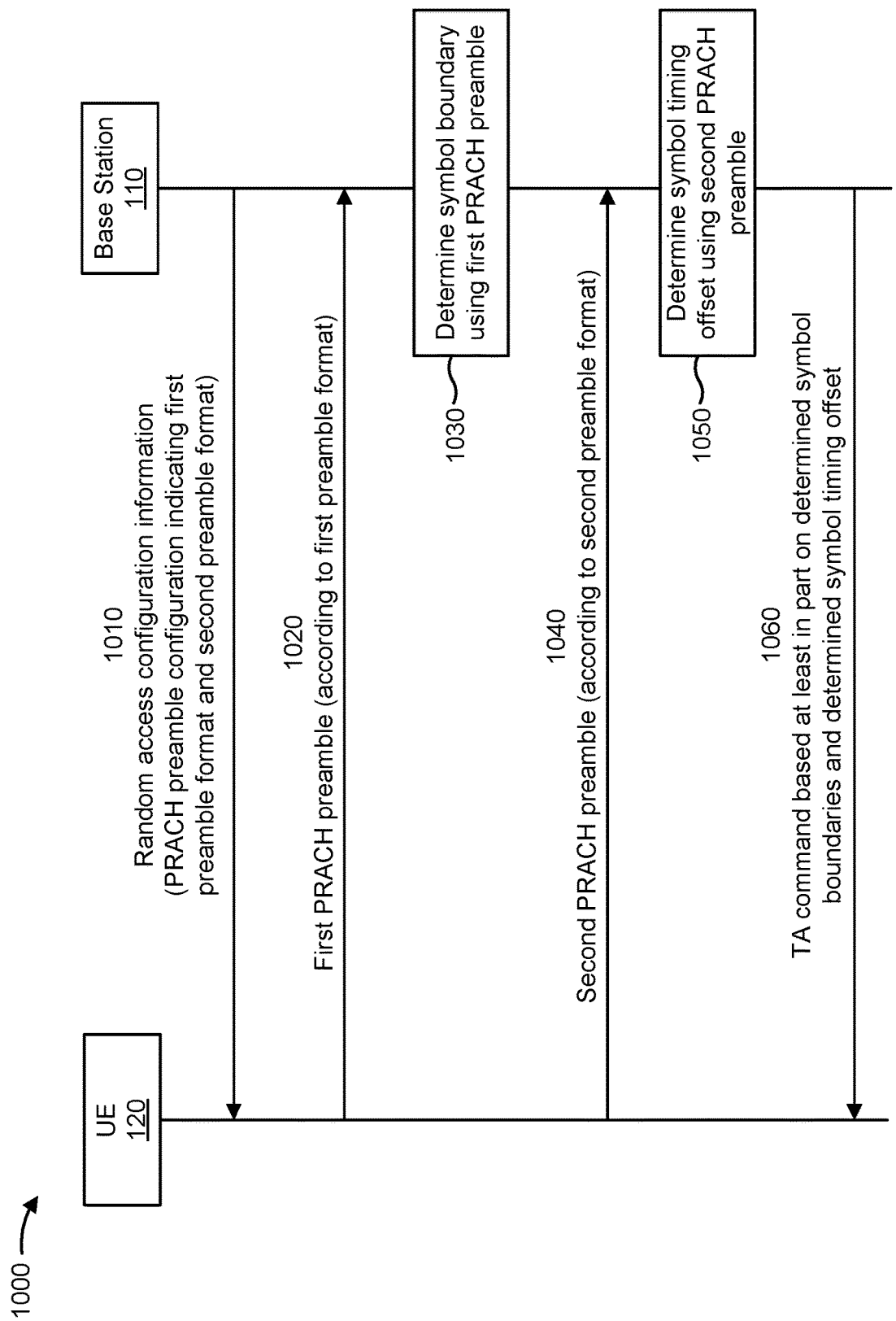

FIG. 10 is a diagram illustrating an example 1000 of physical random access channel preamble transmission and detection for large subcarrier spacing, in accordance with the present disclosure. As shown in FIG. 10, a UE 120 and a base station 110 may communicate with one another.

As shown by reference number 1010, the base station 110 may transmit, and the UE 120 may receive, random access configuration information. The random access configuration information may include a PRACH preamble configuration, as described above in connection with FIG. 6. In some aspects, the PRACH preamble configuration indicates a first preamble format (or a set of first preamble formats) for a first PRACH preamble and a second preamble format (or a set of second preamble formats) for a second PRACH preamble. The first preamble format may be different than the second preamble format.

As shown by reference number 1020, the UE 120 may transmit, and the base station 110 may receive, a first PRACH preamble, as part of a random access procedure, according to the configuration. For example, the first PRACH preamble may have and/or may be transmitted in accordance with a first preamble format indicated in the PRACH preamble configuration. The UE 120 may transmit the first PRACH preamble in a PRACH occasion. In some aspects, the first preamble format is an NR short PRACH format, which may have a numerology that is scaled in proportion with a numerology used for the cell. In some aspects, the first preamble format defines a smaller number of repetitions of a sequence, for the first PRACH preamble and for a subcarrier spacing that satisfies a threshold, as compared to a corresponding preamble format for a subcarrier spacing that does not satisfy the threshold, as described above in connection with FIG. 9. For example, the first PRACH preamble may have the new preamble format 920.

As shown by reference number 1030, the base station 110 may receive and/or detect the first PRACH preamble based at least in part on the PRACH preamble configuration, and may use the first PRACH preamble to determine symbol boundaries and/or boundaries between sequences repetitions associates with transmissions of the UE 120. For example, the first PRACH preamble may have and/or may be received in accordance with a first preamble format indicated in the PRACH preamble configuration. The base station 110 may use the detected PRACH preamble transmitted by the UE 120 to determine a symbol-level timing associated with the UE 120. For example, the first PRACH preamble may enable the base station 110 to differentiate and/or resolve timing ambiguities with a granularity less than or equal to a symbol duration (which is equal to one divided by SCS, or 1/SCS).

In some aspects, the base station 110 may use one or more techniques described above in connection with FIGS. 6-9 to receive the first PRACH preamble and/or to determine a symbol boundary. For example, the base station 110 may adjust a timing of a PRACH detection window used to detect the first PRACH preamble, as described above in connection with FIGS. 6-8. This may include extending a duration of a cyclic prefix of the first PRACH preamble to be longer than a cyclic prefix duration defined by the first preamble format, allocating one or more guard symbols to create a guard time with a duration that is longer than a guard time duration defined by the first preamble format, and/or the like. Alternatively, the first preamble format may define a smaller number of repetitions of a sequence, for the first PRACH preamble and for a subcarrier spacing that satisfies a threshold, as compared to a corresponding preamble format for a subcarrier spacing that does not satisfy the threshold, as described above in connection with FIG. 9.

As shown by reference number 1040, the UE 120 may transmit, and the base station 110 may receive, a second PRACH preamble, as part of the random access procedure (e.g., the same random access procedure that involves transmission of the first PRACH preamble), according to the configuration. For example, the second PRACH preamble may have and/or may be transmitted in accordance with a second preamble format indicated in the PRACH preamble configuration. The UE 120 may transmit the second PRACH preamble in a PRACH occasion (e.g., the same PRACH occasion or a different PRACH occasion than the first PRACH preamble). In some aspects, the second preamble format is an NR short PRACH format, which may have a numerology that is scaled in proportion with a numerology used for the cell. In some aspects, the second PRACH preamble is transmitted in a slot (e.g., an adjacent slot) that follows transmission of the first PRACH preamble. Alternatively, the second PRACH preamble may be transmitted based at least in part on a time offset and/or a frequency offset with respect to the first PRACH preamble, as described in more detail below in connection with FIG. 11.

As shown by reference number 1050, the base station 110 may receive and/or detect the second PRACH preamble based at least in part on the PRACH preamble configuration, and may use the second PRACH preamble to determine a symbol timing offset associated with transmissions of the UE 120. For example, the second PRACH preamble may have and/or may be received in accordance with a second preamble format indicated in the PRACH preamble configuration. The base station 110 may use the detected PRACH preamble transmitted by the UE 120 to determine a timing associated with the UE 120. For example, the second PRACH preamble may enable the base station 110 to differentiate and/or resolve timing ambiguities with a granularity greater than or equal to a symbol.

As shown by reference number 1060, the base station 110 may transmit, and the UE 120 may receive, a timing advance (TA) command based at least in part on the symbol boundary (determined using the first PRACH preamble) and based at least in part on the symbol timing offset (determined using the second PRACH preamble). For example, the base station 110 may use the first PRACH preamble to detect a timing t that is less than or equal to a symbol duration (1/SCS). The base station 110 may use the second PRACH preamble to detect a timing ambiguity k/SCS, where k=0, 1, . . . M. The base station may indicate a TA, in the TA command, that is equal to t+k/SCS. In other words, the TA may be based at least in part on the symbol boundary offset t and a symbol timing offset k/SCS. In this way, timing misalignments may be resolved.

As indicated above, FIG. 10 is provided as an example. Other examples may differ from what is described with respect to FIG. 10.

Figure 11:
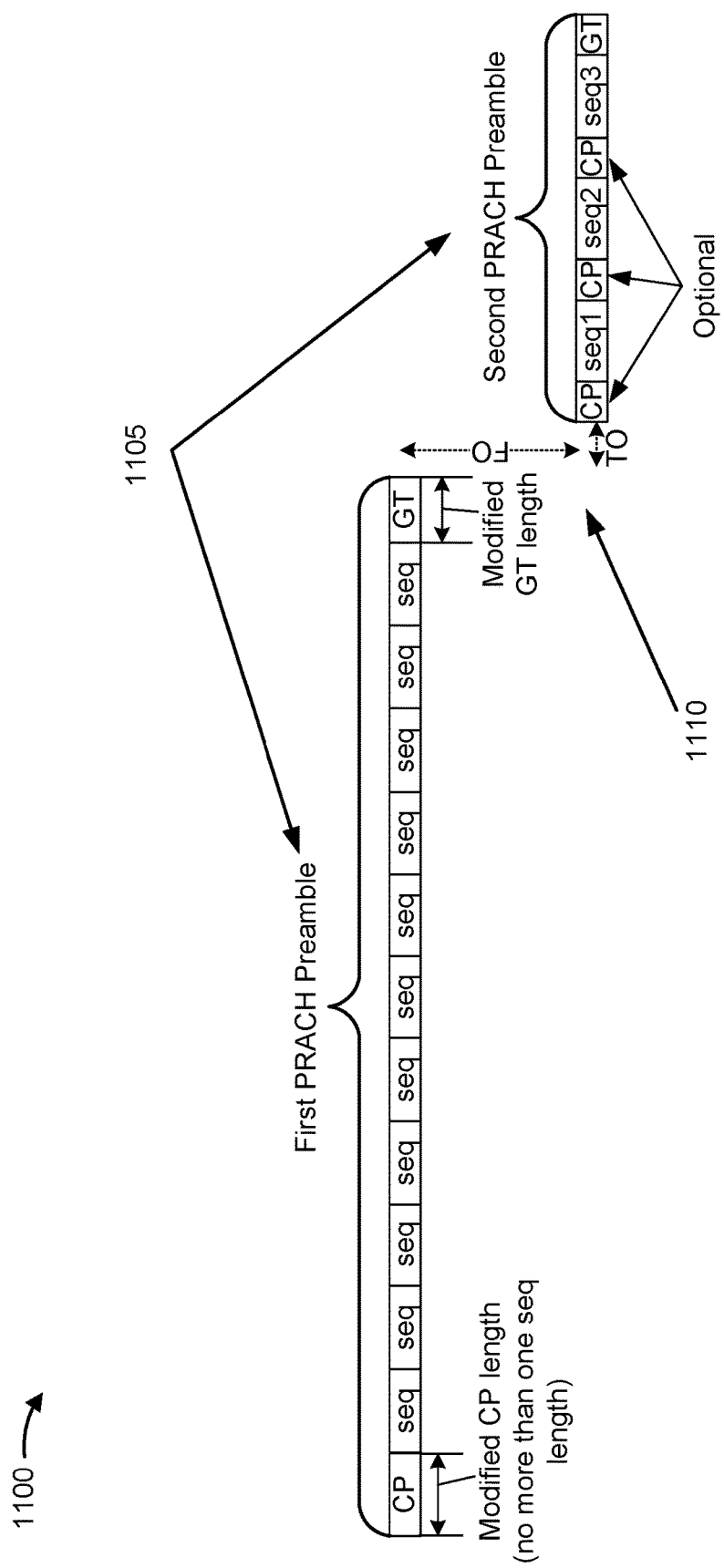

FIG. 11 is a diagram illustrating an example 1100 of physical random access channel preamble transmission and detection for large subcarrier spacing, in accordance with the present disclosure.

As shown by reference number 1105, a random access procedure may include transmission and reception of a first PRACH preamble and a second PRACH preamble, as described above in connection with FIG. 10. The first PRACH preamble and/or the second PRACH preamble may have an NR short PRACH format, which may have a numerology that is scaled in proportion with a numerology used for a cell on which the first PRACH preamble and the second PRACH preamble are transmitted and received. In some aspects, the first PRACH preamble and the second PRACH preamble are transmitted and received in a same RACH occasion (e.g., to indicate a relationship between the PRACH preambles, to conserve network resources, and/or the like). In some aspects, the first PRACH preamble and the second PRACH preamble are transmitted and received in different RACH occasions (e.g., to permit less complex differentiation between the PRACH preambles).

As shown, the first PRACH preamble may follow a format and/or may be detected in accordance with a technique described above in connection with FIGS. 6-9. For example, the base station 110 may adjust a timing of a PRACH detection window used to detect the first PRACH preamble, as described above in connection with FIGS. 6-8. This may include extending a duration of a cyclic prefix of the first PRACH preamble to be longer than a cyclic prefix duration defined by the first preamble format, allocating one or more guard symbols to create a guard time with a duration that is longer than a guard time duration defined by the first preamble format, and/or the like. Alternatively, the first preamble format may define a smaller number of repetitions of a sequence, for the first PRACH preamble and for a subcarrier spacing that satisfies a threshold, as compared to a corresponding preamble format for a subcarrier spacing that does not satisfy the threshold, as described above in connection with FIG. 9.

As described above, in some aspects, the second PRACH preamble is transmitted in an adjacent slot that follows transmission of the first PRACH preamble. In some aspects, the second PRACH preamble is transmitted immediately after the first PRACH preamble (e.g., is appended in time to the first PRACH preamble). Alternatively, as shown by reference number 1110, the second PRACH preamble may be transmitted based at least in part on a time offset (shown as TO in FIG. 11) and/or a frequency offset (shown as FO in FIG. 11) with respect to the first PRACH preamble. In some aspects, the time offset and/or the frequency offset may be indicated in the PRACH preamble configuration.

In some aspects, the second preamble format, used for the second PRACH preamble, defines one or more repetitions of a sequence over one or more symbols for the second PRACH preamble. A sequence in the second PRACH preamble may be a Zadoff-Chu sequence (ZC sequence) type, a maximum length sequence (M-sequence) type, a pseudo-noise sequence (PN sequence) type, and/or the like. In some aspects, the PRACH preamble configuration and/or the second preamble format may indicate a sequence type for one or more sequences included in the second PRACH preamble.

In some aspects, the second preamble format defines fewer repetitions of a sequence than the first preamble format used for the first PRACH preamble. In example 1100, the first preamble format defines eleven repetitions for a sequence included in the first PRACH preamble, and the second preamble format defines one repetition (e.g., a single transmission) for each of three sequences included in the second PRACH preamble. In some aspects, the second preamble format defines a shorter cyclic prefix duration and/or a shorter guard time than the first preamble format, which conserves network resources.

In some aspects, the second preamble format defines multiple sequences to be transmitted in the second PRACH preamble. In example 1100, the second preamble format defines three different sequences to be included in the second PRACH preamble, shown as seq1, seq2, and seq3. In some aspects, the second preamble format defines a cyclic prefix duration for a cyclic prefix that is inserted before at least two of the multiple sequences. In example 1100, a cycle prefix is inserted before each sequence included in the second PRACH preamble. This may assist the base station 110 with determining a symbol timing offset, may account for delay spread, and/or the like.

In example 1100, the second preamble format defines a different sequence per symbol or per repetition included in the second PRACH preamble. Additionally, or alternatively, the second preamble format may define a different orthogonal cover code to be applied per symbol or per repetition included in the second PRACH preamble. Additionally, or alternatively, the second preamble format may define a different scrambling code to be applied per symbol or per repetition included in the second PRACH preamble. These techniques enable the base station 110 to differentiate different symbols included in the second PRACH preamble, and to determine a symbol timing offset. In this way, timing misalignments between the UE 120 and the base station 110 may be resolved.

As indicated above, FIG. 11 is provided as an example. Other examples may differ from what is described with respect to FIG. 11.

Figure 12:
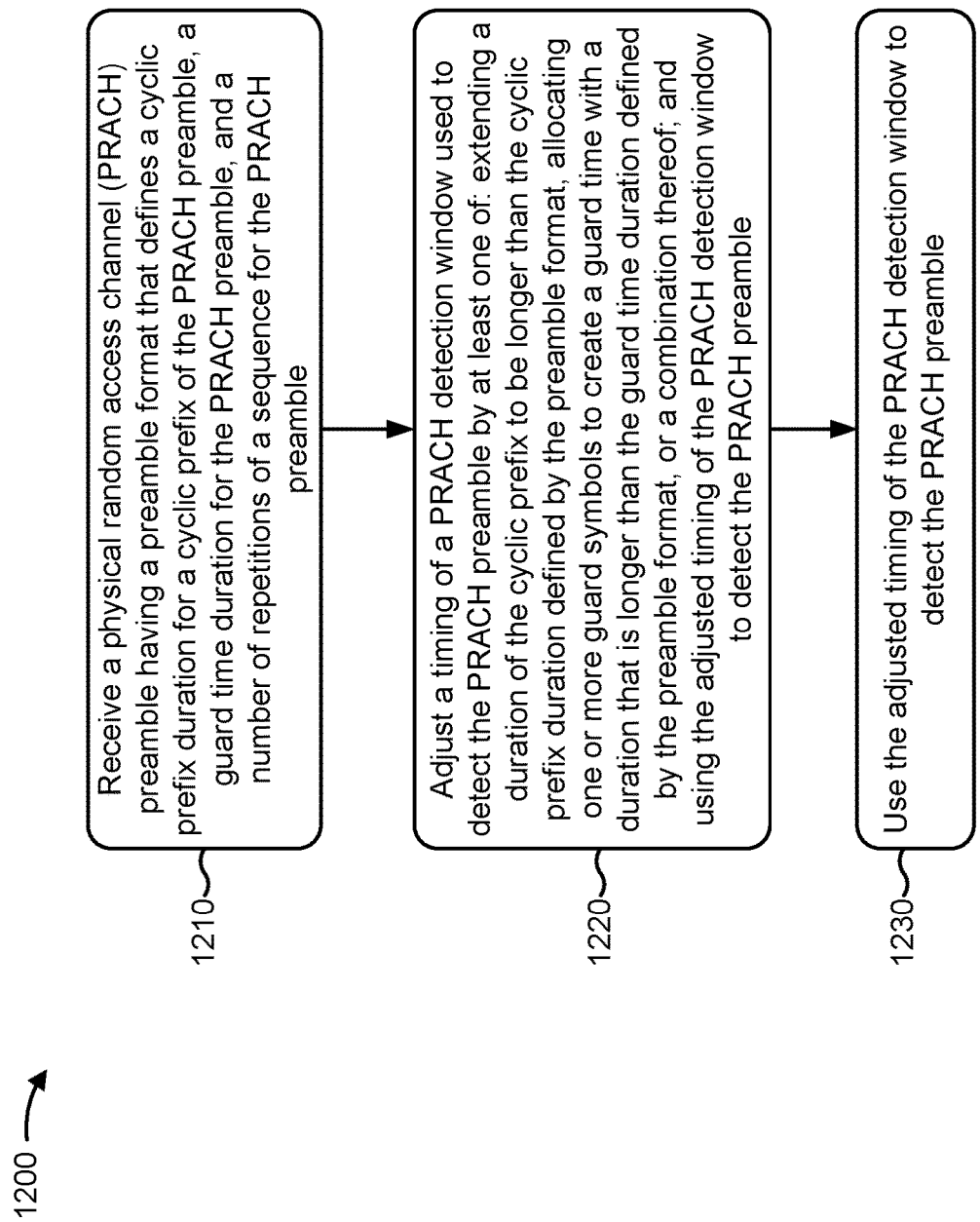
FIGS. 12-21 are diagrams illustrating example processes associated with physical random access channel preamble transmission and detection for large subcarrier spacing, in accordance with the present disclosure.

FIG. 12 is a diagram illustrating an example process 1200 performed, for example, by a base station, in accordance with the present disclosure. Example process 1200 is an example where the base station (e.g., base station 110) performs operations associated with physical random access channel preamble transmission and detection for large subcarrier spacing.

As shown in FIG. 12, in some aspects, process 1200 may include receiving a PRACH preamble having a preamble format that defines a cyclic prefix duration for a cyclic prefix of the PRACH preamble, a guard time duration for the PRACH preamble, and a number of repetitions of a sequence for the PRACH preamble (block 1210). For example, the base station (e.g., using receive processor 238, controller/processor 240, memory 242, and/or the like) may receive a PRACH preamble having a preamble format that defines a cyclic prefix duration for a cyclic prefix of the PRACH preamble, a guard time duration for the PRACH preamble, and a number of repetitions of a sequence for the PRACH preamble, as described above, for example, with reference to FIGS. 6, 7, 8, 9, 10, and/or 11.

As further shown in FIG. 12, in some aspects, process 1200 may include adjusting a timing of a PRACH detection window used to detect the PRACH preamble by at least one of: extending a duration of the cyclic prefix to be longer than the cyclic prefix duration defined by the preamble format, allocating one or more guard symbols to create a guard time with a duration that is longer than the guard time duration defined by the preamble format, or a combination thereof (block 1220). For example, the base station (e.g., using receive processor 238, controller/processor 240, memory 242, and/or the like) may adjust a timing of a PRACH detection window used to detect the PRACH preamble, as described above, for example, with reference to FIGS. 6, 7, 8, 9, 10, and/or 11. In some aspects, the base station may adjust the timing of the PRACH detection window by at least one of: extending a duration of the cyclic prefix to be longer than the cyclic prefix duration defined by the preamble format, allocating one or more guard symbols to create a guard time with a duration that is longer than the guard time duration defined by the preamble format, or a combination thereof.

As further shown in FIG. 12, in some aspects, process 1200 may include using the adjusted timing of the PRACH detection window to detect the PRACH preamble (block 1230). For example, the base station (e.g., receive processor 238, controller/processor 240, memory 242, and/or the like) may use the adjusted timing of the PRACH detection window to detect the PRACH preamble, as described above, for example, with reference to FIGS. 6, 7, 8, 9, 10, and/or 11.

Process 1200 may include additional aspects, such as any single aspect or any combination of aspects described below and/or in connection with one or more other processes described elsewhere herein.

In a first aspect, the preamble format is a New Radio short PRACH format with scaled numerology.

In a second aspect, alone or in combination with the first aspect, the duration of the cyclic prefix is extended up to a length of the sequence.

In a third aspect, alone or in combination with one or more of the first and second aspects, allocating the one or more guard symbols to create the guard time comprises allocating a single guard symbol to create the guard time.

In a fourth aspect, alone or in combination with one or more of the first through third aspects, the timing of the PRACH window is adjusted based at least in part on the PRACH preamble being received in a cell with a subcarrier spacing that is greater than or equal to a threshold.

In a fifth aspect, alone or in combination with one or more of the first through fourth aspects, the duration of the cyclic prefix extends into a first repetition of the sequence within the PRACH preamble.

In a sixth aspect, alone or in combination with one or more of the first through fifth aspects, the one or more guard symbols are allocated to an adjacent slot that follows a slot that includes the PRACH preamble.

In a seventh aspect, alone or in combination with one or more of the first through sixth aspects, allocation of the one or more guard symbols is cell-specific.

In an eighth aspect, alone or in combination with one or more of the first through seventh aspects, process 1200 includes truncating or shifting a communication that is scheduled in the one or more guard symbols.

In a ninth aspect, alone or in combination with one or more of the first through eighth aspects, the communication is in a control resource set or is a physical downlink shared channel communication.

In a tenth aspect, alone or in combination with one or more of the first through ninth aspects, a last repetition of the sequence within the PRACH preamble is truncated and one or more symbols allocated to the last repetition according to the preamble format are used as the one or more guard symbols.

In an eleventh aspect, alone or in combination with one or more of the first through tenth aspects, the timing of the PRACH detection window is adjusted based at least in part on the preamble format.

In a twelfth aspect, alone or in combination with one or more of the first through eleventh aspects, the one or more guard symbols extend into a last repetition of the sequence within the PRACH preamble for a first set of preamble formats, and the one or more guard symbols are allocated to an adjacent slot that follows a slot that includes the PRACH preamble for a second set of preamble formats.

In a thirteenth aspect, alone or in combination with one or more of the first through twelfth aspects, using the adjusted timing of the PRACH detection window to detect the PRACH preamble comprises detecting symbol boundaries of the PRACH preamble.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
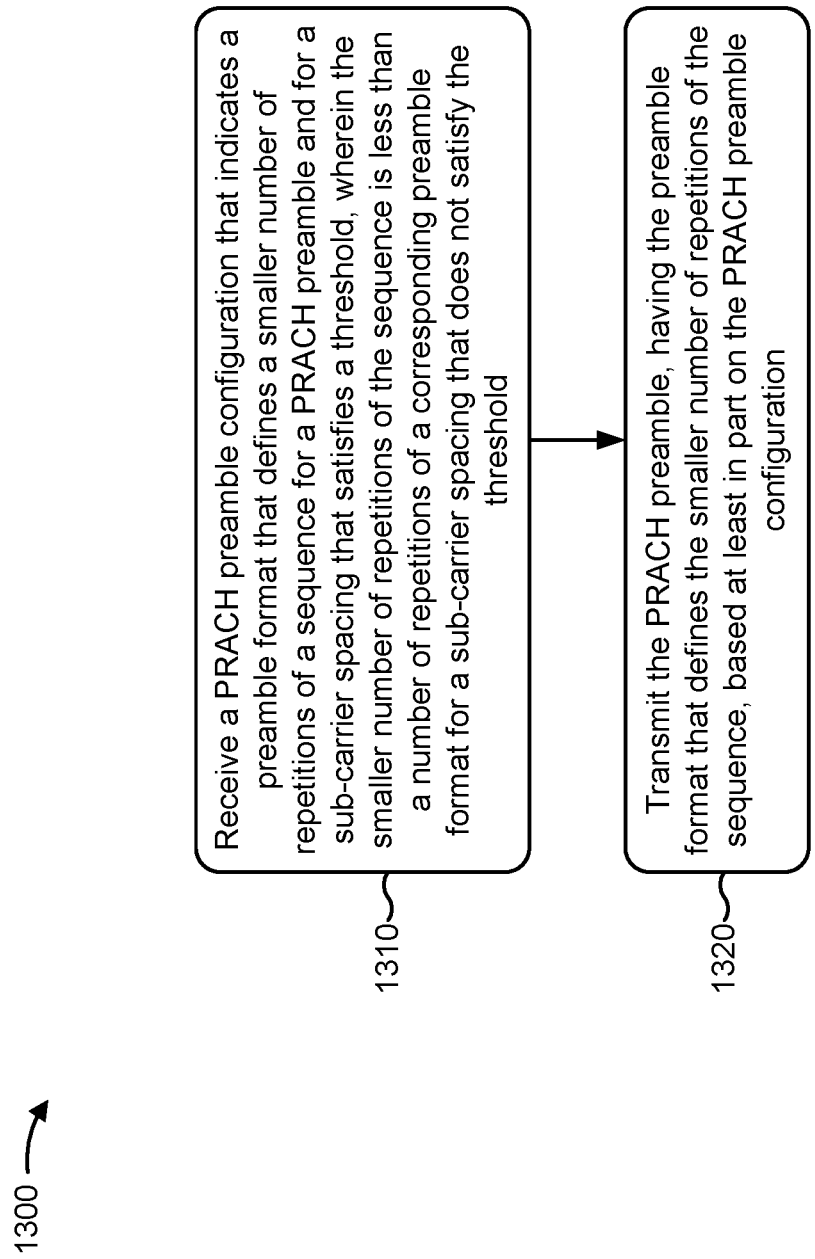

FIG. 13 is a diagram illustrating an example process 1300 performed, for example, by a UE, in accordance with the present disclosure. Example process 1300 is an example where the UE (e.g., UE 120) performs operations associated with physical random access channel preamble transmission and detection for large subcarrier spacing.

As shown in FIG. 13, in some aspects, process 1300 may include receiving a PRACH preamble configuration that indicates a preamble format that defines a smaller number of repetitions of a sequence for a PRACH preamble and for a subcarrier spacing that satisfies a threshold, wherein the smaller number of repetitions of the sequence is less than a number of repetitions of a corresponding preamble format for a subcarrier spacing that does not satisfy the threshold (block 1310). For example, the UE (e.g., using receive processor 258, controller/processor 280, memory 282, and/or the like) may receive a PRACH preamble configuration that indicates a preamble format that defines a smaller number of repetitions of a sequence for a PRACH preamble and for a subcarrier spacing that satisfies a threshold, wherein the smaller number of repetitions of the sequence is less than a number of repetitions of a corresponding preamble format for a subcarrier spacing that does not satisfy the threshold, as described above, for example, with reference to FIGS. 6, 7, 8, 9, 10, and/or 11.

As further shown in FIG. 13, in some aspects, process 1300 may include transmitting the PRACH preamble, having the preamble format that defines the smaller number of repetitions of the sequence, based at least in part on the PRACH preamble configuration (block 1320). For example, the UE (e.g., using transmit processor 264, controller/processor 280, memory 282, and/or the like) may transmit the PRACH preamble, having the preamble format that defines the smaller number of repetitions of the sequence, based at least in part on the PRACH preamble configuration, as described above, for example, with reference to FIGS. 6, 7, 8, 9, 10, and/or 11.

Process 1300 may include additional aspects, such as any single aspect or any combination of aspects described below and/or in connection with one or more other processes described elsewhere herein.

In a first aspect, the preamble format and the corresponding preamble format are New Radio short PRACH formats.

In a second aspect, alone or in combination with the first aspect, the preamble format for the subcarrier spacing that satisfies the threshold defines a cyclic prefix duration, for a cyclic prefix of the PRACH preamble, that is longer than a cyclic prefix duration defined by the corresponding preamble format for the subcarrier spacing that does not satisfy the threshold.

In a third aspect, alone or in combination with one or more of the first and second aspects, the cyclic prefix duration, for the cyclic prefix of the PRACH preamble, is extended up to a length of the sequence.

In a fourth aspect, alone or in combination with one or more of the first through third aspects, the preamble format for the subcarrier spacing that satisfies the threshold defines a guard time duration, for a guard time of the PRACH preamble, that is longer than a guard time duration defined by the corresponding preamble format for the subcarrier spacing that does not satisfy the threshold.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
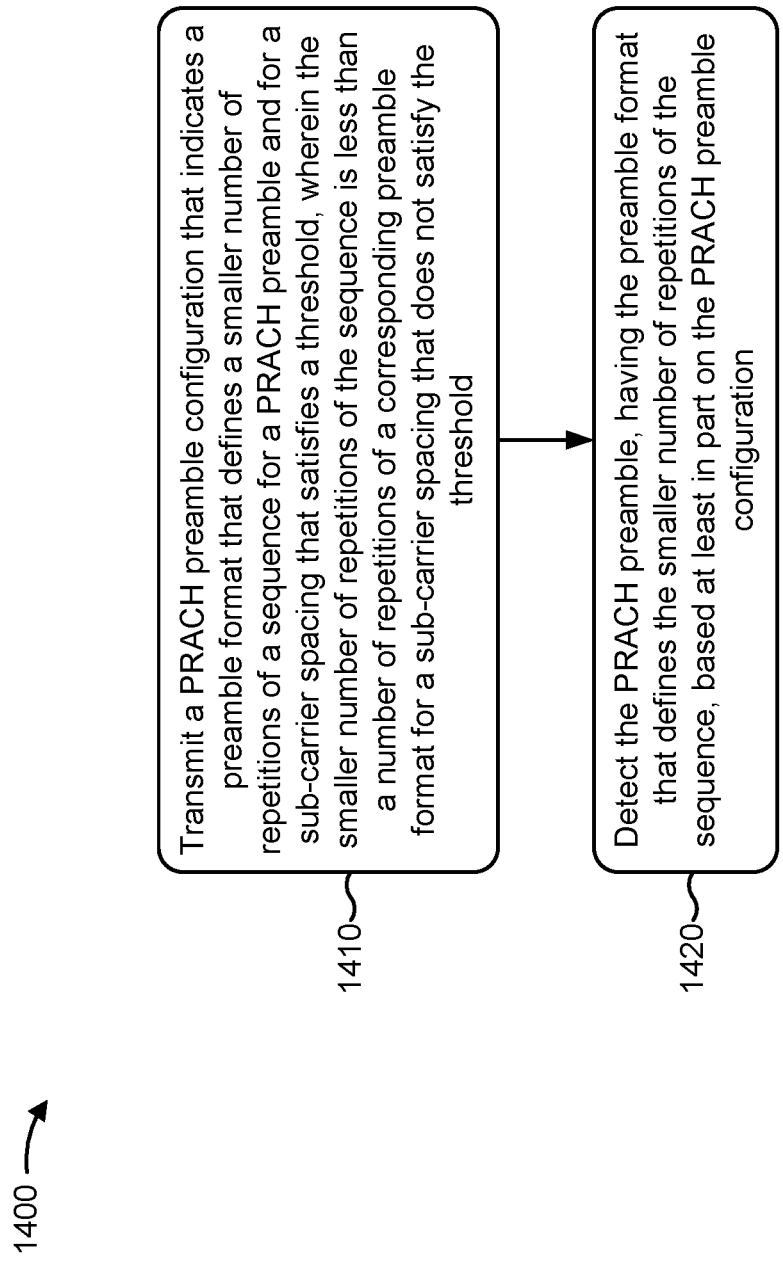

FIG. 14 is a diagram illustrating an example process 1400 performed, for example, by a base station, in accordance with the present disclosure. Example process 1400 is an example where the base station (e.g., base station 110) performs operations associated with physical random access channel preamble transmission and detection for large subcarrier spacing.

As shown in FIG. 14, in some aspects, process 1400 may include transmitting a PRACH preamble configuration that indicates a preamble format that defines a smaller number of repetitions of a sequence for a PRACH preamble and for a subcarrier spacing that satisfies a threshold, wherein the smaller number of repetitions of the sequence is less than a number of repetitions of a corresponding preamble format for a subcarrier spacing that does not satisfy the threshold (block 1410). For example, the base station (e.g., using transmit processor 220, controller/processor 240, memory 242, and/or the like) may transmit a PRACH preamble configuration that indicates a preamble format that defines a smaller number of repetitions of a sequence for a PRACH preamble and for a subcarrier spacing that satisfies a threshold, wherein the smaller number of repetitions of the sequence is less than a number of repetitions of a corresponding preamble format for a subcarrier spacing that does not satisfy the threshold, as described above, for example, with reference to FIGS. 6, 7, 8, 9, 10, and/or 11.

As further shown in FIG. 14, in some aspects, process 1400 may include detecting the PRACH preamble, having the preamble format that defines the smaller number of repetitions of the sequence, based at least in part on the PRACH preamble configuration (block 1420). For example, the base station (e.g., using receive processor 238, controller/processor 240, memory 242, and/or the like) may detect the PRACH preamble, having the preamble format that defines the smaller number of repetitions of the sequence, based at least in part on the PRACH preamble configuration, as described above, for example, with reference to FIGS. 6, 7, 8, 9, 10, and/or 11.

Process 1400 may include additional aspects, such as any single aspect or any combination of aspects described below and/or in connection with one or more other processes described elsewhere herein.

In a first aspect, the preamble format and the corresponding preamble format are New Radio short PRACH formats.

In a second aspect, alone or in combination with the first aspect, the preamble format for the subcarrier spacing that satisfies the threshold defines a cyclic prefix duration, for a cyclic prefix of the PRACH preamble, that is longer than a cyclic prefix duration defined by the corresponding preamble format for the subcarrier spacing that does not satisfy the threshold.

In a third aspect, alone or in combination with one or more of the first and second aspects, the cyclic prefix duration, for the cyclic prefix of the PRACH preamble, is extended up to a length of the sequence.

In a fourth aspect, alone or in combination with one or more of the first through third aspects, the preamble format for the subcarrier spacing that satisfies the threshold defines a guard time duration, for a guard time of the PRACH preamble, that is longer than a guard time duration defined by the corresponding preamble format for the subcarrier spacing that does not satisfy the threshold.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
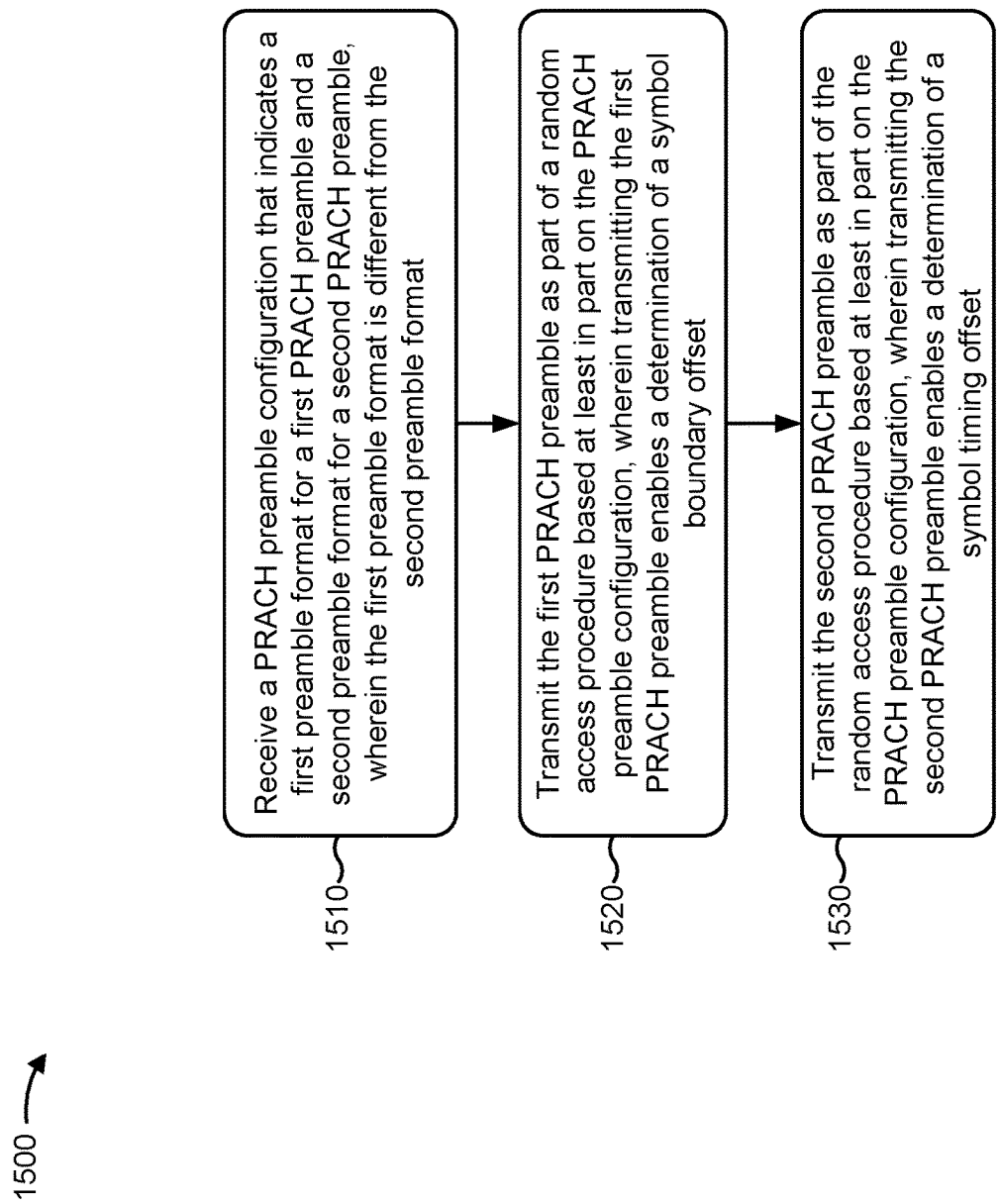

FIG. 15 is a diagram illustrating an example process 1500 performed, for example, by a UE, in accordance with the present disclosure. Example process 1500 is an example where the UE (e.g., UE 120) performs operations associated with physical random access channel preamble transmission and detection for large subcarrier spacing.

As shown in FIG. 15, in some aspects, process 1500 may include receiving a PRACH preamble configuration that indicates a first preamble format for a first PRACH preamble and a second preamble format for a second PRACH preamble, wherein the first preamble format is different from the second preamble format (block 1510). For example, the UE (e.g., using receive processor 258, controller/processor 280, memory 282, and/or the like) may receive a PRACH preamble configuration that indicates a first preamble format for a first PRACH preamble and a second preamble format for a second PRACH preamble, as described above, for example, with reference to FIGS. 6, 7, 8, 9, 10, and/or 11. In some aspects, the first preamble format is different from the second preamble format.

As further shown in FIG. 15, in some aspects, process 1500 may include transmitting the first PRACH preamble as part of a random access procedure based at least in part on the PRACH preamble configuration, wherein transmitting the first PRACH preamble enables a determination of a symbol boundary offset (block 1520). For example, the UE (e.g., using transmit processor 264, controller/processor 280, memory 282, and/or the like) may transmit the first PRACH preamble as part of a random access procedure based at least in part on the PRACH preamble configuration, wherein transmitting the first PRACH preamble enables a determination of a symbol boundary offset, as described above, for example, with reference to FIGS. 6, 7, 8, 9, 10, and/or 11.

As further shown in FIG. 15, in some aspects, process 1500 may include transmitting the second PRACH preamble as part of the random access procedure based at least in part on the PRACH preamble configuration, wherein transmitting the second PRACH preamble enables a determination of a symbol timing offset (block 1530). For example, the UE (e.g., using transmit processor 264, controller/processor 280, memory 282, and/or the like) may transmit the second PRACH preamble as part of the random access procedure based at least in part on the PRACH preamble configuration, wherein transmitting the second PRACH preamble enables a determination of a symbol timing offset, as described above, for example, with reference to FIGS. 6, 7, 8, 9, 10, and/or 11.

Process 1500 may include additional aspects, such as any single aspect or any combination of aspects described below and/or in connection with one or more other processes described elsewhere herein.

In a first aspect, the first preamble format defines a smaller number of repetitions of a sequence, for the first PRACH preamble and for a subcarrier spacing that satisfies a threshold, as compared to a corresponding preamble format for a subcarrier spacing that does not satisfy the threshold.

In a second aspect, alone or in combination with the first aspect, the second PRACH preamble is transmitted in a slot that follows transmission of the first PRACH preamble.

In a third aspect, alone or in combination with one or more of the first and second aspects, the second PRACH preamble is transmitted in a different PRACH occasion than the first PRACH preamble.

In a fourth aspect, alone or in combination with one or more of the first through third aspects, the second PRACH preamble is transmitted based at least in part on a time offset, a frequency offset, or a combination thereof with respect to the first PRACH preamble.

In a fifth aspect, alone or in combination with one or more of the first through fourth aspects, the second preamble format defines one or more repetitions of a sequence over one or more symbols for the second PRACH preamble.

In a sixth aspect, alone or in combination with one or more of the first through fifth aspects, the second preamble format defines fewer repetitions of a sequence than the first preamble format.

In a seventh aspect, alone or in combination with one or more of the first through sixth aspects, the second preamble format defines a shorter cyclic prefix duration, a shorter guard time, or a combination thereof, than the first preamble format.

In an eighth aspect, alone or in combination with one or more of the first through seventh aspects, the second preamble format defines multiple sequences to be transmitted in the second PRACH preamble.

In a ninth aspect, alone or in combination with one or more of the first through eighth aspects, the second preamble format defines a cyclic prefix duration for a cyclic prefix that is inserted before at least two of the multiple sequences.

In a tenth aspect, alone or in combination with one or more of the first through ninth aspects, the second preamble format defines a different sequence per symbol or per repetition included in the second PRACH preamble.

In an eleventh aspect, alone or in combination with one or more of the first through tenth aspects, the second preamble format defines a different orthogonal cover code to be applied per symbol or per repetition included in the second PRACH preamble.

In a twelfth aspect, alone or in combination with one or more of the first through eleventh aspects, the second preamble format defines a different scrambling code to be applied per symbol or per repetition included in the second PRACH preamble.

In a thirteenth aspect, alone or in combination with one or more of the first through twelfth aspects, the second preamble format defines a sequence for the second PRACH preamble as one of a Zadoff-Chu sequence, a maximum length sequence, or a pseudo-noise sequence.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
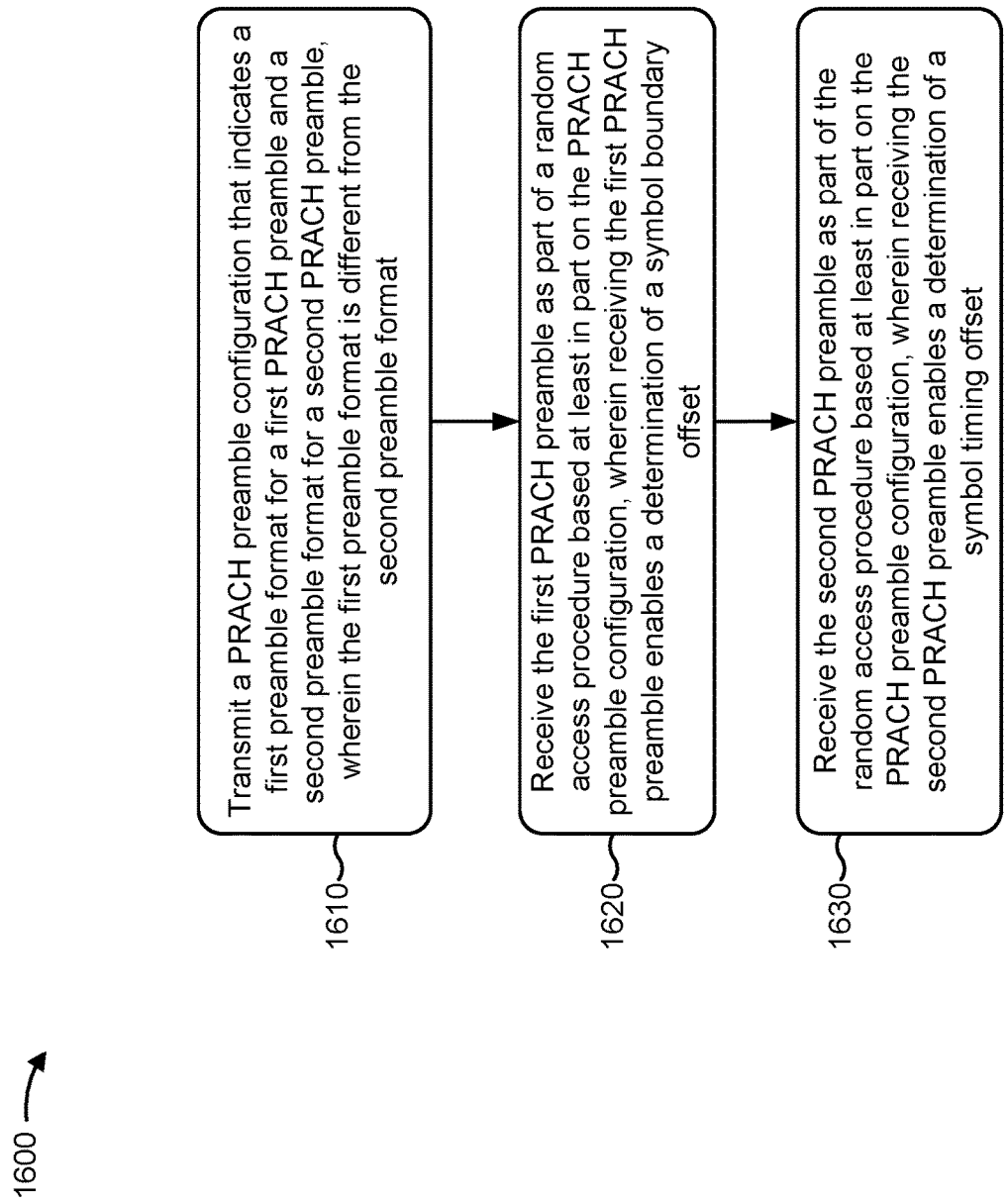

FIG. 16 is a diagram illustrating an example process 1600 performed, for example, by a base station, in accordance with the present disclosure. Example process 1600 is an example where the base station (e.g., base station 110 and/or the like) performs operations associated with physical random access channel preamble transmission and detection for large subcarrier spacing.

As shown in FIG. 16, in some aspects, process 1600 may include transmitting a PRACH preamble configuration that indicates a first preamble format for a first PRACH preamble and a second preamble format for a second PRACH preamble, wherein the first preamble format is different from the second preamble format (block 1610). For example, the base station (e.g., using transmit processor 220, controller/processor 240, memory 242, and/or the like) may transmit a PRACH preamble configuration that indicates a first preamble format for a first PRACH preamble and a second preamble format for a second PRACH preamble, as described above, for example, with reference to FIGS. 6, 7, 8, 9, 10, and/or 11. In some aspects, the first preamble format is different from the second preamble format.

As further shown in FIG. 16, in some aspects, process 1600 may include receiving the first PRACH preamble as part of a random access procedure based at least in part on the PRACH preamble configuration, wherein receiving the first PRACH preamble enables a determination of a symbol boundary offset (block 1620). For example, the base station (e.g., using receive processor 238, controller/processor 240, memory 242, and/or the like) may receive the first PRACH preamble as part of a random access procedure based at least in part on the PRACH preamble configuration, wherein receiving the first PRACH preamble enables a determination of a symbol boundary offset, as described above, for example, with reference to FIGS. 6, 7, 8, 9, 10, and/or 11.

As further shown in FIG. 16, in some aspects, process 1600 may include receiving the second PRACH preamble as part of the random access procedure based at least in part on the PRACH preamble configuration, wherein receiving the second PRACH preamble enables a determination of a symbol timing offset (block 1630). For example, the base station (e.g., using receive processor 238, controller/processor 240, memory 242, and/or the like) may receive the second PRACH preamble as part of the random access procedure based at least in part on the PRACH preamble configuration, wherein receiving the second PRACH preamble enables a determination of a symbol timing offset, as described above, for example, with reference to FIGS. 6, 7, 8, 9, 10, and/or 11.

Process 1600 may include additional aspects, such as any single aspect or any combination of aspects described below and/or in connection with one or more other processes described elsewhere herein.

In a first aspect, process 1600 includes determining symbol boundaries based at least in part on the first PRACH preamble.

In a second aspect, alone or in combination with the first aspect, process 1600 includes determining a symbol timing offset based at least in part on the second PRACH preamble.

In a third aspect, alone or in combination with one or more of the first and second aspects, process 1600 includes transmitting a timing advance command based at least in part on a symbol boundary determined based at least in part on the first PRACH preamble and based at least in part on a symbol timing offset determined based at least in part on the second PRACH preamble.

In a fourth aspect, alone or in combination with one or more of the first through third aspects, process 1600 includes adjusting a timing of a PRACH detection window used to detect the first PRACH preamble by at least one of: extending a duration of a cyclic prefix of the first PRACH preamble to be longer than a cyclic prefix duration defined by the first preamble format, allocating one or more guard symbols to create a guard time with a duration that is longer than a guard time duration defined by the first preamble format, or a combination thereof; and using the adjusted timing of the PRACH detection window to detect the first PRACH preamble.

In a fifth aspect, alone or in combination with one or more of the first through fourth aspects, the first preamble format defines a smaller number of repetitions of a sequence, for the first PRACH preamble and for a subcarrier spacing that satisfies a threshold, as compared to a corresponding preamble format for a subcarrier spacing that does not satisfy the threshold.

In a sixth aspect, alone or in combination with one or more of the first through fifth aspects, the second PRACH preamble is received in a slot that follows reception of the first PRACH preamble.

In a seventh aspect, alone or in combination with one or more of the first through sixth aspects, the second PRACH preamble is received in a different PRACH occasion than the first PRACH preamble.

In an eighth aspect, alone or in combination with one or more of the first through seventh aspects, the second PRACH preamble is received based at least in part on a time offset, a frequency offset, or a combination thereof with respect to the first PRACH preamble.

In a ninth aspect, alone or in combination with one or more of the first through eighth aspects, the second preamble format defines one or more repetitions of a sequence over one or more symbols for the second PRACH preamble.

In a tenth aspect, alone or in combination with one or more of the first through ninth aspects, the second preamble format defines fewer repetitions of a sequence than the first preamble format.

In an eleventh aspect, alone or in combination with one or more of the first through tenth aspects, the second preamble format defines a shorter cyclic prefix duration, a shorter guard time, or a combination thereof, than the first preamble format.

In a twelfth aspect, alone or in combination with one or more of the first through eleventh aspects, the second preamble format defines multiple sequences to be transmitted in the second PRACH preamble.

In a thirteenth aspect, alone or in combination with one or more of the first through twelfth aspects, the second preamble format defines a cyclic prefix duration for a cyclic prefix that is inserted before at least two of the multiple sequences.

In a fourteenth aspect, alone or in combination with one or more of the first through thirteenth aspects, the second preamble format defines a different sequence per symbol or per repetition included in the second PRACH preamble.

In a fifteenth aspect, alone or in combination with one or more of the first through fourteenth aspects, the second preamble format defines a different orthogonal cover code to be applied per symbol or per repetition included in the second PRACH preamble.

In a sixteenth aspect, alone or in combination with one or more of the first through fifteenth aspects, the second preamble format defines a different scrambling code to be applied per symbol or per repetition included in the second PRACH preamble.

In a seventeenth aspect, alone or in combination with one or more of the first through sixteenth aspects, the second preamble format defines a sequence for the second PRACH preamble as one of a Zadoff-Chu sequence, a maximum length sequence, or a pseudo-noise sequence.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
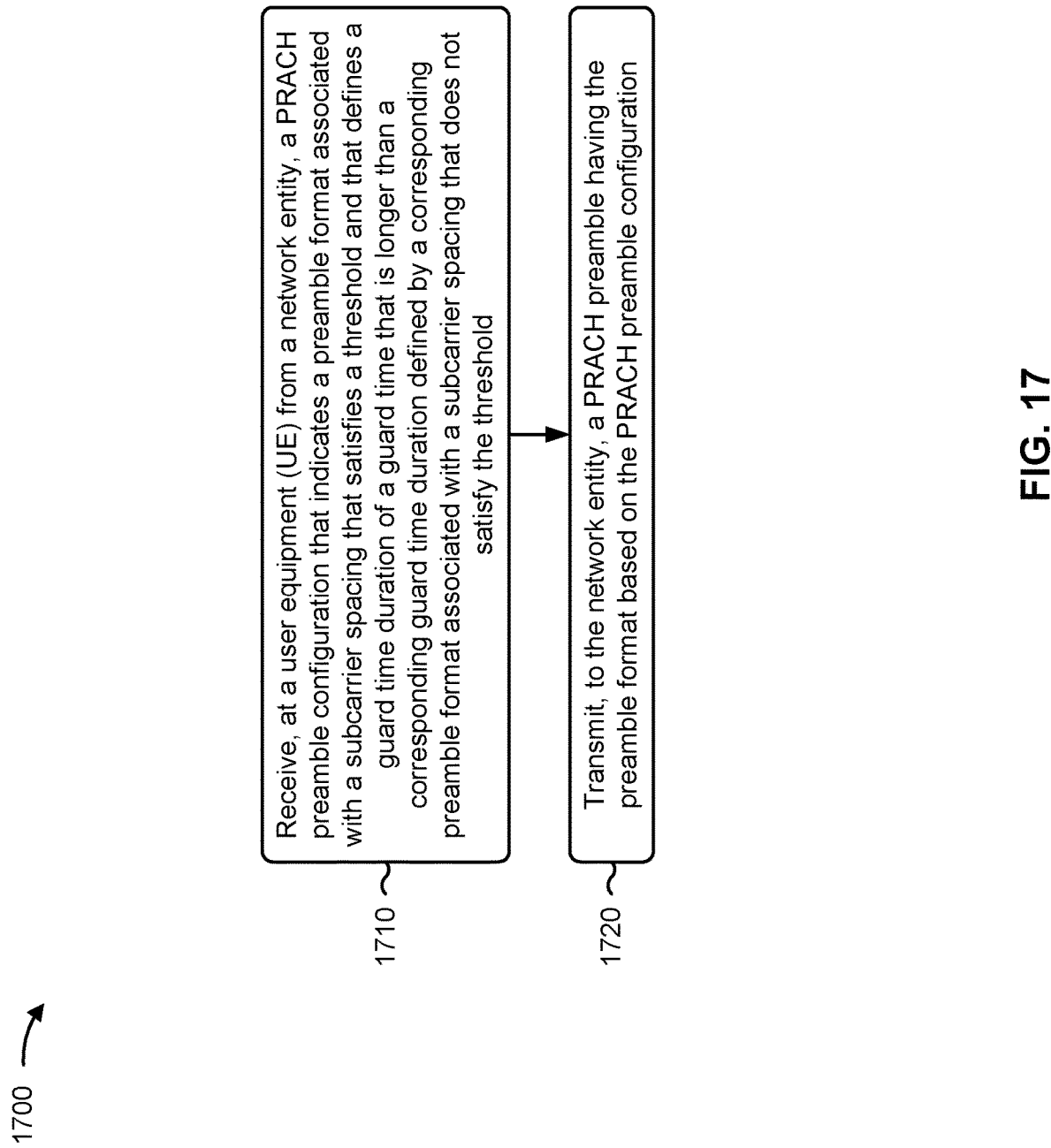

FIG. 17 is a diagram illustrating an example process 1700 performed, for example, by a UE, in accordance with the present disclosure. Example process 1700 is an example where the UE (e.g., UE 120) performs operations associated with PRACH preamble transmission and detection for large subcarrier spacing. As described herein, a base station 110 may be referred to as a network entity.

As shown in FIG. 17, in some aspects, process 1700 may include receiving, at the UE from a network entity, a PRACH preamble configuration that indicates a preamble format associated with a subcarrier spacing that satisfies a threshold and that defines a guard time duration of a guard time that is longer than a corresponding guard time duration defined by a corresponding preamble format associated with a subcarrier spacing that does not satisfy the threshold (block 1710). For example, the UE (e.g., using receive processor 258, controller/processor 280, memory 282, and/or the like) may receive, at the UE from a network entity, a PRACH preamble configuration that indicates a preamble format associated with a subcarrier spacing that satisfies a threshold and that defines a guard time duration of a guard time that is longer than a corresponding guard time duration defined by a corresponding preamble format associated with a subcarrier spacing that does not satisfy the threshold, as described above, for example, with reference to FIGS. 6, 7, 8, 9, 10, and/or 11.

As further shown in FIG. 17, in some aspects, process 1700 may include transmitting, to the network entity, a PRACH preamble having the preamble format based on the PRACH preamble configuration (block 1720). For example, the UE (e.g., using transmit processor 264, controller/processor 280, memory 282, and/or the like) may transmit, to the network entity, a PRACH preamble having the preamble format based on the PRACH preamble configuration, as described above, for example, with reference to FIGS. 6, 7, 8, 9, 10, and/or 11.

Process 1700 may include additional aspects, such as any single aspect or any combination of aspects described below and/or in connection with one or more other processes described elsewhere herein.

In a first aspect, the preamble format further defines a smaller number of repetitions of a sequence as compared to the corresponding preamble format.

In a second aspect, alone or in combination with the first aspect, the preamble format further defines 11 repetitions of a sequence, and the corresponding preamble format defines 12 repetitions of the sequence.

In a third aspect, alone or in combination with one or more of the first and second aspects, the preamble format corresponds to format B4 for subcarrier spacings that satisfy the threshold, and the corresponding preamble format corresponds to format B4 for subcarrier spacings that do not satisfy the threshold.

In a fourth aspect, alone or in combination with one or more of the first through third aspects, the preamble format corresponds to format B5 for subcarrier spacings that satisfy the threshold, and the corresponding preamble format corresponds to format B4 for subcarrier spacings that do not satisfy the threshold.

In a fifth aspect, alone or in combination with one or more of the first through fourth aspects, the threshold comprises 960 kilohertz (KHz).

In a sixth aspect, alone or in combination with one or more of the first through fifth aspects, the preamble format and the corresponding preamble format define a same number of symbols and a same CP duration.

In a seventh aspect, alone or in combination with one or more of the first through sixth aspects, the preamble format and the corresponding preamble format are New Radio (NR) short PRACH formats.

In an eighth aspect, alone or in combination with one or more of the first through seventh aspects, process 1700 includes performing a random access channel configuration procedure with the network entity, wherein performing the random access channel configuration procedure includes transmitting the PRACH preamble.

In a ninth aspect, alone or in combination with one or more of the first through eighth aspects, the PRACH preamble configuration is included in one or more system information blocks (SIBs) or one or more synchronization signal blocks (SSBs).

In a tenth aspect, alone or in combination with one or more of the first through ninth aspects, the PRACH preamble configuration is included in a radio resource control (RRC) message.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

Figure 18:
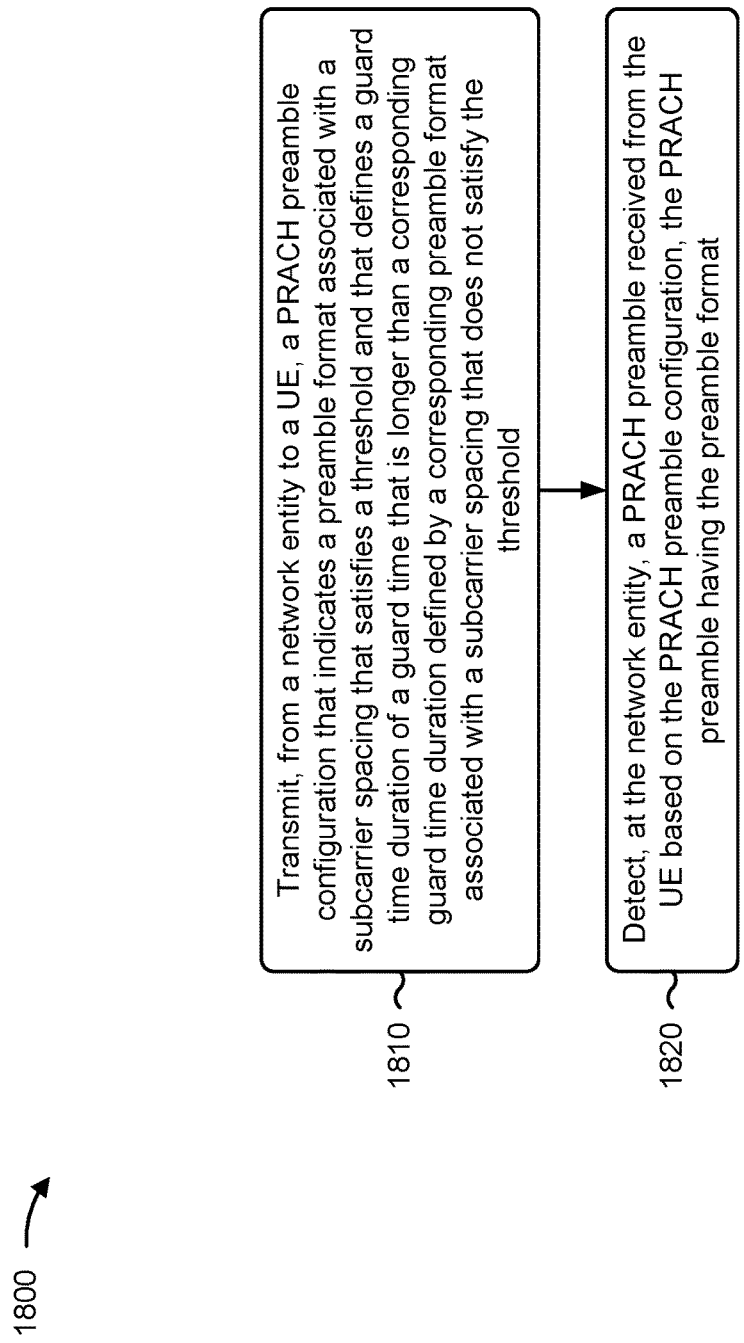

FIG. 18 is a diagram illustrating an example process 1800 performed, for example, by a network entity, in accordance with the present disclosure. Example process 1800 is an example where the network entity (e.g., base station 110) performs operations associated with PRACH preamble transmission and detection for large subcarrier spacing.

As shown in FIG. 18, in some aspects, process 1800 may include transmitting, from the network entity to a UE, a PRACH preamble configuration that indicates a preamble format associated with a subcarrier spacing that satisfies a threshold and that defines a guard time duration of a guard time that is longer than a corresponding guard time duration defined by a corresponding preamble format associated with a subcarrier spacing that does not satisfy the threshold (block 1810). For example, the network entity (e.g., using transmit processor 220, controller/processor 240, memory 242, and/or the like) may transmit, from a network entity to a UE, a PRACH preamble configuration that indicates a preamble format associated with a subcarrier spacing that satisfies a threshold and that defines a guard time duration of a guard time that is longer than a corresponding guard time duration defined by a corresponding preamble format associated with a subcarrier spacing that does not satisfy the threshold, as described above, for example, with reference to FIGS. 6, 7, 8, 9, 10, and/or 11.

As further shown in FIG. 18, in some aspects, process 1800 may include detecting, at the network entity, a PRACH preamble received from the UE based on the PRACH preamble configuration, the PRACH preamble having the preamble format (block 1820). For example, the network entity (e.g., using antenna 234, DEMOD 232, MIMO detector 236, receive processor 238, controller/processor 240, and/or memory 242) may detect, at the network entity, a PRACH preamble received from the UE based on the PRACH preamble configuration, the PRACH preamble having the preamble format, as described above, for example, with reference to FIGS. 6, 7, 8, 9, 10, and/or 11.

Process 1800 may include additional aspects, such as any single aspect or any combination of aspects described below and/or in connection with one or more other processes described elsewhere herein.

In a first aspect, the preamble format further defines a smaller number of repetitions of a sequence as compared to the corresponding preamble format.

In a second aspect, alone or in combination with the first aspect, the preamble format further defines 11 repetitions of a sequence, and the corresponding preamble format defines 12 repetitions of the sequence.

In a third aspect, alone or in combination with one or more of the first and second aspects, the preamble format corresponds to format B4 for subcarrier spacings that satisfy the threshold, and the corresponding preamble format corresponds to format B4 for subcarrier spacings that do not satisfy the threshold.

In a fourth aspect, alone or in combination with one or more of the first through third aspects, the preamble format corresponds to format B5 for subcarrier spacings that satisfy the threshold, and the corresponding preamble format corresponds to format B4 for subcarrier spacings that do not satisfy the threshold.

In a fifth aspect, alone or in combination with one or more of the first through fourth aspects, the threshold comprises 960 KHz.

In a sixth aspect, alone or in combination with one or more of the first through fifth aspects, the preamble format and the corresponding preamble format define a same number of symbols and a same CP duration.

In a seventh aspect, alone or in combination with one or more of the first through sixth aspects, the preamble format and the corresponding preamble format are NR short PRACH formats.

In an eighth aspect, alone or in combination with one or more of the first through seventh aspects, process 1800 includes performing a random access channel configuration procedure with the UE, wherein performing the random access channel configuration procedure includes receiving the PRACH preamble.

In a ninth aspect, alone or in combination with one or more of the first through eighth aspects, the PRACH preamble configuration is included in one or more SIBs or one or more SSBs.

In a tenth aspect, alone or in combination with one or more of the first through ninth aspects, the PRACH preamble configuration is included in an RRC message.

Although FIG. 18 shows example blocks of process 1800, in some aspects, process 1800 may include additional blocks, fewer blocks, different blocks, or differently arranged blocks than those depicted in FIG. 18. Additionally, or alternatively, two or more of the blocks of process 1800 may be performed in parallel.

Figure 19:
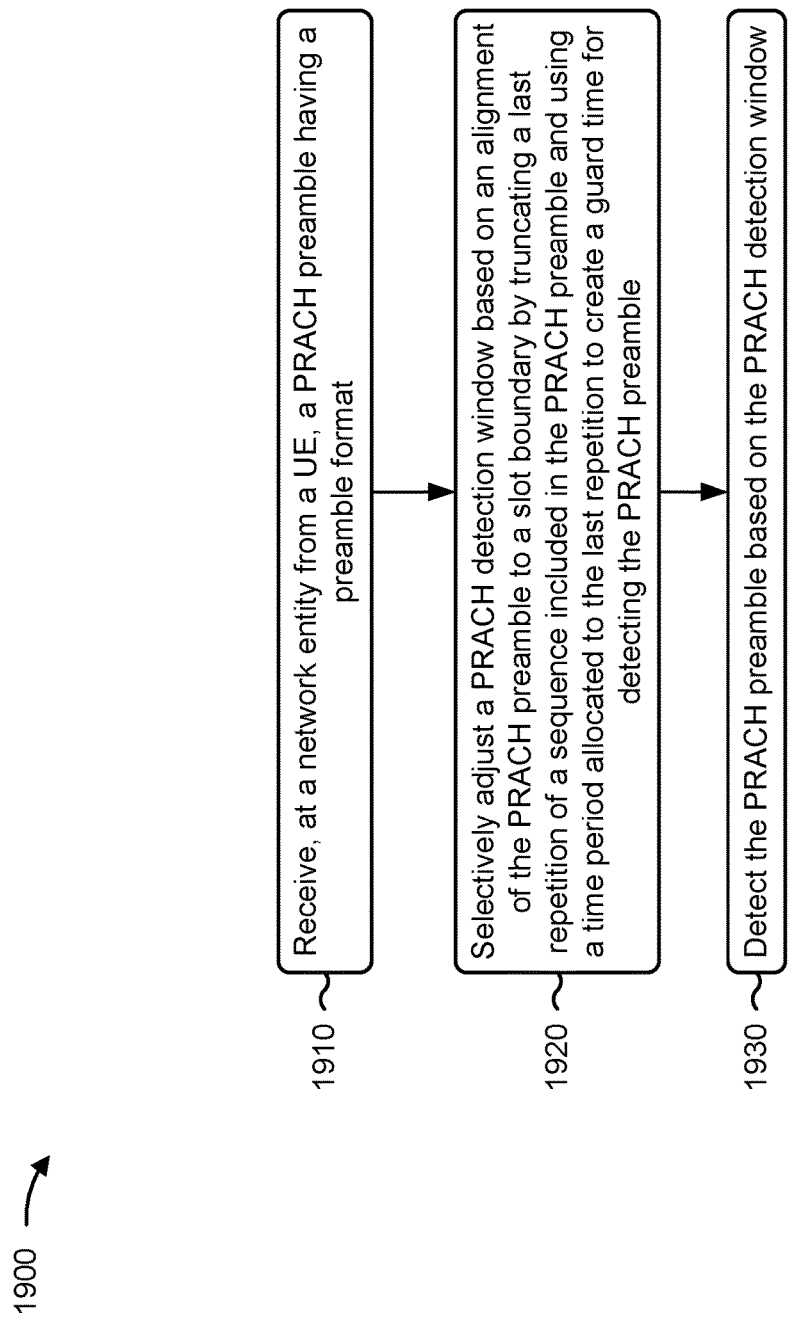

FIG. 19 is a diagram illustrating an example process 1900 performed, for example, by a network entity, in accordance with the present disclosure. Example process 1900 is an example where the network entity (e.g., base station 110) performs operations associated with PRACH preamble transmission and detection for large subcarrier spacing.

As shown in FIG. 19, in some aspects, process 1900 may include receiving, at a network entity from a UE, a PRACH preamble having a preamble format (block 1910). For example, the network entity (e.g., using antenna 234, DEMOD 232, MIMO detector 236, receive processor 238, controller/processor 240, and/or memory 242) may receive, at the network entity from a UE, a PRACH preamble having a preamble format, as described above, for example, with reference to FIGS. 6, 7, 8, 9, 10, and/or 11.

As further shown in FIG. 19, in some aspects, process 1900 may include selectively adjusting a PRACH detection window based on an alignment of the PRACH preamble to a slot boundary by truncating a last repetition of a sequence included in the PRACH preamble and using a time period allocated to the last repetition to create a guard time for detecting the PRACH preamble (block 1920). For example, the network entity (e.g., using controller/processor 240 and/or memory 242) may selectively adjust a PRACH detection window based on an alignment of the PRACH preamble to a slot boundary by truncating a last repetition of a sequence included in the PRACH preamble and using a time period allocated to the last repetition to create a guard time for detecting the PRACH preamble, as described above, for example, with reference to FIGS. 6, 7, 8, 9, 10, and/or 11.

As further shown in FIG. 19, in some aspects, process 1900 may include detecting the PRACH preamble based on the PRACH detection window (block 1930). For example, the network entity (e.g., using antenna 234, DEMOD 232, MIMO detector 236, receive processor 238, controller/processor 240, and/or memory 242) may detect the PRACH preamble based on the PRACH detection window, as described above, for example, with reference to FIGS. 6, 7, 8, 9, 10, and/or 11.

Process 1900 may include additional aspects, such as any single aspect or any combination of aspects described below and/or in connection with one or more other processes described elsewhere herein.

In a first aspect, process 1900 includes determining to truncate the last repetition and use the time period to create the guard time based on the PRACH preamble being aligned with the slot boundary.

In a second aspect, alone or in combination with the first aspect, process 1900 includes adjusting the PRACH detection window by allocating one or more guard symbols to one or more symbols that follow the PRACH preamble within a slot based on the PRACH preamble not being aligned with the slot boundary.

In a third aspect, alone or in combination with one or more of the first and second aspects, the preamble format is associated with a subcarrier spacing that satisfies a threshold.

In a fourth aspect, alone or in combination with one or more of the first through third aspects, the threshold comprises 960 KHz.

In a fifth aspect, alone or in combination with one or more of the first through fourth aspects, the preamble format defines 12 repetitions of the sequence.

In a sixth aspect, alone or in combination with one or more of the first through fifth aspects, the preamble format corresponds to format B4.

In a seventh aspect, alone or in combination with one or more of the first through sixth aspects, the preamble format is an NR short PRACH format.

In an eighth aspect, alone or in combination with one or more of the first through seventh aspects, the preamble format defines a corresponding guard time duration, and a guard time duration of the guard time is longer than the corresponding guard time duration.

In a ninth aspect, alone or in combination with one or more of the first through eighth aspects, using the time period to create the guard time comprises using the time period to allocate a single guard symbol.

Although FIG. 19 shows example blocks of process 1900, in some aspects, process 1900 may include additional blocks, fewer blocks, different blocks, or differently arranged blocks than those depicted in FIG. 19. Additionally, or alternatively, two or more of the blocks of process 1900 may be performed in parallel.

Figure 20:
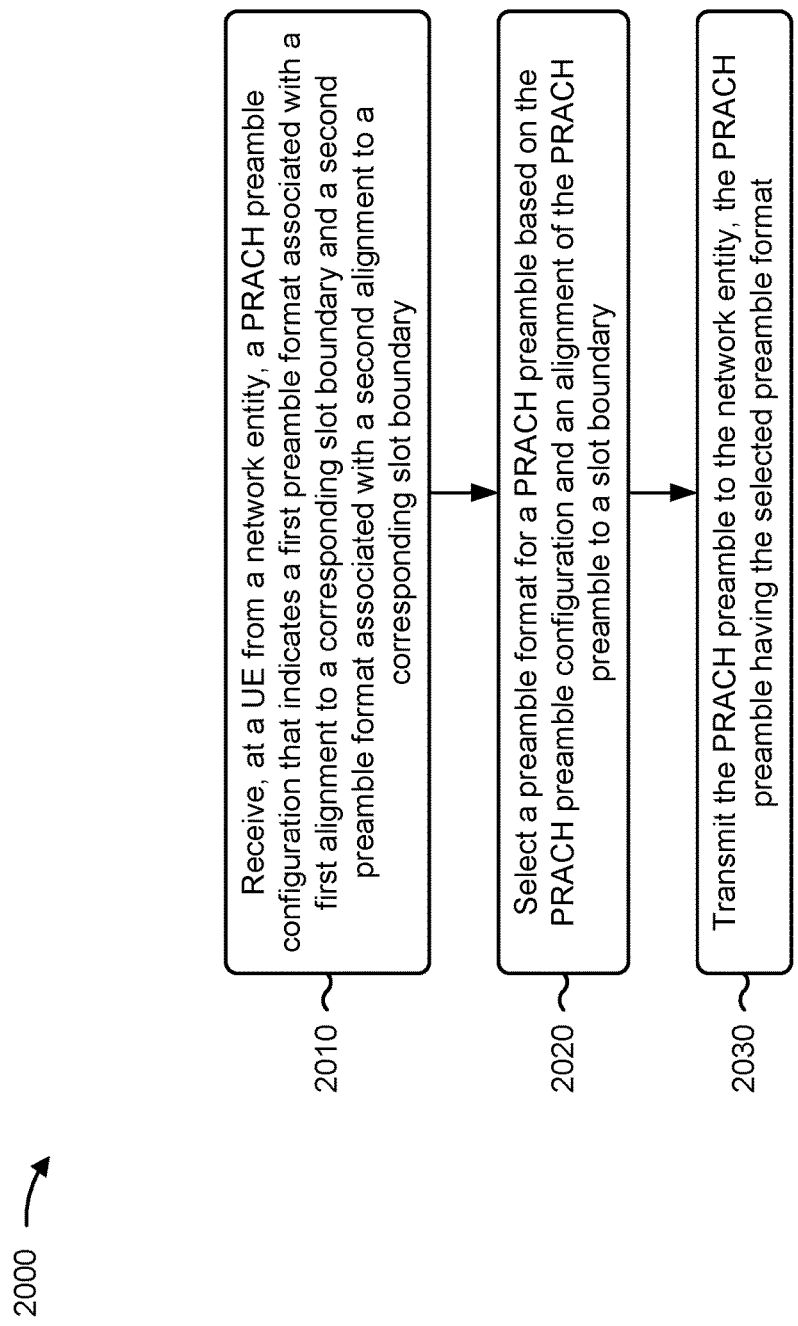

FIG. 20 is a diagram illustrating an example process 2000 performed, for example, by a UE, in accordance with the present disclosure. Example process 2000 is an example where the UE (e.g., UE 120) performs operations associated with PRACH preamble transmission and detection for large subcarrier spacing.

As shown in FIG. 20, in some aspects, process 2000 may include receiving, at the UE from a network entity, a PRACH preamble configuration that indicates a first preamble format associated with a first alignment to a corresponding slot boundary and a second preamble format associated with a second alignment to a corresponding slot boundary (block 2010). For example, the UE (e.g., using antenna 252, DEMOD 254, MIMO detector 256, receive processor 258, controller/processor 280, and/or memory 282) may receive, at the UE from a network entity, a PRACH preamble configuration that indicates a first preamble format associated with a first alignment to a corresponding slot boundary and a second preamble format associated with a second alignment to a corresponding slot boundary, as described above, for example, with reference to FIGS. 6, 7, 8, 9, 10, and/or 11.

As further shown in FIG. 20, in some aspects, process 2000 may include selecting a preamble format for a PRACH preamble based on the PRACH preamble configuration and an alignment of the PRACH preamble to a slot boundary (block 2020). For example, the UE (e.g., using controller/processor 280 and/or memory 282) may select a preamble format for a PRACH preamble based on the PRACH preamble configuration and an alignment of the PRACH preamble to a slot boundary, as described above, for example, with reference to FIGS. 6, 7, 8, 9, 10, and/or 11.

As further shown in FIG. 20, in some aspects, process 2000 may include transmitting the PRACH preamble to the network entity, the PRACH preamble having the selected preamble format (block 2030). For example, the UE (e.g., using controller/processor 280, transmit processor 264, TX MIMO processor 266, MOD 254, antenna 252, and/or memory 282) may transmit the PRACH preamble to the network entity, the PRACH preamble having the selected preamble format, as described above, for example, with reference to FIGS. 6, 7, 8, 9, 10, and/or 11.

Process 2000 may include additional aspects, such as any single aspect or any combination of aspects described below and/or in connection with one or more other processes described elsewhere herein.

In a first aspect, selecting the preamble format for the PRACH preamble comprises selecting the first preamble format based on the PRACH preamble not being aligned with the slot boundary.

In a second aspect, alone or in combination with the first aspect, selecting the preamble format for the PRACH preamble comprises selecting the second preamble format based on the PRACH preamble being aligned with the slot boundary.

In a third aspect, alone or in combination with one or more of the first and second aspects, the second preamble format defines a smaller number of repetitions of a sequence as compared to the first preamble format.

In a fourth aspect, alone or in combination with one or more of the first through third aspects, the second preamble format defines 11 repetitions of a sequence, and the first preamble format defines 12 repetitions of the sequence.

In a fifth aspect, alone or in combination with one or more of the first through fourth aspects, the first preamble format corresponds to format B4, and the second preamble format corresponds to format B5.

In a sixth aspect, alone or in combination with one or more of the first through fifth aspects, the first preamble format and the second preamble format are NR short PRACH formats.

Although FIG. 20 shows example blocks of process 2000, in some aspects, process 2000 may include additional blocks, fewer blocks, different blocks, or differently arranged blocks than those depicted in FIG. 20. Additionally, or alternatively, two or more of the blocks of process 2000 may be performed in parallel.

Figure 21:
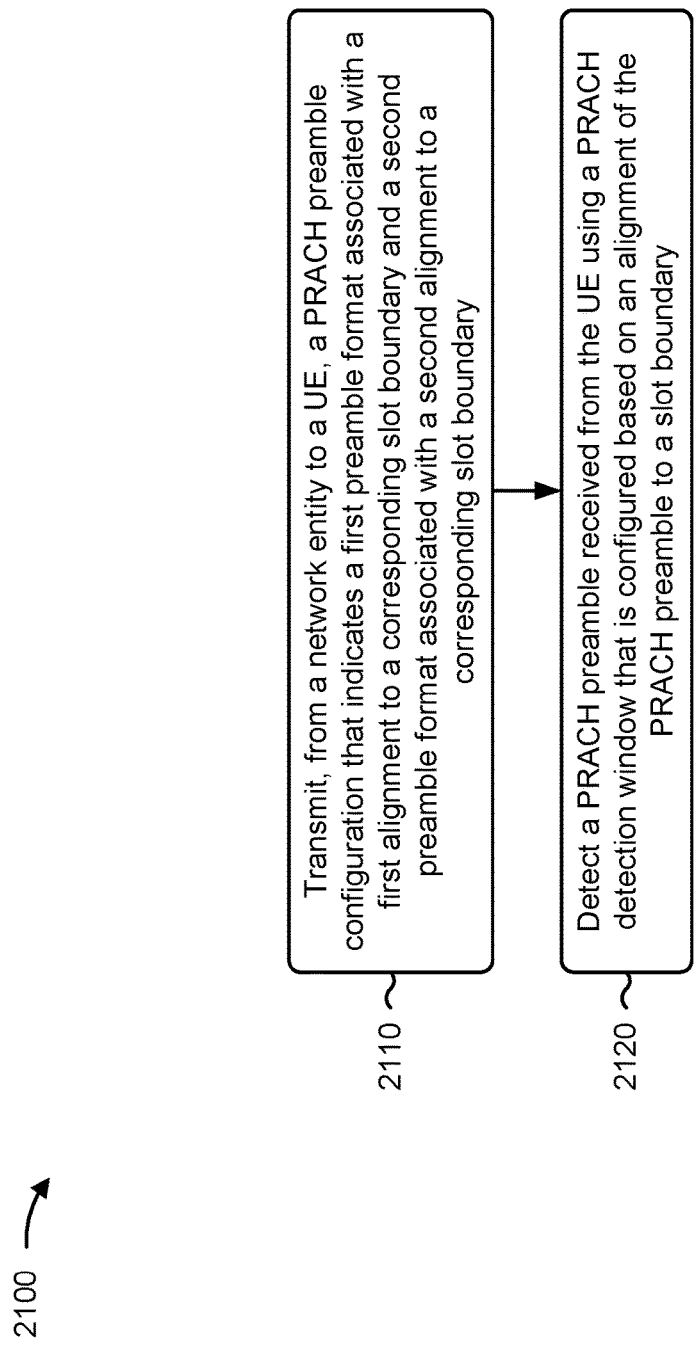

FIG. 21 is a diagram illustrating an example process 2100 performed, for example, by a network entity, in accordance with the present disclosure. Example process 2100 is an example where the network entity (e.g., base station 110) performs operations associated with PRACH preamble transmission and detection for large subcarrier spacing.

As shown in FIG. 21, in some aspects, process 2100 may include transmitting, from the network entity to a UE, a PRACH preamble configuration that indicates a first preamble format associated with a first alignment to a corresponding slot boundary and a second preamble format associated with a second alignment to a corresponding slot boundary (block 2110). For example, the network entity (e.g., using controller/processor 240, transmit processor 220, TX MIMO processor 230, MOD 232, antenna 234, and/or memory 242) may transmit, from the network entity to a UE, a PRACH preamble configuration that indicates a first preamble format associated with a first alignment to a corresponding slot boundary and a second preamble format associated with a second alignment to a corresponding slot boundary, as described above, for example, with reference to FIGS. 6, 7, 8, 9, 10, and/or 11.

As further shown in FIG. 21, in some aspects, process 2100 may include detecting a PRACH preamble received from the UE using a PRACH detection window that is configured based on an alignment of the PRACH preamble to a slot boundary (block 2120). For example, the network entity (e.g., using antenna 234, DEMOD 232, MIMO detector 236, receive processor 238, controller/processor 240, and/or memory 242) may detect a PRACH preamble received from the UE using a PRACH detection window that is configured based on an alignment of the PRACH preamble to a slot boundary, as described above, for example, with reference to FIGS. 6, 7, 8, 9, 10, and/or 11.

Process 2100 may include additional aspects, such as any single aspect or any combination of aspects described below and/or in connection with one or more other processes described elsewhere herein.

In a first aspect, process 2100 includes configuring the PRACH detection window according to the first preamble format based on the PRACH preamble being not aligned with the slot boundary.

In a second aspect, alone or in combination with the first aspect, process 2100 includes configuring the PRACH detection window according to the second preamble format based on the PRACH preamble being aligned with the slot boundary.

In a third aspect, alone or in combination with one or more of the first and second aspects, configuring the PRACH detection window comprises adjusting a length of the PRACH detection window based on a duration of a guard time associated with the PRACH preamble, adjusting the length of the PRACH detection window based on a number of repetitions of a sequence associated with the PRACH preamble, or a combination thereof.

In a fourth aspect, alone or in combination with one or more of the first through third aspects, the second preamble format defines a smaller number of repetitions of a sequence as compared to the first preamble format.

In a fifth aspect, alone or in combination with one or more of the first through fourth aspects, the second preamble format defines 11 repetitions of a sequence, and the first preamble format defines 12 repetitions of the sequence.

In a sixth aspect, alone or in combination with one or more of the first through fifth aspects, the first preamble format corresponds to format B4, and the second preamble format corresponds to format B5.

In a seventh aspect, alone or in combination with one or more of the first through sixth aspects, the first preamble format and the second preamble format are NR short PRACH formats.

Although FIG. 21 shows example blocks of process 2100, in some aspects, process 2100 may include additional blocks, fewer blocks, different blocks, or differently arranged blocks than those depicted in FIG. 21. Additionally, or alternatively, two or more of the blocks of process 2100 may be performed in parallel.

The following provides an overview of some Aspects of the present disclosure:

Aspect 1: A method of wireless communication performed by a base station, comprising: receiving a physical random access channel (PRACH) preamble having a preamble format that defines a cyclic prefix duration for a cyclic prefix of the PRACH preamble, a guard time duration for the PRACH preamble, and a number of repetitions of a sequence for the PRACH preamble; and adjusting a timing of a PRACH detection window used to detect the PRACH preamble by at least one of: extending a duration of the cyclic prefix to be longer than the cyclic prefix duration defined by the preamble format, allocating one or more guard symbols to create a guard time with a duration that is longer than the guard time duration defined by the preamble format, or a combination thereof; and using the adjusted timing of the PRACH detection window to detect the PRACH preamble.

Aspect 2: The method of Aspect 1, wherein the preamble format is a New Radio short PRACH format with scaled numerology.

Aspect 3: The method of any of Aspects 1-2, wherein the duration of the cyclic prefix is extended up to a length of the sequence.

Aspect 4: The method of any of Aspects 1-3, wherein allocating the one or more guard symbols to create the guard time comprises allocating a single guard symbol to create the guard time.

Aspect 5: The method of any of Aspects 1-4, wherein the timing of the PRACH window is adjusted based at least in part on the PRACH preamble being received in a cell with a subcarrier spacing that is greater than or equal to a threshold.

Aspect 6: The method of any of Aspects 1-5, wherein the duration of the cyclic prefix extends into a first repetition of the sequence within the PRACH preamble.

Aspect 7: The method of any of Aspects 1-6, wherein the one or more guard symbols are allocated to an adjacent slot that follows a slot that includes the PRACH preamble.

Aspect 8: The method of Aspect 7, wherein allocation of the one or more guard symbols is cell-specific.

Aspect 9: The method of any of Aspects 7-8, further comprising truncating or shifting a communication that is scheduled in the one or more guard symbols.

Aspect 10: The method of Aspect 9, wherein the communication is in a control resource set or is a physical downlink shared channel communication.

Aspect 11: The method of any of Aspects 1-10, wherein a last repetition of the sequence within the PRACH preamble is truncated and one or more symbols allocated to the last repetition according to the preamble format are used as the one or more guard symbols.

Aspect 12: The method of any of Aspects 1-11, wherein the timing of the PRACH detection window is adjusted based at least in part on the preamble format.

Aspect 13: The method of Aspect 12, wherein the one or more guard symbols extend into a last repetition of the sequence within the PRACH preamble for a first set of preamble formats, and wherein the one or more guard symbols are allocated to an adjacent slot that follows a slot that includes the PRACH preamble for a second set of preamble formats.

Aspect 14: The method of any of Aspects 1-13, wherein using the adjusted timing of the PRACH detection window to detect the PRACH preamble comprises detecting symbol boundaries of the PRACH preamble.

Aspect 15: A method of wireless communication performed by a user equipment (UE), comprising: receiving a physical random access channel (PRACH) preamble configuration that indicates a preamble format that defines a smaller number of repetitions of a sequence for a PRACH preamble and for a subcarrier spacing that satisfies a threshold, wherein the smaller number of repetitions of the sequence is smaller than a number of repetitions of a corresponding preamble format for a subcarrier spacing that does not satisfy the threshold; and transmitting the PRACH preamble, having the preamble format that defines the smaller number of repetitions of the sequence, based at least in part on the PRACH preamble configuration.

Aspect 16: The method of Aspect 15, wherein the preamble format and the corresponding preamble format are New Radio short PRACH formats.

Aspect 17: The method of any of Aspects 15-16, wherein the preamble format for the subcarrier spacing that satisfies the threshold defines a cyclic prefix duration, for a cyclic prefix of the PRACH preamble, that is longer than a cyclic prefix duration defined by the corresponding preamble format for the subcarrier spacing that does not satisfy the threshold.

Aspect 18: The method of Aspect 17, wherein the cyclic prefix duration, for the cyclic prefix of the PRACH preamble, is extended up to a length of the sequence.

Aspect 19: The method of any of Aspects 15-18, wherein the preamble format for the subcarrier spacing that satisfies the threshold defines a guard time duration, for a guard time of the PRACH preamble, that is longer than a guard time duration defined by the corresponding preamble format for the subcarrier spacing that does not satisfy the threshold.

Aspect 20: The method of any of Aspects 15-19, wherein the preamble format for the subcarrier spacing that satisfies the threshold and the corresponding preamble format for the subcarrier spacing that does not satisfy the threshold define a same number of symbols and a same cyclic prefix (CP) duration.

Aspect 21: The method of any of Aspects 15-20, wherein the preamble format for the subcarrier spacing that satisfies the threshold defines 11 repetitions of a sequence, and wherein the corresponding preamble format for the subcarrier spacing that does not satisfy the threshold defines 12 repetitions of the sequence.

Aspect 22: A method of wireless communication performed by a base station, comprising: transmitting a physical random access channel (PRACH) preamble configuration that indicates a preamble format that defines a smaller number of repetitions of a sequence for a PRACH preamble and for a subcarrier spacing that satisfies a threshold, wherein the number of repetitions of the sequence is smaller than a number of repetitions of a corresponding preamble format for a subcarrier spacing that does not satisfy the threshold; and detecting the PRACH preamble, having the preamble format that defines the smaller number of repetitions of the sequence, based at least in part on the PRACH preamble configuration.

Aspect 23: The method of Aspect 22, wherein the preamble format and the corresponding preamble format are New Radio short PRACH formats.

Aspect 24: The method of any of Aspects 22-23, wherein the preamble format for the subcarrier spacing that satisfies the threshold defines a cyclic prefix duration, for a cyclic prefix of the PRACH preamble, that is longer than a cyclic prefix duration defined by the corresponding preamble format for the subcarrier spacing that does not satisfy the threshold.

Aspect 25: The method of Aspect 24, wherein the cyclic prefix duration, for the cyclic prefix of the PRACH preamble, is extended up to a length of the sequence.

Aspect 26: The method of any of Aspects 22-25, wherein the preamble format for the subcarrier spacing that satisfies the threshold defines a guard time duration, for a guard time of the PRACH preamble, that is longer than a guard time duration defined by the corresponding preamble format for the subcarrier spacing that does not satisfy the threshold.

Aspect 27: A method of wireless communication performed by a user equipment (UE), comprising: receiving a physical random access channel (PRACH) preamble configuration that indicates a first preamble format for a first PRACH preamble and a second preamble format for a second PRACH preamble, wherein the first preamble format is different from the second preamble format; transmitting the first PRACH preamble as part of a random access procedure based at least in part on the PRACH preamble configuration, wherein the first PRACH preamble enables a determination of symbol boundaries; and transmitting the second PRACH preamble as part of the random access procedure based at least in part on the PRACH preamble configuration, wherein the second PRACH preamble enables a determination of a symbol timing offset.

Aspect 28: The method of Aspect 27, wherein the first preamble format defines a smaller number of repetitions of a sequence, for the first PRACH preamble and for a subcarrier spacing that satisfies a threshold, wherein the smaller number of repetitions of the sequence is smaller than a number of repetitions of a corresponding preamble format for a subcarrier spacing that does not satisfy the threshold Aspect 29: The method of any of Aspects 27-28, wherein the second PRACH preamble is transmitted in a slot that follows transmission of the first PRACH preamble.

Aspect 30: The method of any of Aspects 27-29, wherein the second PRACH preamble is transmitted in a different PRACH occasion than the first PRACH preamble.

Aspect 31: The method of any of Aspects 27-30, wherein the second PRACH preamble is transmitted based at least in part on a time offset, a frequency offset, or a combination thereof with respect to the first PRACH preamble.

Aspect 32: The method of any of Aspects 27-31, wherein the second preamble format defines one or more repetitions of a sequence over one or more symbols for the second PRACH preamble.

Aspect 33: The method of any of Aspects 27-32, wherein the second preamble format defines fewer repetitions of a sequence than the first preamble format.

Aspect 34: The method of any of Aspects 27-33, wherein the second preamble format defines a shorter cyclic prefix duration, a shorter guard time, or a combination thereof, than the first preamble format.

Aspect 35: The method of any of Aspects 27-34, wherein the second preamble format defines multiple sequences to be transmitted in the second PRACH preamble.

Aspect 36: The method of Aspect 35, wherein the second preamble format defines a cyclic prefix duration for a cyclic prefix that is inserted before at least two of the multiple sequences.

Aspect 37: The method of any of Aspects 27-36, wherein the second preamble format defines a different sequence per symbol or per repetition included in the second PRACH preamble.

Aspect 38: The method of any of Aspects 27-37, wherein the second preamble format defines a different orthogonal cover code to be applied per symbol or per repetition included in the second PRACH preamble.

Aspect 39: The method of any of Aspects 27-38, wherein the second preamble format defines a different scrambling code to be applied per symbol or per repetition included in the second PRACH preamble.

Aspect 40: The method of any of Aspects 27-39, wherein the second preamble format defines a sequence for the second PRACH preamble as one of a Zadoff-Chu sequence, a maximum length sequence, or a pseudo-noise sequence.

Aspect 41: A method of wireless communication performed by a base station, comprising: transmitting a physical random access channel (PRACH) preamble configuration that indicates a first preamble format for a first PRACH preamble and a second preamble format for a second PRACH preamble, wherein the first preamble format is different from the second preamble format; receiving the first PRACH preamble as part of a random access procedure based at least in part on the PRACH preamble configuration, wherein the first PRACH preamble enables a determination of symbol boundaries; and receiving the second PRACH preamble as part of the random access procedure based at least in part on the PRACH preamble configuration, wherein the second PRACH preamble enables a determination of a symbol timing offset.

Aspect 42: The method of Aspect 41, further comprising determining symbol boundaries based at least in part on the first PRACH preamble.

Aspect 43: The method of any of Aspects 41-42, further comprising determining a symbol timing offset based at least in part on the second PRACH preamble.

Aspect 44: The method of any of Aspects 41-43, further comprising transmitting a timing advance command based at least in part on a symbol boundary determined based at least in part on the first PRACH preamble and based at least in part on a symbol timing offset determined based at least in part on the second PRACH preamble.

Aspect 45: The method of any of Aspects 41-44, further comprising: adjusting a timing of a PRACH detection window used to detect the first PRACH preamble by at least one of: extending a duration of a cyclic prefix of the first PRACH preamble to be longer than a cyclic prefix duration defined by the first preamble format, allocating one or more guard symbols to create a guard time with a duration that is longer than a guard time duration defined by the first preamble format, or a combination thereof; and using the adjusted timing of the PRACH detection window to detect the first PRACH preamble.

Aspect 46: The method of any of Aspects 41-45, wherein the first preamble format defines a smaller number of repetitions of a sequence for the first PRACH preamble and for a subcarrier spacing that satisfies a threshold, wherein the smaller number of repetitions of the sequence is smaller than a number of repetitions of a corresponding preamble format for a subcarrier spacing that does not satisfy the threshold.

Aspect 47: The method of any of Aspects 41-46, wherein the second PRACH preamble is received in a slot that follows reception of the first PRACH preamble.

Aspect 48: The method of any of Aspects 41-47, wherein the second PRACH preamble is received in a different PRACH occasion than the first PRACH preamble.

Aspect 49: The method of any of Aspects 41-48, wherein the second PRACH preamble is received based at least in part on a time offset, a frequency offset, or a combination thereof with respect to the first PRACH preamble.

Aspect 50: The method of any of Aspects 41-49, wherein the second preamble format defines one or more repetitions of a sequence over one or more symbols for the second PRACH preamble.

Aspect 51: The method of any of Aspects 41-50, wherein the second preamble format defines fewer repetitions of a sequence than the first preamble format.

Aspect 52: The method of any of Aspects 41-51, wherein the second preamble format defines a shorter cyclic prefix duration, a shorter guard time, or a combination thereof, than the first preamble format.

Aspect 53: The method of any of Aspects 41-52, wherein the second preamble format defines multiple sequences to be transmitted in the second PRACH preamble.

Aspect 54: The method of Aspect 53, wherein the second preamble format defines a cyclic prefix duration for a cyclic prefix that is inserted before at least two of the multiple sequences.

Aspect 55: The method of any of Aspects 41-54, wherein the second preamble format defines a different sequence per symbol or per repetition included in the second PRACH preamble.

Aspect 56: The method of any of Aspects 41-55, wherein the second preamble format defines a different orthogonal cover code to be applied per symbol or per repetition included in the second PRACH preamble.

Aspect 57: The method of any of Aspects 41-56, wherein the second preamble format defines a different scrambling code to be applied per symbol or per repetition included in the second PRACH preamble.

Aspect 58: The method of any of Aspects 41-57, wherein the second preamble format defines a sequence for the second PRACH preamble as one of a Zadoff-Chu sequence, a maximum length sequence, or a pseudo-noise sequence.

Aspect 59: A method of wireless communication, the method comprising: receiving, at a user equipment (UE) from a network entity, a physical random access channel (PRACH) preamble configuration that indicates a preamble format associated with a subcarrier spacing that satisfies a threshold and that defines a guard time duration of a guard time that is longer than a corresponding guard time duration defined by a corresponding preamble format associated with a subcarrier spacing that does not satisfy the threshold; and transmitting, to the network entity, a PRACH preamble having the preamble format based on the PRACH preamble configuration.

Aspect 60: The method of Aspect 59, wherein the preamble format further defines a smaller number of repetitions of a sequence as compared to the corresponding preamble format.

Aspect 61: The method of any of Aspects 59-60, wherein the preamble format further defines 11 repetitions of a sequence, and wherein the corresponding preamble format defines 12 repetitions of the sequence.

Aspect 62: The method of any of Aspects 59-61, wherein the preamble format corresponds to format B4 for subcarrier spacings that satisfy the threshold, and wherein the corresponding preamble format corresponds to format B4 for subcarrier spacings that do not satisfy the threshold.

Aspect 63: The method of any of Aspects 59-61, wherein the preamble format corresponds to format B5 for subcarrier spacings that satisfy the threshold, and wherein the corresponding preamble format corresponds to format B4 for subcarrier spacings that do not satisfy the threshold.

Aspect 64: The method of any of Aspects 59-63, wherein the threshold comprises 960 kilohertz (KHz).

Aspect 65: The method of any of Aspects 59-64, wherein the preamble format and the corresponding preamble format define a same number of symbols and a same cyclic prefix (CP) duration.

Aspect 66: The method of any of Aspects 59-65, wherein the preamble format and the corresponding preamble format are New Radio (NR) short PRACH formats.

Aspect 67: The method of any of Aspects 59-66, further comprising performing a random access channel configuration procedure with the network entity, wherein performing the random access channel configuration procedure includes transmitting the PRACH preamble.

Aspect 68: The method of any of Aspects 59-67, wherein the PRACH preamble configuration is included in one or more system information blocks (SIBs) or one or more synchronization signal blocks (SSBs).

Aspect 69: The method of any of Aspects 59-67, wherein the PRACH preamble configuration is included in a radio resource control (RRC) message.

Aspect 70: A method of wireless communication, the method comprising: transmitting, from a network entity to a user equipment (UE), a physical random access channel (PRACH) preamble configuration that indicates a preamble format associated with a subcarrier spacing that satisfies a threshold and that defines a guard time duration of a guard time that is longer than a corresponding guard time duration defined by a corresponding preamble format associated with a subcarrier spacing that does not satisfy the threshold; and detecting, at the network entity, a PRACH preamble received from the UE based on the PRACH preamble configuration, the PRACH preamble having the preamble format.

Aspect 71: The method of Aspect 70, wherein the preamble format further defines a smaller number of repetitions of a sequence as compared to the corresponding preamble format.

Aspect 72: The method of any of Aspects 70-71, wherein the preamble format further defines 11 repetitions of a sequence, and wherein the corresponding preamble format defines 12 repetitions of the sequence.

Aspect 73: The method of any of Aspects 70-72, wherein the preamble format corresponds to format B4 for subcarrier spacings that satisfy the threshold, and wherein the corresponding preamble format corresponds to format B4 for subcarrier spacings that do not satisfy the threshold.

Aspect 74: The method of any of Aspects 70-72, wherein the preamble format corresponds to format B5 for subcarrier spacings that satisfy the threshold, and wherein the corresponding preamble format corresponds to format B4 for subcarrier spacings that do not satisfy the threshold.

Aspect 75: The method of any of Aspects 70-74, wherein the threshold comprises 960 kilohertz (KHz).

Aspect 76: The method of any of Aspects 70-75, wherein the preamble format and the corresponding preamble format define a same number of symbols and a same cyclic prefix (CP) duration.

Aspect 77: The method of any of Aspects 70-76, wherein the preamble format and the corresponding preamble format are New Radio (NR) short PRACH formats.

Aspect 78: The method of any of Aspects 70-77, further comprising performing a random access channel configuration procedure with the UE, wherein performing the random access channel configuration procedure includes receiving the PRACH preamble.

Aspect 79: The method of any of Aspects 70-78, wherein the PRACH preamble configuration is included in one or more system information blocks (SIBs) or one or more synchronization signal blocks (SSBs).

Aspect 80: The method of any of Aspects 70-78, wherein the PRACH preamble configuration is included in a radio resource control (RRC) message.

Aspect 81: A method of wireless communication, the method comprising: receiving, at a network entity from a user equipment (UE), a physical random access channel (PRACH) preamble having a preamble format; selectively adjusting a PRACH detection window based on an alignment of the PRACH preamble to a slot boundary by truncating a last repetition of a sequence included in the PRACH preamble and using a time period allocated to the last repetition to create a guard time for detecting the PRACH preamble; and detecting the PRACH preamble based on the PRACH detection window.

Aspect 82: The method of Aspect 81, further comprising determining to truncate the last repetition and use the time period to create the guard time based on the PRACH preamble being aligned with the slot boundary.

Aspect 83: The method of any of Aspects 81-82, further comprising adjusting the PRACH detection window by allocating one or more guard symbols to one or more symbols that follow the PRACH preamble within a slot based on the PRACH preamble not being aligned with the slot boundary.

Aspect 84: The method of any of Aspects 81-83, wherein the preamble format is associated with a subcarrier spacing that satisfies a threshold.

Aspect 85: The method of Aspect 84, wherein the threshold comprises 960 kilohertz (KHz).

Aspect 86: The method of any of Aspects 81-85, wherein the preamble format defines 12 repetitions of the sequence.

Aspect 87: The method of any of Aspects 81-86, wherein the preamble format corresponds to format B4.

Aspect 88: The method of any of Aspects 81-87, wherein the preamble format is a New Radio (NR) short PRACH format.

Aspect 89: The method of any of Aspects 81-88, wherein the preamble format defines a corresponding guard time duration, and wherein a guard time duration of the guard time is longer than the corresponding guard time duration.

Aspect 90: The method of any of Aspects 81-89, wherein using the time period to create the guard time comprises using the time period to allocate a single guard symbol.

Aspect 91: A method of wireless communication, the method comprising: receiving, at a user equipment (UE) from a network entity, a physical random access channel (PRACH) preamble configuration that indicates a first preamble format associated with a first alignment to a corresponding slot boundary and a second preamble format associated with a second alignment to a corresponding slot boundary; selecting a preamble format for a PRACH preamble based on the PRACH preamble configuration and an alignment of the PRACH preamble to a slot boundary; and transmitting the PRACH preamble to the network entity, the PRACH preamble having the selected preamble format.

Aspect 92: The method of Aspect 91, wherein selecting the preamble format for the PRACH preamble comprises selecting the first preamble format based on the PRACH preamble not being aligned with the slot boundary.

Aspect 93: The method of any of Aspects 91-92, wherein selecting the preamble format for the PRACH preamble comprises selecting the second preamble format based on the PRACH preamble being aligned with the slot boundary.

Aspect 94: The method of any of Aspects 91-93, wherein the second preamble format defines a smaller number of repetitions of a sequence as compared to the first preamble format.

Aspect 95: The method of any of Aspects 91-94, wherein the second preamble format defines 11 repetitions of a sequence, and wherein the first preamble format defines 12 repetitions of the sequence.

Aspect 96: The method of any of Aspects 91-95, wherein the first preamble format corresponds to format B4, and wherein the second preamble format corresponds to format B5.

Aspect 97: The method of any of Aspects 91-96, wherein the first preamble format and the second preamble format are New Radio (NR) short PRACH formats.

Aspect 98: A method of wireless communication, the method comprising: transmitting, from a network entity to a user equipment (UE), a physical random access channel (PRACH) preamble configuration that indicates a first preamble format associated with a first alignment to a corresponding slot boundary and a second preamble format associated with a second alignment to a corresponding slot boundary; and detecting a PRACH preamble received from the UE using a PRACH detection window that is configured based on an alignment of the PRACH preamble to a slot boundary.

Aspect 99: The method of Aspect 98, further comprising configuring the PRACH detection window according to the first preamble format based on the PRACH preamble being not aligned with the slot boundary.

Aspect 100: The method of any of Aspects 98-99, further comprising configuring the PRACH detection window according to the second preamble format based on the PRACH preamble being aligned with the slot boundary.

Aspect 101: The method of any of Aspects 98-100, wherein configuring the PRACH detection window comprises adjusting a length of the PRACH detection window based on a duration of a guard time associated with the PRACH preamble, adjusting the length of the PRACH detection window based on a number of repetitions of a sequence associated with the PRACH preamble, or a combination thereof.

Aspect 102: The method of any of Aspects 98-101, wherein the second preamble format defines a smaller number of repetitions of a sequence as compared to the first preamble format.

Aspect 103: The method of any of Aspects 98-102, wherein the second preamble format defines 11 repetitions of a sequence, and wherein the first preamble format defines 12 repetitions of the sequence.

Aspect 104: The method of any of Aspects 98-103, wherein the first preamble format corresponds to format B4, and wherein the second preamble format corresponds to format B5.

Aspect 105: The method of any of Aspects 98-104, wherein the first preamble format and the second preamble format are New Radio (NR) short PRACH formats.

Aspect 106: An apparatus for wireless communication at a device, comprising a processor; memory coupled with the processor; and instructions stored in the memory and executable by the processor to cause the apparatus to perform the method of one or more Aspects of Aspects 1-14.

Aspect 107: A device for wireless communication, comprising a memory and one or more processors coupled to the memory, the memory and the one or more processors configured to perform the method of one or more Aspects of Aspects 1-14.

Aspect 108: An apparatus for wireless communication, comprising at least one means for performing the method of one or more Aspects of Aspects 1-14.

Aspect 109: A non-transitory computer-readable medium storing code for wireless communication, the code comprising instructions executable by a processor to perform the method of one or more Aspects of Aspects 1-14.

Aspect 110: A non-transitory computer-readable medium storing a set of instructions for wireless communication, the set of instructions comprising one or more instructions that, when executed by one or more processors of a device, cause the device to perform the method of one or more Aspects of Aspects 1-14.

Aspect 111: An apparatus for wireless communication at a device, comprising a processor; memory coupled with the processor; and instructions stored in the memory and executable by the processor to cause the apparatus to perform the method of one or more Aspects of Aspects 15-21.

Aspect 112: A device for wireless communication, comprising a memory and one or more processors coupled to the memory, the memory and the one or more processors configured to perform the method of one or more Aspects of Aspects 15-21.

Aspect 113: An apparatus for wireless communication, comprising at least one means for performing the method of one or more Aspects of Aspects 15-21.

Aspect 114: A non-transitory computer-readable medium storing code for wireless communication, the code comprising instructions executable by a processor to perform the method of one or more Aspects of Aspects 15-21.

Aspect 115: A non-transitory computer-readable medium storing a set of instructions for wireless communication, the set of instructions comprising one or more instructions that, when executed by one or more processors of a device, cause the device to perform the method of one or more Aspects of Aspects 15-21.

Aspect 116: An apparatus for wireless communication at a device, comprising a processor; memory coupled with the processor; and instructions stored in the memory and executable by the processor to cause the apparatus to perform the method of one or more Aspects of Aspects 22-26.

Aspect 117: A device for wireless communication, comprising a memory and one or more processors coupled to the memory, the memory and the one or more processors configured to perform the method of one or more Aspects of Aspects 22-26.

Aspect 118: An apparatus for wireless communication, comprising at least one means for performing the method of one or more Aspects of Aspects 22-26.

Aspect 119: A non-transitory computer-readable medium storing code for wireless communication, the code comprising instructions executable by a processor to perform the method of one or more Aspects of Aspects 22-26.

Aspect 120: A non-transitory computer-readable medium storing a set of instructions for wireless communication, the set of instructions comprising one or more instructions that, when executed by one or more processors of a device, cause the device to perform the method of one or more Aspects of Aspects 22-26.

Aspect 121: An apparatus for wireless communication at a device, comprising a processor; memory coupled with the processor; and instructions stored in the memory and executable by the processor to cause the apparatus to perform the method of one or more Aspects of Aspects 27-40.

Aspect 122: A device for wireless communication, comprising a memory and one or more processors coupled to the memory, the memory and the one or more processors configured to perform the method of one or more Aspects of Aspects 27-40.

Aspect 123: An apparatus for wireless communication, comprising at least one means for performing the method of one or more Aspects of Aspects 27-40.

Aspect 124: A non-transitory computer-readable medium storing code for wireless communication, the code comprising instructions executable by a processor to perform the method of one or more Aspects of Aspects 27-40.

Aspect 125: A non-transitory computer-readable medium storing a set of instructions for wireless communication, the set of instructions comprising one or more instructions that, when executed by one or more processors of a device, cause the device to perform the method of one or more Aspects of Aspects 27-40.

Aspect 126: An apparatus for wireless communication at a device, comprising a processor; memory coupled with the processor; and instructions stored in the memory and executable by the processor to cause the apparatus to perform the method of one or more Aspects of Aspects 41-58.

Aspect 127: A device for wireless communication, comprising a memory and one or more processors coupled to the memory, the memory and the one or more processors configured to perform the method of one or more Aspects of Aspects 41-58.

Aspect 128: An apparatus for wireless communication, comprising at least one means for performing the method of one or more Aspects of Aspects 41-58.

Aspect 129: A non-transitory computer-readable medium storing code for wireless communication, the code comprising instructions executable by a processor to perform the method of one or more Aspects of Aspects 41-58.

Aspect 130: A non-transitory computer-readable medium storing a set of instructions for wireless communication, the set of instructions comprising one or more instructions that, when executed by one or more processors of a device, cause the device to perform the method of one or more Aspects of Aspects 41-58.

Aspect 131: An apparatus for wireless communication at a device, comprising a processor; memory coupled with the processor; and instructions stored in the memory and executable by the processor to cause the apparatus to perform the method of one or more Aspects of Aspects 59-69.

Aspect 132: A device for wireless communication, comprising a memory and one or more processors coupled to the memory, the memory and the one or more processors configured to perform the method of one or more Aspects of Aspects 59-69.

Aspect 133: An apparatus for wireless communication, comprising at least one means for performing the method of one or more Aspects of Aspects 59-69.

Aspect 134: A non-transitory computer-readable medium storing code for wireless communication, the code comprising instructions executable by a processor to perform the method of one or more Aspects of Aspects 59-69.

Aspect 135: A non-transitory computer-readable medium storing a set of instructions for wireless communication, the set of instructions comprising one or more instructions that, when executed by one or more processors of a device, cause the device to perform the method of one or more Aspects of Aspects 59-69.

Aspect 136: An apparatus for wireless communication at a device, comprising a processor; memory coupled with the processor; and instructions stored in the memory and executable by the processor to cause the apparatus to perform the method of one or more Aspects of Aspects 70-80.

Aspect 137: A device for wireless communication, comprising a memory and one or more processors coupled to the memory, the memory and the one or more processors configured to perform the method of one or more Aspects of Aspects 70-80.

Aspect 138: An apparatus for wireless communication, comprising at least one means for performing the method of one or more Aspects of Aspects 70-80.

Aspect 139: A non-transitory computer-readable medium storing code for wireless communication, the code comprising instructions executable by a processor to perform the method of one or more Aspects of Aspects 70-80.

Aspect 140: A non-transitory computer-readable medium storing a set of instructions for wireless communication, the set of instructions comprising one or more instructions that, when executed by one or more processors of a device, cause the device to perform the method of one or more Aspects of Aspects 70-80.

Aspect 141: An apparatus for wireless communication at a device, comprising a processor; memory coupled with the processor; and instructions stored in the memory and executable by the processor to cause the apparatus to perform the method of one or more Aspects of Aspects 81-90.

Aspect 142: A device for wireless communication, comprising a memory and one or more processors coupled to the memory, the memory and the one or more processors configured to perform the method of one or more Aspects of Aspects 81-90.

Aspect 143: An apparatus for wireless communication, comprising at least one means for performing the method of one or more Aspects of Aspects 81-90.

Aspect 144: A non-transitory computer-readable medium storing code for wireless communication, the code comprising instructions executable by a processor to perform the method of one or more Aspects of Aspects 81-90.

Aspect 145: A non-transitory computer-readable medium storing a set of instructions for wireless communication, the set of instructions comprising one or more instructions that, when executed by one or more processors of a device, cause the device to perform the method of one or more Aspects of Aspects 81-90.

Aspect 146: An apparatus for wireless communication at a device, comprising a processor; memory coupled with the processor; and instructions stored in the memory and executable by the processor to cause the apparatus to perform the method of one or more Aspects of Aspects 91-97.

Aspect 147: A device for wireless communication, comprising a memory and one or more processors coupled to the memory, the memory and the one or more processors configured to perform the method of one or more Aspects of Aspects 91-97.

Aspect 148: An apparatus for wireless communication, comprising at least one means for performing the method of one or more Aspects of Aspects 91-97.

Aspect 149: A non-transitory computer-readable medium storing code for wireless communication, the code comprising instructions executable by a processor to perform the method of one or more Aspects of Aspects 91-97.

Aspect 150: A non-transitory computer-readable medium storing a set of instructions for wireless communication, the set of instructions comprising one or more instructions that, when executed by one or more processors of a device, cause the device to perform the method of one or more Aspects of Aspects 91-97.

Aspect 151: An apparatus for wireless communication at a device, comprising a processor; memory coupled with the processor; and instructions stored in the memory and executable by the processor to cause the apparatus to perform the method of one or more Aspects of Aspects 98-105.

Aspect 152: A device for wireless communication, comprising a memory and one or more processors coupled to the memory, the memory and the one or more processors configured to perform the method of one or more Aspects of Aspects 98-105.

Aspect 153: An apparatus for wireless communication, comprising at least one means for performing the method of one or more Aspects of Aspects 98-105.

Aspect 154: A non-transitory computer-readable medium storing code for wireless communication, the code comprising instructions executable by a processor to perform the method of one or more Aspects of Aspects 98-105.

Aspect 155: A non-transitory computer-readable medium storing a set of instructions for wireless communication, the set of instructions comprising one or more instructions that, when executed by one or more processors of a device, cause the device to perform the method of one or more Aspects of Aspects 98-105.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
receiving a physical random access channel (PRACH) preamble configuration that indicates a preamble format that defines a smaller number of repetitions of a sequence for a PRACH preamble and for a subcarrier spacing that satisfies a threshold, wherein the smaller number of repetitions of the sequence is less than a number of repetitions of a corresponding preamble format for a subcarrier spacing that does not satisfy the threshold; and transmitting the PRACH preamble, having the preamble format that defines the smaller number of repetitions of the sequence, based at least in part on the PRACH preamble configuration.

2. The method of claim 1, wherein the preamble format and the corresponding preamble format are New Radio short PRACH formats.

3. The method of claim 1, wherein the preamble format for the subcarrier spacing that satisfies the threshold defines a cyclic prefix duration, for a cyclic prefix of the PRACH preamble, that is longer than a cyclic prefix duration defined by the corresponding preamble format for the subcarrier spacing that does not satisfy the threshold.

4. The method of claim 3, wherein the cyclic prefix duration, for the cyclic prefix of the PRACH preamble, is extended up to a length of the sequence.

5. The method of claim 1, wherein the preamble format for the subcarrier spacing that satisfies the threshold defines a guard time duration, for a guard time of the PRACH preamble, that is longer than a guard time duration defined by the corresponding preamble format for the subcarrier spacing that does not satisfy the threshold.

6. The method of claim 1, wherein the preamble format for the subcarrier spacing that satisfies the threshold and the corresponding preamble format for the subcarrier spacing that does not satisfy the threshold define a same number of symbols and a same cyclic prefix (CP) duration.

7. The method of claim 1, wherein the preamble format for the subcarrier spacing that satisfies the threshold defines 11 repetitions of a sequence, and wherein the corresponding preamble format for the subcarrier spacing that does not satisfy the threshold defines 12 repetitions of the sequence.

8. A method of wireless communication performed by a user equipment (UE), comprising:

receiving a physical random access channel (PRACH) preamble configuration that indicates a first preamble format for a first PRACH preamble and a second preamble format for a second PRACH preamble, wherein the first preamble format is different from the second preamble format;

transmitting the first PRACH preamble as part of a random access procedure based at least in part on the PRACH preamble configuration, wherein transmitting the first PRACH preamble enables a determination of a symbol boundary offset; and transmitting the second PRACH preamble as part of the random access procedure based at least in part on the PRACH preamble configuration, wherein transmitting the second PRACH preamble enables a determination of a symbol timing offset, wherein the first preamble format defines a first number of repetitions of a sequence, for the first PRACH preamble and for a subcarrier spacing, that is less than a second number of repetitions of a corresponding preamble format for another subcarrier spacing.

9. The method of claim 8, wherein the first number of repetitions of the sequence satisfies a threshold, and wherein the second number of repetitions of the corresponding preamble format does not satisfy the threshold.

10. The method of claim 8, wherein the second PRACH preamble is transmitted in a slot that follows transmission of the first PRACH preamble.

11. The method of claim 8, wherein the second PRACH preamble is transmitted in a different PRACH occasion than the first PRACH preamble.

12. The method of claim 8, wherein the second PRACH preamble is transmitted based at least in part on a time offset, a frequency offset, or a combination thereof with respect to the first PRACH preamble.

13. The method of claim 8, wherein the second preamble format defines one or more repetitions of a sequence over one or more symbols for the second PRACH preamble.

14. The method of claim 8, wherein the second preamble format defines fewer repetitions of a sequence than the first preamble format.

15. The method of claim 8, wherein the second preamble format defines a shorter cyclic prefix duration, a shorter guard time, or a combination thereof, than the first preamble format.

16. The method of claim 8, wherein the second preamble format defines multiple sequences to be transmitted in the second PRACH preamble.

17. The method of claim 16, wherein the second preamble format defines a cyclic prefix duration for a cyclic prefix that is inserted before at least two of the multiple sequences.

18. The method of claim 8, wherein the second preamble format defines a different sequence per symbol or per repetition included in the second PRACH preamble.

19. The method of claim 8, wherein the second preamble format defines a different orthogonal cover code to be applied per symbol or per repetition included in the second PRACH preamble.

20. The method of claim 8, wherein the second preamble format defines a different scrambling code to be applied per symbol or per repetition included in the second PRACH preamble.

21. A user equipment (UE) for wireless communication, comprising:

a memory; and
one or more processors coupled to the memory, the one or more processors configured to:
receive a physical random access channel (PRACH) preamble configuration that indicates a preamble format that defines a smaller number of repetitions of a sequence for a PRACH preamble and for a subcarrier spacing that satisfies a threshold, wherein the smaller number of repetitions of the sequence is less than a number of repetitions of a corresponding preamble format for a subcarrier spacing that does not satisfy the threshold; and
transmit the PRACH preamble, having the preamble format that defines the smaller number of repetitions of the sequence, based at least in part on the PRACH preamble configuration.

22. The UE of claim 21, wherein the preamble format for the subcarrier spacing that satisfies the threshold defines a cyclic prefix duration, for a cyclic prefix of the PRACH preamble, that is longer than a cyclic prefix duration defined by the corresponding preamble format for the subcarrier spacing that does not satisfy the threshold.

23. The UE of claim 22, wherein the cyclic prefix duration, for the cyclic prefix of the PRACH preamble, is extended up to a length of the sequence.

24. The UE of claim 21, wherein the preamble format for the subcarrier spacing that satisfies the threshold defines a guard time duration, for a guard time of the PRACH preamble, that is longer than a guard time duration defined by the corresponding preamble format for the subcarrier spacing that does not satisfy the threshold.

25. The UE of claim 21, wherein the preamble format for the subcarrier spacing that satisfies the threshold defines 11 repetitions of a sequence, and wherein the corresponding preamble format for the subcarrier spacing that does not satisfy the threshold defines 12 repetitions of the sequence.

26. The UE of claim 21, wherein the preamble format for the subcarrier spacing that satisfies the threshold and the corresponding preamble format for the subcarrier spacing that does not satisfy the threshold define a same number of symbols and a same cyclic prefix (CP) duration.

27. A UE for wireless communication, comprising:
  a memory; and
  one or more processors coupled to the memory, the one or more processors configured to:
    receive a physical random access channel (PRACH) preamble configuration that indicates a first preamble format for a first PRACH preamble and a second preamble format for a second PRACH preamble, wherein the first preamble format is different from the second preamble format;
    transmit the first PRACH preamble as part of a random access procedure based at least in part on the PRACH preamble configuration, wherein transmitting the first PRACH preamble enables a determination of a symbol boundary offset; and
    transmit the second PRACH preamble as part of the random access procedure based at least in part on the PRACH preamble configuration, wherein transmitting the second PRACH preamble enables a determination of a symbol timing offset,
      wherein the first preamble format defines a first number of repetitions of a sequence, for the first PRACH preamble and for a subcarrier spacing, that is less than a second number of repetitions of a corresponding preamble format for another subcarrier spacing.

28. The UE of claim 27, wherein the first number of repetitions of the sequence satisfies a threshold, and wherein the second number of repetitions of the corresponding preamble format does not satisfy the threshold.

29. The UE of claim 27, wherein the second PRACH preamble is transmitted based at least in part on a time offset, a frequency offset, or a combination thereof with respect to the first PRACH preamble.

30. The UE of claim 27, wherein the second preamble format defines a shorter cyclic prefix duration, a shorter guard time, or a combination thereof, than the first preamble format.

* * * * *